US011156096B2

(12) United States Patent
Ristau et al.

(10) Patent No.: US 11,156,096 B2
(45) Date of Patent: Oct. 26, 2021

(54) TURBINE BLADE AIRFOIL PROFILE

(71) Applicant: General Electric Company, Schenectady, NY (US)

(72) Inventors: Neil Devin Ristau, Simpsonville, SC (US); Michael Anthony Wondrasek, Greenville, SC (US); Jan Emeric Agudo, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 16/784,811

(22) Filed: Feb. 7, 2020

(65) Prior Publication Data

US 2021/0246792 A1 Aug. 12, 2021

(51) Int. Cl.
| | | |
|---|---|---|
| *F01D 5/14* | (2006.01) | |
| *F04D 29/32* | (2006.01) | |
| *F04D 29/54* | (2006.01) | |

(52) U.S. Cl.
CPC ............ *F01D 5/141* (2013.01); *F04D 29/324* (2013.01); *F04D 29/544* (2013.01); *F05D 2220/323* (2013.01); *F05D 2220/3212* (2013.01); *F05D 2240/301* (2013.01); *F05D 2240/306* (2013.01); *F05D 2240/80* (2013.01); *F05D 2250/20* (2013.01); *F05D 2250/74* (2013.01)

(58) Field of Classification Search
CPC .......... F01D 5/141; F01D 5/143; F01D 9/041; F04D 29/324; F04D 29/563; F04D 29/544; F05D 2220/3212; F05D 2220/32; F05D 2220/323; F05D 2240/301; F05D 2240/12; F05D 2240/306; F05D 2240/307; F05D 2240/80; F05D 2250/20; F05D 2250/74

See application file for complete search history.

(56) References Cited

U.S. PATENT DOCUMENTS

| | | |
|---|---|---|
| 5,695,323 A | 12/1997 | Pfeifer et al. |
| 6,685,434 B1 | 2/2004 | Humanchuk et al. |
| 6,739,838 B1 | 5/2004 | Bielek et al. |
| 6,779,980 B1 | 8/2004 | Brittingham et al. |
| 7,731,483 B2 | 6/2010 | DeLong et al. |
| 8,105,038 B2 | 1/2012 | Ootomo et al. |
| 2017/0226870 A1* | 8/2017 | Ristau ................. F01D 5/187 |
| 2017/0226872 A1 | 8/2017 | Bielek et al. |
| 2018/0320527 A1* | 11/2018 | Ristau ................. F01D 5/141 |
| 2018/0320528 A1 | 11/2018 | Bielek et al. |

* cited by examiner

Primary Examiner — J. Todd Newton
Assistant Examiner — Eric J Zamora Alvarez
(74) Attorney, Agent, or Firm — Charlotte Wilson; Hoffman Warnick LLC

(57) ABSTRACT

Various embodiments of the disclosure include turbine blades and systems employing such blades. Various embodiments include a turbine blade having: an airfoil having an airfoil shape having a nominal profile substantially in accordance with at least a portion of Cartesian coordinate values of X, Y and Z set forth in TABLE I. The Cartesian coordinate values are non-dimensional values of from 0% to 100% convertible to distances by multiplying the values by a height of the airfoil expressed in units of distance. The X and Y values are connected by smooth continuing arcs to define airfoil profile sections at each distance Z along at least a portion of the airfoil, the profile sections at the Z distances being joined smoothly with one another to form the nominal profile.

12 Claims, 6 Drawing Sheets

TURBINE BLADE AIRFOIL PROFILE

FIELD OF THE DISCLOSURE

The subject matter disclosed herein relates to turbomachines. More particularly, the subject matter disclosed herein relates to a turbine airfoil profile for turbine blades.

BACKGROUND OF THE DISCLOSURE

Some jet aircraft and simple or combined cycle power plant systems employ turbines, or so-called turbomachines, in their configuration and operation. Some of these turbines employ airfoils (e.g., turbine nozzles, blades, airfoils, etc.), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. As a result of this interaction and conversion, the aerodynamic characteristics of these airfoils may result in losses in system and turbine operation, performance, thrust, efficiency, and power.

BRIEF DESCRIPTION OF THE DISCLOSURE

Various embodiments of the disclosure include turbine blades and systems employing such blades. Various particular embodiments include a turbine blade having: an airfoil having: a suction side; a pressure side opposing the suction side; a leading edge spanning between the pressure side and the suction side; and a trailing edge opposing the leading edge and spanning between the pressure side and the suction side; and an endwall connected with the airfoil along the suction side, the pressure side, the trailing edge and the leading edge.

A first aspect of the disclosure includes a turbine blade comprising: an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, wherein at least one of the suction side or the pressure side of the airfoil has a shape having a nominal profile substantially in accordance with at least a portion of Cartesian coordinate values of X, Y and Z set forth in Table I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

A second aspect of the disclosure includes a rotating section for a turbine, the rotating section comprising: a set of rotating blades, the set of rotating blades including at least one blade having: an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, wherein at least one of the suction side or the pressure side of the airfoil has a shape having a nominal profile substantially in accordance with at least a portion of Cartesian coordinate values of X, Y and Z set forth in Table I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

A third aspect of the disclosure includes a turbine comprising a plurality of turbine blades, each of the turbine blades comprising: an airfoil having: a suction side, a pressure side opposing the suction side, a leading edge spanning between the pressure side and the suction side, and a trailing edge opposing the leading edge and spanning between the pressure side and the suction side; and at least one endwall connected with the airfoil along the suction side, the pressure side, the trailing edge and the leading edge, wherein at least one of the suction side or the pressure side of the airfoil has a shape having a nominal profile substantially in accordance with at least a portion of Cartesian coordinate values of X, Y and Z set forth in Table I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
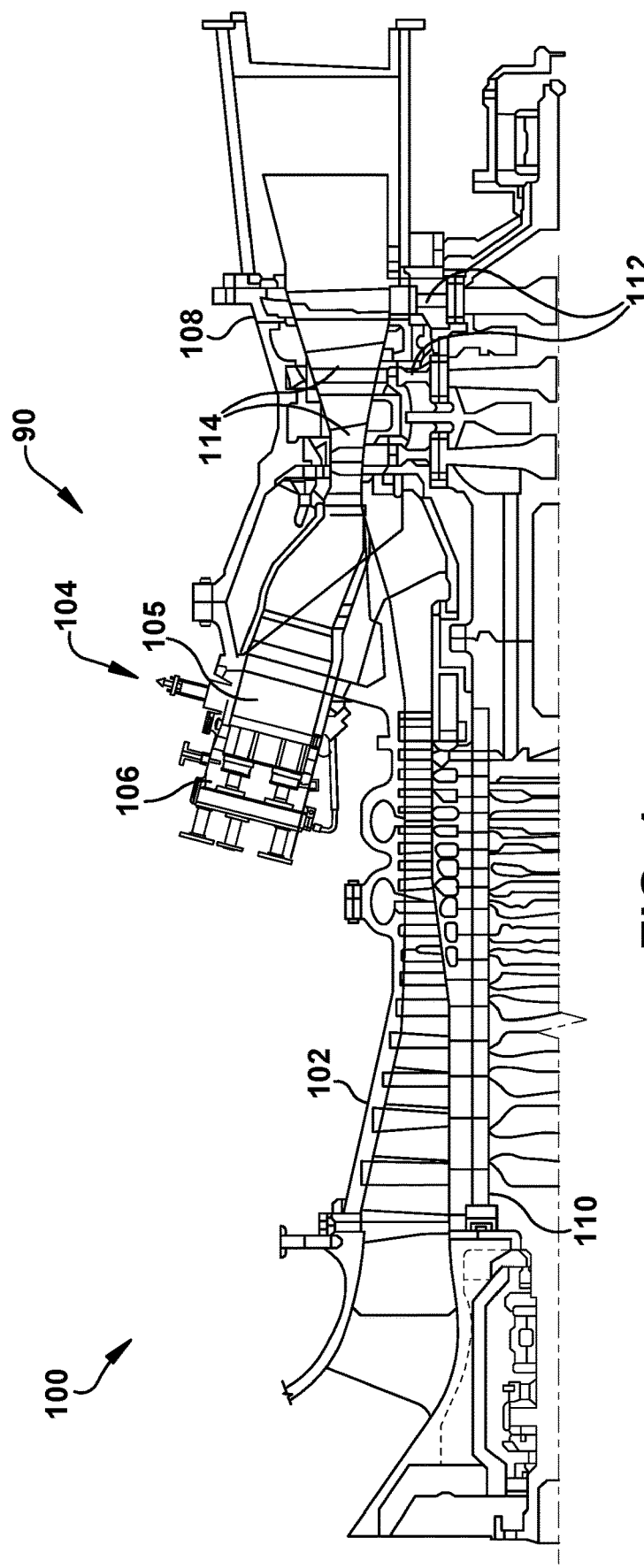
FIG. 1 is a schematic illustration of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION OF THE DISCLOSURE

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur and that the description includes instances where the event occurs and instances where it does not.

Where an element or layer is referred to as being "on," "engaged to," "connected to" or "coupled to" another element or layer, it may be directly on, engaged to, connected to or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine rotor blades that rotate (hereinafter, "blade" or "turbine blade"). Various embodiments include a turbine blade having: an airfoil having an airfoil shape having a nominal profile substantially in accordance with at least a portion of Cartesian coordinate values of X, Y and Z set forth in Table I. The Cartesian coordinate values are non-dimensional values of from 0% to 100% convertible to distances by multiplying the values by a height of the airfoil expressed in units of distance. The X and Y values are connected by smooth continuing arcs that define airfoil profile sections at each distance Z along at least a portion of the airfoil, and the profile sections at the Z distances are joined smoothly with one another to form the nominal airfoil profile.

Referring to the drawings, FIG. 1 is a schematic view of an illustrative non-limiting turbomachine 90 in the form of a combustion turbine or gas turbine (GT) system 100 (hereinafter, "GT system 100"). GT system 100 includes a compressor 102 and a combustor 104. Combustor 104 includes a combustion region 105 and a fuel nozzle assembly 106. GT system 100 also includes a turbine 108 and a common rotor compressor/turbine shaft 110 (hereinafter referred to as "rotor shaft 110"). In one non-limiting embodiment, GT system 100 is a 7HA.03 engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
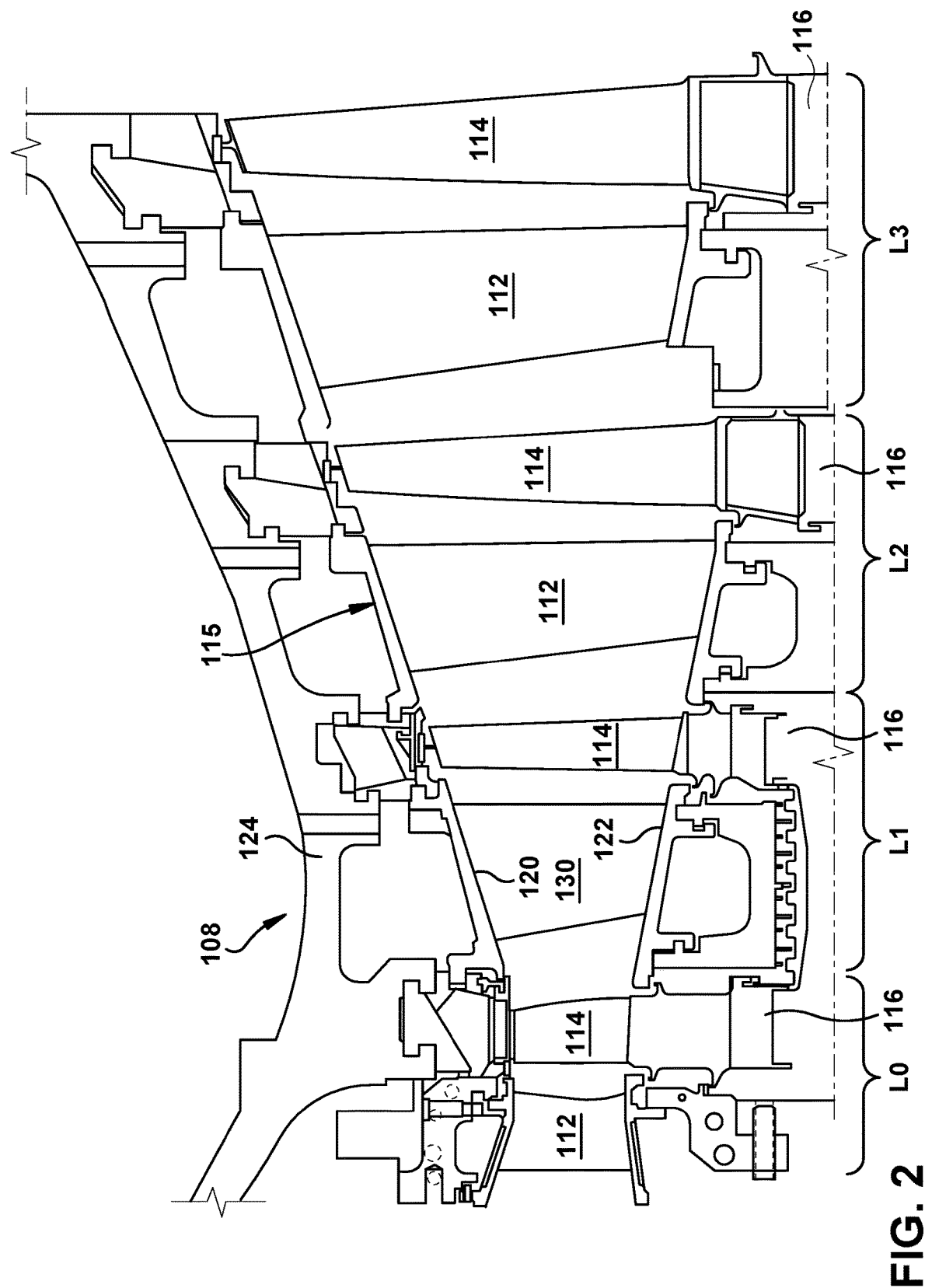
FIG. 2 is a cross-section illustration of an illustrative gas turbine assembly with four stages that may be used with the turbomachine in FIG. 1.

FIG. 2 shows a cross-section view of an illustrative non-limiting portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one non-limiting example only, and each turbine may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor shaft 110. That is, a plurality of rotating blades 114 are mechanically coupled in a circumferentially spaced manner to each rotor wheel 116. A static blade section 115 includes the stationary nozzles 112 circumferentially spaced around rotor shaft 110. Each nozzle 112 may include at least one endwall (or platform) 120, 122 connected with airfoil 130. In the example shown, nozzle 112 includes a radially outer endwall 120 and a radially inner endwall 122. Radially outer endwall 120 couples nozzle 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor shaft 110. Compressor 102 also is rotatably coupled to rotor shaft 110. In the illustrative embodiment, there is a plurality of combustors 104 and fuel nozzle assemblies 106. In the following discussion, unless otherwise indicated, only one of each component will be discussed. At least one end of rotating rotor shaft 110 may extend axially away from turbine 108 and may be attached to a load or machinery (not shown), such as, but not limited to, a generator, a load compressor, and/or another turbine.

Figure 3:
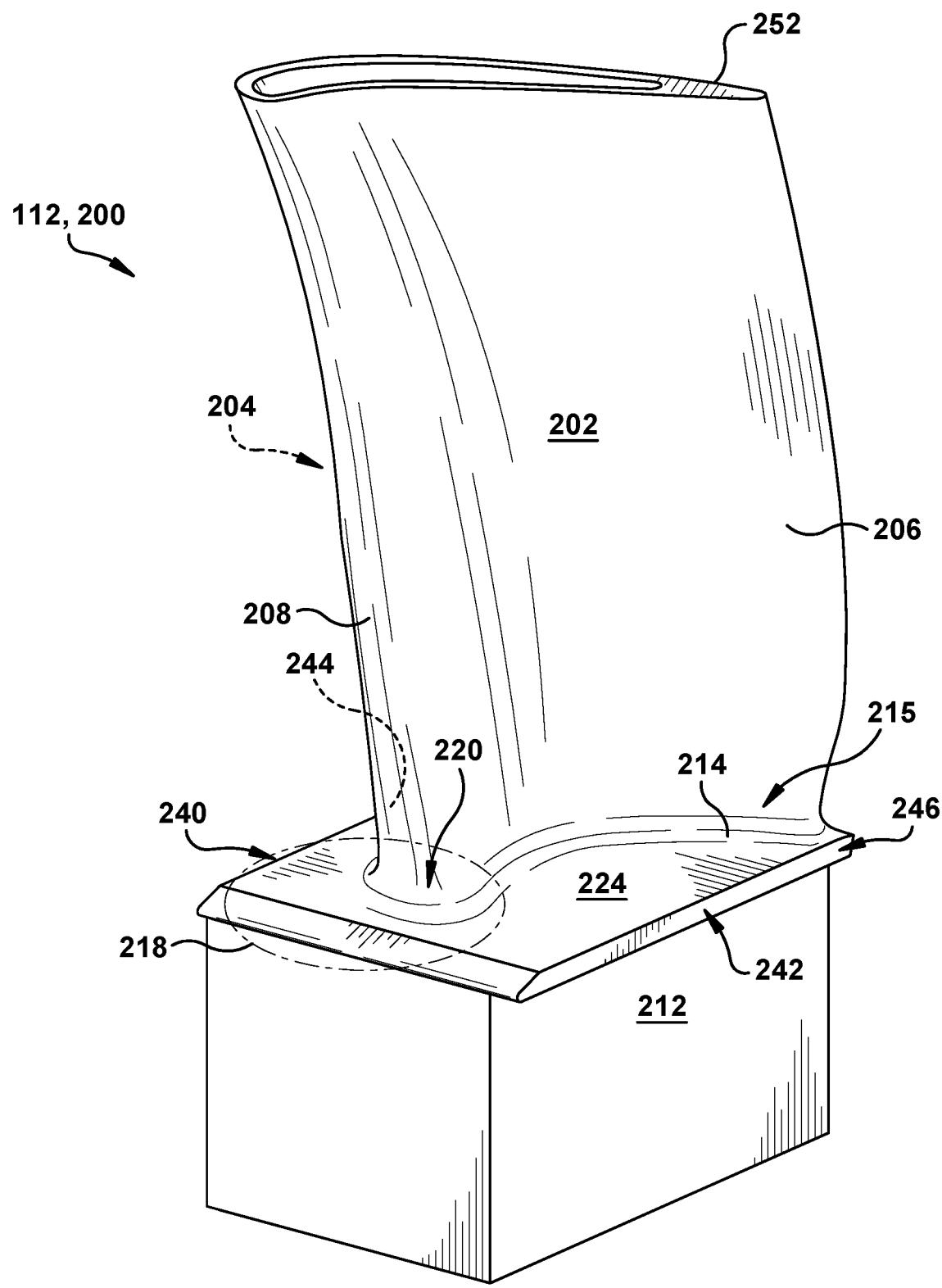
FIG. 3 illustrates a schematic three-dimensional view of an illustrative turbine blade including an airfoil, according to various embodiments of the disclosure.

FIG. 3 illustrates blade 114 in detail as blade 200. Blade 200 is a rotatable (dynamic) blade, which is part of the set of turbine rotor blades 114 circumferentially dispersed about a rotor shaft in a stage of a turbine (e.g., turbine 108). That is, during operation of turbine, as a working fluid (e.g., gas or steam) is directed across the blade's airfoil, blade 200 will initiate rotation of a rotor shaft (e.g., rotor shaft 110) and rotate about an axis defined by rotor shaft 110. It is understood that blade 200 is configured to couple (mechanically couple via fasteners, welds, slot/grooves, etc.) with a plurality of similar or distinct blades (e.g., blades 200 or other blades) to form a set of blades in a stage of the turbine.

With reference to FIG. 3, turbine blade 200 can include an airfoil 202 having a suction side 204 (obstructed in this view) and a pressure side 206 opposing suction side 204. Blade 200 can also include a leading edge 208 spanning between pressure side 206 and suction side 204, and a trailing edge 210 opposing leading edge 208 and spanning between pressure side 206 and suction side 204.

As shown, blade 200 can also include an endwall 212 connected with airfoil 202 and a tip end 252 an opposite end of the airfoil 202. Endwall 212 is illustrated as a "block" in FIG. 3 for ease of description, but endwall 212 can have any suitable configuration to connect to rotor shaft 110. Endwall 212 can be connected with airfoil 202 along suction side 204, pressure side 206, trailing edge 210 and leading edge 208. In various embodiments, blade 200 includes a fillet 214 proximate a first end 215 of airfoil 202, fillet 214 connecting airfoil 202 and endwall 212. Fillet 214 can include a weld or braze fillet, which may be formed via conventional MIG welding, TIG welding, brazing, etc. Fillet 214 can include such forms as integral to the investment casting process or definition. Endwall 212 is configured to fit into a mating slot in the turbine rotor shaft (e.g., rotor shaft 110) and to mate with adjacent components of other blades 200. The endwall 212 is intended to be located radially inboard of airfoil 202 and be formed in any complementary configuration to the rotor.

As described herein, blade 200 can include endwall 212 with a non-axisymmetric contour 218 proximate a junction 220 between endwall 212 and airfoil 202. That is, blade 200 includes an endwall 212 with a contour 218 proximate junction 220 between endwall 212 and airfoil 202 that improves flow area around airfoil 202 when compared with conventional blades. In one embodiment (as shown), non-axisymmetric contour 218 is positioned proximate leading edge 208.

With reference again to FIGS. 2 and 3, in various non-limiting embodiments, blade 200 can include a first stage (L0) blade, second stage (L1) blade, third stage (L2) blade, or fourth stage (L3) blade. In particular embodiments, blade 200 is a fourth stage (L3) blade. In various embodiments, turbine 108 can include a set of blades 200 in only the first stage (L0) of turbine 108, or in only second stage (L3), or in only third stage (L2), or in only fourth stage (L3) of turbine 108.

Figure 4:
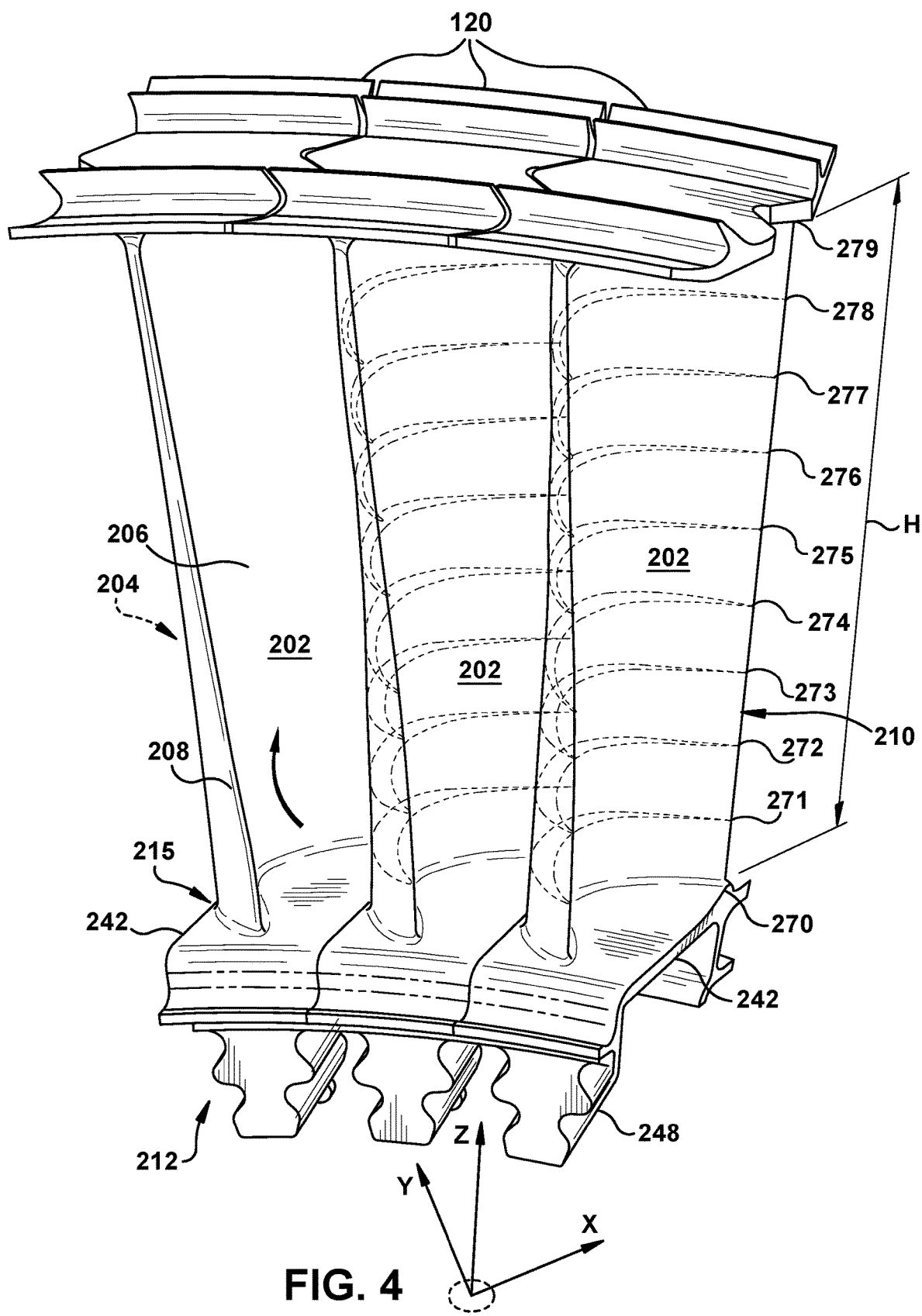
FIG. 4 illustrates a schematic three-dimensional view of a plurality of turbine blades, according to various embodiments of the disclosure.

With reference to FIGS. 3 and 4, in various embodiments, airfoil 202 may have an airfoil shape at 5-15% of height H to fit airfoil 202 on a straight platform 246 of endwall 212. A straight platform 246 refers to platform 246 having a suction side edge 240 and a pressure side edge 242 that are aligned with an axis of endwall 212, shown in a non-limiting configuration in FIG. 4 as a dovetail 248. In various particular embodiments, blade 200 may have an airfoil shape at 10% of height H to fit airfoil 202 on a straight platform 246.

In various particular embodiments, blade 200 may have an airfoil shape near fillet 214 that includes a tucked high "C" region 244 (FIG. 3). The high "C" region refers to the bulge of suction side 204 of airfoil 202. A tucked high "C" region 244 refers to a region of suction side 204 having a reduced bulge. In various particular embodiments, tucked high "C" region 244 near fillet 214 may cause increased cantilever of airfoil 202 at 10-15% height H. In various particular embodiments, tucked high "C" region 244 near fillet 214 may increase the size of airfoil 202 that is able to fit on straight platform 246.

Figure 5:
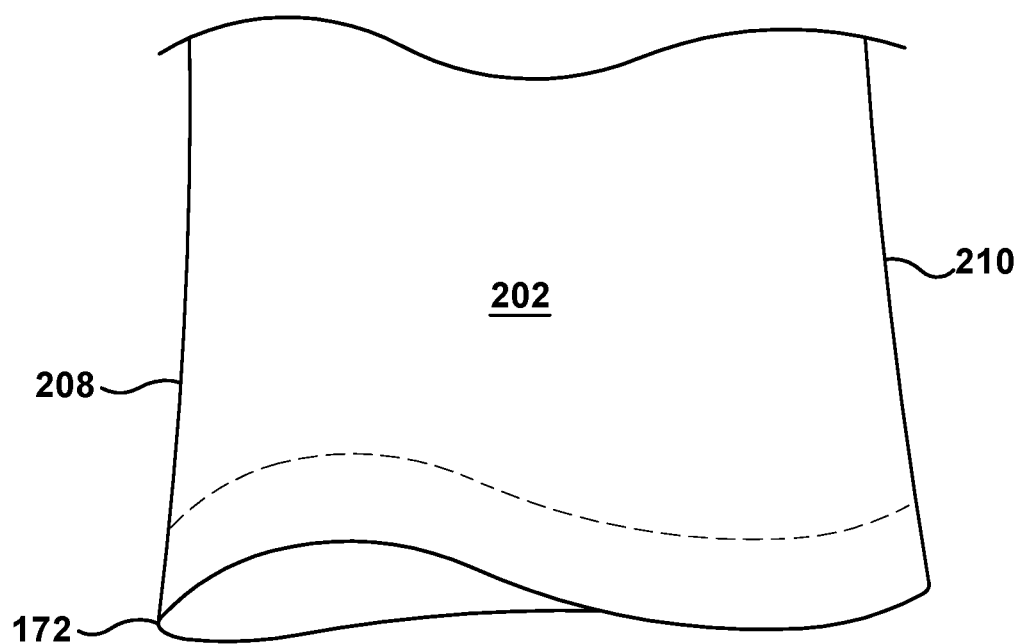
FIG. 5 illustrates a schematic view of an origin of an airfoil of a turbine blade, according to various embodiments of the disclosure.
Figure 6:
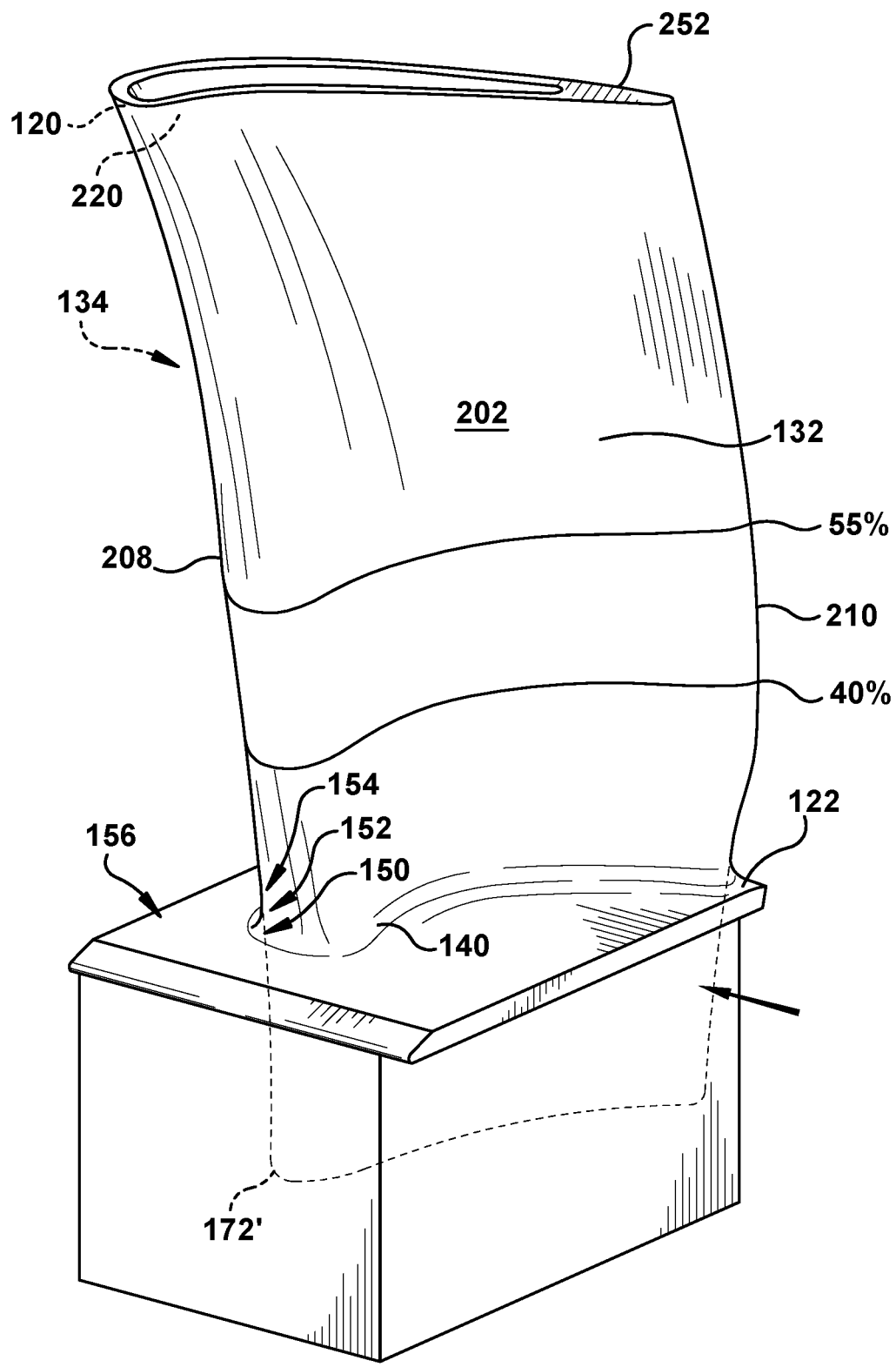
FIG. 6 illustrates a schematic three-dimensional view of an illustrative turbine blade, including an airfoil according to various embodiments of the disclosure.

FIG. 6 shows a perspective view of a blade 200 that employs only a selected portion of Cartesian coordinate values of X, Y and Z set forth in TABLE I. For example, a blade 200 may be made using coordinate values that represent a selected section of the airfoil 202 from 45% of the height to 60% of the height. As shown in FIGS. 5 and 6, a blade 200 that has, for example, a shorter airfoil 202 may have an imaginary origin 172 and 172' below the surface 224 of endwall 212 that dictates where the selected portion of the Cartesian coordinate values of X, Y and Z set forth in TABLE I are employed.

With reference to FIGS. 4 and 6, a plurality of cross sections 270-279 along height H, including tip end 252, correspond to Z coordinate values of chord lines, and each cross section 270-279 and 252 of airfoil 202 can be described by a respective set of X and Y coordinates. For example, 100 points can be listed for each of the pressure side and the suction side that define each cross section 270-279 and 252, though it should be apparent that more or fewer points can be used for the respective sides of each cross section, and more or fewer cross sections can be used, as may be desired and/or appropriate.

The X, Y, and Z coordinate values in TABLE I have been expressed in normalized or non-dimensionalized form in values of from 0 to 1 (percentages), but it should be apparent that any or all of the coordinate values could instead be expressed in distance units so long as the percentages and proportions are maintained. To convert an X, Y or Z value of TABLE I to a respective X, Y or Z coordinate value in units of distance, such as inches or meters, the non-dimensional X, Y or Z value given in TABLE I can be multiplied by an airfoil height H of airfoil 202 in such units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the nominal airfoil profile.

The values in TABLE I are non-dimensionalized percentages generated and shown to three decimal places for determining the nominal profile of an airfoil 202 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I, particularly to the X and Y values therein. For example, a tolerance of about 10-20 percent of a thickness of trailing edge in a direction normal to any surface location along the airfoil profile can define an airfoil profile envelope for a blade airfoil design at cold or room temperature. In other words, a distance of about 10-20 percent of a thickness of the trailing edge in a direction normal to any surface location along the airfoil profile can define a range of variation between measured points on an actual airfoil surface and ideal positions of those points, particularly at a cold or room temperature, as embodied by the disclosure. The blade airfoil configuration, as embodied herein, is robust to this range of variation without impairment of mechanical and aerodynamic functions.

Likewise, the profile and/or configuration can be scaled up or down, such as geometrically, without impairment of operation. Such scaling can be facilitated by multiplying the normalized/non-dimensionalized percentage values by a common scaling factor, which may be a larger or smaller number of distance units than might have originally been used for a blade of a given height. For example, the non-dimensionalized percentage values in TABLE I, particularly the X and Y values, could be multiplied uniformly by a scaling factor of 2, 0.5, or any other desired scaling factor. In various embodiments, the X, Y, and Z distances are scalable as a function of the same constant or number to provide a scaled up or scaled down airfoil. Alternatively, the values could be multiplied by a larger or smaller desired height. As referenced herein, the origin of the X, Y, Z coordinate system is the root of the leading edge junction 220 of airfoil 202 with a top surface 224 of endwall 212.

While the Cartesian values in TABLE I provide Z coordinate values at increments between 0% and 100%, only a portion of Cartesian coordinate values set forth in TABLE I may be employed. In one non-limiting example, with reference to FIG. 4, the airfoil profile sections may use a portion of Z coordinate values defined within 10% and 90% of the height of the airfoil, i.e., from cross sections 271 to 279. In another example, the airfoil profile sections may use a portion of the Cartesian coordinate values defined within 5% and 95% of the height of the airfoil, i.e., from a plane midway between cross section 270 and cross section 271 to a plane midway between cross section 279 and cross section 252 defined by tip end 252. Any portion of Cartesian coordinate values of X, Y and Z set forth in TABLE I may be employed, e.g., from 20% to 30%, 37%-50%, etc.

TABLE I

[non-dimensionalized percentages]

| N | Location | X | Y | Z |
|---|---|---|---|---|
| 1 | Suction-Side | 0.0 | 0.0 | 0.0 |
| 2 | Suction-Side | 0.114 | 0.442 | 0.0 |
| 3 | Suction-Side | 0.435 | 0.786 | 0.0 |
| 4 | Suction-Side | 0.805 | 1.076 | 0.0 |
| 5 | Suction-Side | 1.196 | 1.336 | 0.0 |
| 6 | Suction-Side | 1.598 | 1.576 | 0.0 |
| 7 | Suction-Side | 2.006 | 1.803 | 0.0 |
| 8 | Suction-Side | 2.419 | 2.020 | 0.0 |
| 9 | Suction-Side | 2.837 | 2.229 | 0.0 |
| 10 | Suction-Side | 3.260 | 2.429 | 0.0 |
| 11 | Suction-Side | 3.687 | 2.620 | 0.0 |
| 12 | Suction-Side | 4.118 | 2.804 | 0.0 |
| 13 | Suction-Side | 4.552 | 2.979 | 0.0 |
| 14 | Suction-Side | 4.989 | 3.146 | 0.0 |
| 15 | Suction-Side | 5.426 | 3.306 | 0.0 |
| 16 | Suction-Side | 5.866 | 3.458 | 0.0 |
| 17 | Suction-Side | 6.307 | 3.603 | 0.0 |
| 18 | Suction-Side | 6.750 | 3.741 | 0.0 |
| 19 | Suction-Side | 7.194 | 3.873 | 0.0 |
| 20 | Suction-Side | 7.640 | 3.997 | 0.0 |
| 21 | Suction-Side | 8.087 | 4.116 | 0.0 |
| 22 | Suction-Side | 8.535 | 4.228 | 0.0 |
| 23 | Suction-Side | 8.985 | 4.335 | 0.0 |
| 24 | Suction-Side | 9.436 | 4.436 | 0.0 |
| 25 | Suction-Side | 9.889 | 4.531 | 0.0 |
| 26 | Suction-Side | 10.342 | 4.621 | 0.0 |
| 27 | Suction-Side | 10.796 | 4.705 | 0.0 |
| 28 | Suction-Side | 11.252 | 4.785 | 0.0 |
| 29 | Suction-Side | 11.709 | 4.860 | 0.0 |
| 30 | Suction-Side | 12.167 | 4.929 | 0.0 |
| 31 | Suction-Side | 12.625 | 4.994 | 0.0 |
| 32 | Suction-Side | 13.085 | 5.054 | 0.0 |
| 33 | Suction-Side | 13.546 | 5.109 | 0.0 |
| 34 | Suction-Side | 14.008 | 5.159 | 0.0 |
| 35 | Suction-Side | 14.472 | 5.205 | 0.0 |
| 36 | Suction-Side | 14.936 | 5.246 | 0.0 |
| 37 | Suction-Side | 15.401 | 5.282 | 0.0 |
| 38 | Suction-Side | 15.867 | 5.314 | 0.0 |
| 39 | Suction-Side | 16.332 | 5.341 | 0.0 |
| 40 | Suction-Side | 16.797 | 5.363 | 0.0 |
| 41 | Suction-Side | 17.263 | 5.381 | 0.0 |
| 42 | Suction-Side | 17.728 | 5.393 | 0.0 |
| 43 | Suction-Side | 18.194 | 5.401 | 0.0 |
| 44 | Suction-Side | 18.659 | 5.405 | 0.0 |
| 45 | Suction-Side | 19.125 | 5.403 | 0.0 |
| 46 | Suction-Side | 19.591 | 5.397 | 0.0 |
| 47 | Suction-Side | 20.057 | 5.385 | 0.0 |
| 48 | Suction-Side | 20.523 | 5.369 | 0.0 |
| 49 | Suction-Side | 20.989 | 5.347 | 0.0 |
| 50 | Suction-Side | 21.455 | 5.320 | 0.0 |
| 51 | Suction-Side | 21.920 | 5.288 | 0.0 |
| 52 | Suction-Side | 22.385 | 5.250 | 0.0 |
| 53 | Suction-Side | 22.849 | 5.208 | 0.0 |
| 54 | Suction-Side | 23.313 | 5.159 | 0.0 |
| 55 | Suction-Side | 23.777 | 5.105 | 0.0 |
| 56 | Suction-Side | 24.240 | 5.045 | 0.0 |
| 57 | Suction-Side | 24.702 | 4.978 | 0.0 |
| 58 | Suction-Side | 25.162 | 4.906 | 0.0 |
| 59 | Suction-Side | 25.622 | 4.827 | 0.0 |
| 60 | Suction-Side | 26.081 | 4.742 | 0.0 |
| 61 | Suction-Side | 26.538 | 4.650 | 0.0 |
| 62 | Suction-Side | 26.994 | 4.552 | 0.0 |
| 63 | Suction-Side | 27.449 | 4.447 | 0.0 |
| 64 | Suction-Side | 27.901 | 4.335 | 0.0 |
| 65 | Suction-Side | 28.353 | 4.216 | 0.0 |
| 66 | Suction-Side | 28.801 | 4.089 | 0.0 |
| 67 | Suction-Side | 29.247 | 3.954 | 0.0 |
| 68 | Suction-Side | 29.692 | 3.812 | 0.0 |
| 69 | Suction-Side | 30.133 | 3.661 | 0.0 |
| 70 | Suction-Side | 30.571 | 3.501 | 0.0 |
| 71 | Suction-Side | 31.003 | 3.332 | 0.0 |
| 72 | Suction-Side | 31.430 | 3.154 | 0.0 |
| 73 | Suction-Side | 31.852 | 2.966 | 0.0 |
| 74 | Suction-Side | 32.268 | 2.767 | 0.0 |
| 75 | Suction-Side | 32.678 | 2.558 | 0.0 |
| 76 | Suction-Side | 33.081 | 2.336 | 0.0 |

TABLE I-continued

[non-dimensionalized percentages]

| N | Location | X | Y | Z |
|---|---|---|---|---|
| 77 | Suction-Side | 33.478 | 2.102 | 0.0 |
| 78 | Suction-Side | 33.867 | 1.854 | 0.0 |
| 79 | Suction-Side | 34.249 | 1.594 | 0.0 |
| 80 | Suction-Side | 34.624 | 1.322 | 0.0 |
| 81 | Suction-Side | 34.992 | 1.036 | 0.0 |
| 82 | Suction-Side | 35.353 | 0.738 | 0.0 |
| 83 | Suction-Side | 35.705 | 0.428 | 0.0 |
| 84 | Suction-Side | 36.048 | 0.109 | 0.0 |
| 85 | Suction-Side | 36.383 | −0.217 | 0.0 |
| 86 | Suction-Side | 36.714 | −0.547 | 0.0 |
| 87 | Suction-Side | 37.042 | −0.881 | 0.0 |
| 88 | Suction-Side | 37.367 | −1.218 | 0.0 |
| 89 | Suction-Side | 37.689 | −1.558 | 0.0 |
| 90 | Suction-Side | 38.008 | −1.899 | 0.0 |
| 91 | Suction-Side | 38.326 | −2.243 | 0.0 |
| 92 | Suction-Side | 38.643 | −2.588 | 0.0 |
| 93 | Suction-Side | 38.959 | −2.934 | 0.0 |
| 94 | Suction-Side | 39.274 | −3.280 | 0.0 |
| 95 | Suction-Side | 39.587 | −3.629 | 0.0 |
| 96 | Suction-Side | 39.900 | −3.976 | 0.0 |
| 97 | Suction-Side | 39.986 | −4.082 | 0.0 |
| 98 | Suction-Side | 40.037 | −4.207 | 0.0 |
| 99 | Suction-Side | 40.027 | −4.341 | 0.0 |
| 100 | Suction-Side | 39.958 | −4.457 | 0.0 |
| 101 | Pressure-Side | 0.0 | 0.0 | 0.0 |
| 102 | Pressure-Side | 0.353 | −0.218 | 0.0 |
| 103 | Pressure-Side | 0.784 | −0.242 | 0.0 |
| 104 | Pressure-Side | 1.212 | −0.194 | 0.0 |
| 105 | Pressure-Side | 1.638 | −0.125 | 0.0 |
| 106 | Pressure-Side | 2.064 | −0.052 | 0.0 |
| 107 | Pressure-Side | 2.489 | 0.020 | 0.0 |
| 108 | Pressure-Side | 2.915 | 0.090 | 0.0 |
| 109 | Pressure-Side | 3.341 | 0.160 | 0.0 |
| 110 | Pressure-Side | 3.767 | 0.227 | 0.0 |
| 111 | Pressure-Side | 4.194 | 0.293 | 0.0 |
| 112 | Pressure-Side | 4.621 | 0.358 | 0.0 |
| 113 | Pressure-Side | 5.047 | 0.422 | 0.0 |
| 114 | Pressure-Side | 5.475 | 0.485 | 0.0 |
| 115 | Pressure-Side | 5.902 | 0.547 | 0.0 |
| 116 | Pressure-Side | 6.329 | 0.607 | 0.0 |
| 117 | Pressure-Side | 6.757 | 0.666 | 0.0 |
| 118 | Pressure-Side | 7.184 | 0.723 | 0.0 |
| 119 | Pressure-Side | 7.612 | 0.780 | 0.0 |
| 120 | Pressure-Side | 8.041 | 0.834 | 0.0 |
| 121 | Pressure-Side | 8.469 | 0.887 | 0.0 |
| 122 | Pressure-Side | 8.898 | 0.939 | 0.0 |
| 123 | Pressure-Side | 9.326 | 0.989 | 0.0 |
| 124 | Pressure-Side | 9.755 | 1.038 | 0.0 |
| 125 | Pressure-Side | 10.184 | 1.085 | 0.0 |
| 126 | Pressure-Side | 10.613 | 1.131 | 0.0 |
| 127 | Pressure-Side | 11.043 | 1.175 | 0.0 |
| 128 | Pressure-Side | 11.472 | 1.217 | 0.0 |
| 129 | Pressure-Side | 11.902 | 1.257 | 0.0 |
| 130 | Pressure-Side | 12.332 | 1.296 | 0.0 |
| 131 | Pressure-Side | 12.762 | 1.332 | 0.0 |
| 132 | Pressure-Side | 13.192 | 1.367 | 0.0 |
| 133 | Pressure-Side | 13.623 | 1.399 | 0.0 |
| 134 | Pressure-Side | 14.053 | 1.430 | 0.0 |
| 135 | Pressure-Side | 14.484 | 1.459 | 0.0 |
| 136 | Pressure-Side | 14.914 | 1.486 | 0.0 |
| 137 | Pressure-Side | 15.345 | 1.510 | 0.0 |
| 138 | Pressure-Side | 15.776 | 1.532 | 0.0 |
| 139 | Pressure-Side | 16.208 | 1.552 | 0.0 |
| 140 | Pressure-Side | 16.639 | 1.569 | 0.0 |
| 141 | Pressure-Side | 17.070 | 1.584 | 0.0 |
| 142 | Pressure-Side | 17.502 | 1.596 | 0.0 |
| 143 | Pressure-Side | 17.933 | 1.605 | 0.0 |
| 144 | Pressure-Side | 18.365 | 1.612 | 0.0 |
| 145 | Pressure-Side | 18.796 | 1.616 | 0.0 |
| 146 | Pressure-Side | 19.228 | 1.617 | 0.0 |
| 147 | Pressure-Side | 19.659 | 1.615 | 0.0 |
| 148 | Pressure-Side | 20.091 | 1.610 | 0.0 |
| 149 | Pressure-Side | 20.523 | 1.602 | 0.0 |
| 150 | Pressure-Side | 20.954 | 1.590 | 0.0 |
| 151 | Pressure-Side | 21.386 | 1.575 | 0.0 |
| 152 | Pressure-Side | 21.817 | 1.557 | 0.0 |
| 153 | Pressure-Side | 22.248 | 1.535 | 0.0 |
| 154 | Pressure-Side | 22.680 | 1.509 | 0.0 |
| 155 | Pressure-Side | 23.111 | 1.479 | 0.0 |
| 156 | Pressure-Side | 23.542 | 1.445 | 0.0 |
| 157 | Pressure-Side | 23.973 | 1.407 | 0.0 |
| 158 | Pressure-Side | 24.403 | 1.365 | 0.0 |
| 159 | Pressure-Side | 24.832 | 1.319 | 0.0 |
| 160 | Pressure-Side | 25.261 | 1.268 | 0.0 |
| 161 | Pressure-Side | 25.690 | 1.212 | 0.0 |
| 162 | Pressure-Side | 26.118 | 1.152 | 0.0 |
| 163 | Pressure-Side | 26.545 | 1.087 | 0.0 |
| 164 | Pressure-Side | 26.972 | 1.017 | 0.0 |
| 165 | Pressure-Side | 27.398 | 0.943 | 0.0 |
| 166 | Pressure-Side | 27.823 | 0.863 | 0.0 |
| 167 | Pressure-Side | 28.246 | 0.777 | 0.0 |
| 168 | Pressure-Side | 28.668 | 0.687 | 0.0 |
| 169 | Pressure-Side | 29.089 | 0.591 | 0.0 |
| 170 | Pressure-Side | 29.509 | 0.489 | 0.0 |
| 171 | Pressure-Side | 29.928 | 0.382 | 0.0 |
| 172 | Pressure-Side | 30.345 | 0.269 | 0.0 |
| 173 | Pressure-Side | 30.761 | 0.150 | 0.0 |
| 174 | Pressure-Side | 31.174 | 0.026 | 0.0 |
| 175 | Pressure-Side | 31.585 | −0.104 | 0.0 |
| 176 | Pressure-Side | 31.994 | −0.239 | 0.0 |
| 177 | Pressure-Side | 32.399 | −0.381 | 0.0 |
| 178 | Pressure-Side | 32.802 | −0.528 | 0.0 |
| 179 | Pressure-Side | 33.203 | −0.682 | 0.0 |
| 180 | Pressure-Side | 33.600 | −0.842 | 0.0 |
| 181 | Pressure-Side | 33.995 | −1.008 | 0.0 |
| 182 | Pressure-Side | 34.387 | −1.181 | 0.0 |
| 183 | Pressure-Side | 34.776 | −1.361 | 0.0 |
| 184 | Pressure- Side | 35.162 | −1.547 | 0.0 |
| 185 | Pressure-Side | 35.545 | −1.742 | 0.0 |
| 186 | Pressure-Side | 35.924 | −1.943 | 0.0 |
| 187 | Pressure-Side | 36.300 | −2.152 | 0.0 |
| 188 | Pressure-Side | 36.672 | −2.369 | 0.0 |
| 189 | Pressure-Side | 37.041 | −2.594 | 0.0 |
| 190 | Pressure-Side | 37.406 | −2.829 | 0.0 |
| 191 | Pressure-Side | 37.766 | −3.071 | 0.0 |
| 192 | Pressure-Side | 38.121 | −3.321 | 0.0 |
| 193 | Pressure-Side | 38.469 | −3.579 | 0.0 |
| 194 | Pressure-Side | 38.812 | −3.845 | 0.0 |
| 195 | Pressure-Side | 39.149 | −4.118 | 0.0 |
| 196 | Pressure-Side | 39.478 | −4.402 | 0.0 |
| 197 | Pressure-Side | 39.584 | −4.486 | 0.0 |
| 198 | Pressure-Side | 39.708 | −4.539 | 0.0 |
| 199 | Pressure-Side | 39.843 | −4.528 | 0.0 |
| 200 | Pressure-Side | 39.958 | −4.457 | 0.0 |
| 1 | Suction-Side | 2.449 | 1.326 | 10.0 |
| 2 | Suction-Side | 2.566 | 1.720 | 10.0 |
| 3 | Suction-Side | 2.870 | 2.022 | 10.0 |
| 4 | Suction-Side | 3.216 | 2.273 | 10.0 |
| 5 | Suction-Side | 3.578 | 2.502 | 10.0 |
| 6 | Suction-Side | 3.946 | 2.722 | 10.0 |
| 7 | Suction-Side | 4.318 | 2.933 | 10.0 |
| 8 | Suction-Side | 4.697 | 3.134 | 10.0 |
| 9 | Suction-Side | 5.080 | 3.324 | 10.0 |
| 10 | Suction-Side | 5.468 | 3.506 | 10.0 |
| 11 | Suction-Side | 5.859 | 3.679 | 10.0 |
| 12 | Suction-Side | 6.255 | 3.844 | 10.0 |
| 13 | Suction-Side | 6.653 | 4.0 | 10.0 |
| 14 | Suction-Side | 7.055 | 4.149 | 10.0 |
| 15 | Suction-Side | 7.460 | 4.289 | 10.0 |
| 16 | Suction-Side | 7.867 | 4.422 | 10.0 |
| 17 | Suction-Side | 8.277 | 4.547 | 10.0 |
| 18 | Suction-Side | 8.689 | 4.664 | 10.0 |
| 19 | Suction-Side | 9.102 | 4.774 | 10.0 |
| 20 | Suction-Side | 9.518 | 4.877 | 10.0 |
| 21 | Suction-Side | 9.936 | 4.972 | 10.0 |
| 22 | Suction-Side | 10.355 | 5.061 | 10.0 |
| 23 | Suction-Side | 10.775 | 5.143 | 10.0 |
| 24 | Suction-Side | 11.197 | 5.218 | 10.0 |
| 25 | Suction-Side | 11.619 | 5.287 | 10.0 |
| 26 | Suction-Side | 12.043 | 5.349 | 10.0 |
| 27 | Suction-Side | 12.468 | 5.405 | 10.0 |
| 28 | Suction-Side | 12.893 | 5.455 | 10.0 |

TABLE I-continued

[non-dimensionalized percentages]

| N | Location | X | Y | Z |
|---|---|---|---|---|
| 29 | Suction-Side | 13.319 | 5.499 | 10.0 |
| 30 | Suction-Side | 13.745 | 5.537 | 10.0 |
| 31 | Suction-Side | 14.173 | 5.569 | 10.0 |
| 32 | Suction-Side | 14.600 | 5.595 | 10.0 |
| 33 | Suction-Side | 15.028 | 5.615 | 10.0 |
| 34 | Suction-Side | 15.456 | 5.629 | 10.0 |
| 35 | Suction-Side | 15.884 | 5.638 | 10.0 |
| 36 | Suction-Side | 16.312 | 5.641 | 10.0 |
| 37 | Suction-Side | 16.741 | 5.638 | 10.0 |
| 38 | Suction-Side | 17.169 | 5.629 | 10.0 |
| 39 | Suction-Side | 17.597 | 5.615 | 10.0 |
| 40 | Suction-Side | 18.025 | 5.596 | 10.0 |
| 41 | Suction-Side | 18.452 | 5.571 | 10.0 |
| 42 | Suction-Side | 18.879 | 5.541 | 10.0 |
| 43 | Suction-Side | 19.306 | 5.504 | 10.0 |
| 44 | Suction-Side | 19.732 | 5.462 | 10.0 |
| 45 | Suction-Side | 20.158 | 5.415 | 10.0 |
| 46 | Suction-Side | 20.583 | 5.362 | 10.0 |
| 47 | Suction-Side | 21.007 | 5.303 | 10.0 |
| 48 | Suction-Side | 21.431 | 5.238 | 10.0 |
| 49 | Suction-Side | 21.853 | 5.167 | 10.0 |
| 50 | Suction-Side | 22.274 | 5.091 | 10.0 |
| 51 | Suction-Side | 22.695 | 5.009 | 10.0 |
| 52 | Suction-Side | 23.114 | 4.921 | 10.0 |
| 53 | Suction-Side | 23.532 | 4.827 | 10.0 |
| 54 | Suction-Side | 23.948 | 4.727 | 10.0 |
| 55 | Suction-Side | 24.363 | 4.621 | 10.0 |
| 56 | Suction-Side | 24.776 | 4.508 | 10.0 |
| 57 | Suction-Side | 25.188 | 4.389 | 10.0 |
| 58 | Suction-Side | 25.597 | 4.264 | 10.0 |
| 59 | Suction-Side | 26.004 | 4.131 | 10.0 |
| 60 | Suction-Side | 26.409 | 3.993 | 10.0 |
| 61 | Suction-Side | 26.812 | 3.847 | 10.0 |
| 62 | Suction-Side | 27.213 | 3.695 | 10.0 |
| 63 | Suction-Side | 27.610 | 3.536 | 10.0 |
| 64 | Suction-Side | 28.005 | 3.370 | 10.0 |
| 65 | Suction-Side | 28.397 | 3.196 | 10.0 |
| 66 | Suction-Side | 28.785 | 3.016 | 10.0 |
| 67 | Suction-Side | 29.169 | 2.827 | 10.0 |
| 68 | Suction-Side | 29.550 | 2.631 | 10.0 |
| 69 | Suction-Side | 29.927 | 2.427 | 10.0 |
| 70 | Suction-Side | 30.299 | 2.215 | 10.0 |
| 71 | Suction-Side | 30.666 | 1.995 | 10.0 |
| 72 | Suction-Side | 31.027 | 1.765 | 10.0 |
| 73 | Suction-Side | 31.383 | 1.527 | 10.0 |
| 74 | Suction-Side | 31.733 | 1.279 | 10.0 |
| 75 | Suction-Side | 32.075 | 1.022 | 10.0 |
| 76 | Suction-Side | 32.410 | 0.755 | 10.0 |
| 77 | Suction-Side | 32.736 | 0.478 | 10.0 |
| 78 | Suction-Side | 33.055 | 0.192 | 10.0 |
| 79 | Suction-Side | 33.367 | −0.102 | 10.0 |
| 80 | Suction-Side | 33.674 | −0.400 | 10.0 |
| 81 | Suction-Side | 33.977 | −0.704 | 10.0 |
| 82 | Suction-Side | 34.275 | −1.011 | 10.0 |
| 83 | Suction-Side | 34.570 | −1.322 | 10.0 |
| 84 | Suction-Side | 34.861 | −1.635 | 10.0 |
| 85 | Suction-Side | 35.150 | −1.951 | 10.0 |
| 86 | Suction-Side | 35.437 | −2.270 | 10.0 |
| 87 | Suction-Side | 35.722 | −2.589 | 10.0 |
| 88 | Suction-Side | 36.005 | −2.910 | 10.0 |
| 89 | Suction-Side | 36.287 | −3.233 | 10.0 |
| 90 | Suction-Side | 36.568 | −3.556 | 10.0 |
| 91 | Suction-Side | 36.847 | −3.881 | 10.0 |
| 92 | Suction-Side | 37.125 | −4.206 | 10.0 |
| 93 | Suction-Side | 37.403 | −4.532 | 10.0 |
| 94 | Suction-Side | 37.680 | −4.859 | 10.0 |
| 95 | Suction-Side | 37.955 | −5.187 | 10.0 |
| 96 | Suction-Side | 38.231 | −5.515 | 10.0 |
| 97 | Suction-Side | 38.313 | −5.614 | 10.0 |
| 98 | Suction-Side | 38.376 | −5.725 | 10.0 |
| 99 | Suction-Side | 38.375 | −5.852 | 10.0 |
| 100 | Suction-Side | 38.308 | −5.961 | 10.0 |
| 101 | Pressure-Side | 2.449 | 1.326 | 10.0 |
| 102 | Pressure-Side | 2.756 | 1.101 | 10.0 |
| 103 | Pressure-Side | 3.148 | 1.049 | 10.0 |
| 104 | Pressure-Side | 3.544 | 1.063 | 10.0 |
| 105 | Pressure-Side | 3.938 | 1.103 | 10.0 |
| 106 | Pressure-Side | 4.331 | 1.148 | 10.0 |
| 107 | Pressure-Side | 4.725 | 1.192 | 10.0 |
| 108 | Pressure-Side | 5.118 | 1.235 | 10.0 |
| 109 | Pressure-Side | 5.512 | 1.278 | 10.0 |
| 110 | Pressure-Side | 5.906 | 1.320 | 10.0 |
| 111 | Pressure-Side | 6.300 | 1.362 | 10.0 |
| 112 | Pressure-Side | 6.694 | 1.403 | 10.0 |
| 113 | Pressure-Side | 7.087 | 1.443 | 10.0 |
| 114 | Pressure-Side | 7.481 | 1.483 | 10.0 |
| 115 | Pressure-Side | 7.876 | 1.521 | 10.0 |
| 116 | Pressure-Side | 8.270 | 1.559 | 10.0 |
| 117 | Pressure-Side | 8.664 | 1.596 | 10.0 |
| 118 | Pressure-Side | 9.058 | 1.632 | 10.0 |
| 119 | Pressure-Side | 9.453 | 1.666 | 10.0 |
| 120 | Pressure-Side | 9.848 | 1.700 | 10.0 |
| 121 | Pressure-Side | 10.242 | 1.732 | 10.0 |
| 122 | Pressure-Side | 10.637 | 1.763 | 10.0 |
| 123 | Pressure-Side | 11.032 | 1.792 | 10.0 |
| 124 | Pressure-Side | 11.427 | 1.821 | 10.0 |
| 125 | Pressure-Side | 11.822 | 1.848 | 10.0 |
| 126 | Pressure-Side | 12.217 | 1.873 | 10.0 |
| 127 | Pressure-Side | 12.612 | 1.896 | 10.0 |
| 128 | Pressure-Side | 13.008 | 1.918 | 10.0 |
| 129 | Pressure-Side | 13.403 | 1.938 | 10.0 |
| 130 | Pressure-Side | 13.799 | 1.956 | 10.0 |
| 131 | Pressure-Side | 14.195 | 1.972 | 10.0 |
| 132 | Pressure-Side | 14.590 | 1.986 | 10.0 |
| 133 | Pressure-Side | 14.986 | 1.998 | 10.0 |
| 134 | Pressure-Side | 15.382 | 2.007 | 10.0 |
| 135 | Pressure-Side | 15.778 | 2.014 | 10.0 |
| 136 | Pressure-Side | 16.174 | 2.019 | 10.0 |
| 137 | Pressure-Side | 16.570 | 2.021 | 10.0 |
| 138 | Pressure-Side | 16.966 | 2.020 | 10.0 |
| 139 | Pressure-Side | 17.362 | 2.017 | 10.0 |
| 140 | Pressure-Side | 17.758 | 2.011 | 10.0 |
| 141 | Pressure-Side | 18.154 | 2.002 | 10.0 |
| 142 | Pressure-Side | 18.550 | 1.989 | 10.0 |
| 143 | Pressure-Side | 18.945 | 1.973 | 10.0 |
| 144 | Pressure-Side | 19.341 | 1.954 | 10.0 |
| 145 | Pressure-Side | 19.736 | 1.932 | 10.0 |
| 146 | Pressure-Side | 20.131 | 1.906 | 10.0 |
| 147 | Pressure-Side | 20.526 | 1.875 | 10.0 |
| 148 | Pressure-Side | 20.921 | 1.841 | 10.0 |
| 149 | Pressure-Side | 21.315 | 1.803 | 10.0 |
| 150 | Pressure-Side | 21.709 | 1.761 | 10.0 |
| 151 | Pressure-Side | 22.102 | 1.714 | 10.0 |
| 152 | Pressure-Side | 22.495 | 1.663 | 10.0 |
| 153 | Pressure-Side | 22.887 | 1.607 | 10.0 |
| 154 | Pressure-Side | 23.278 | 1.547 | 10.0 |
| 155 | Pressure-Side | 23.669 | 1.482 | 10.0 |
| 156 | Pressure-Side | 24.059 | 1.412 | 10.0 |
| 157 | Pressure-Side | 24.447 | 1.336 | 10.0 |
| 158 | Pressure-Side | 24.835 | 1.256 | 10.0 |
| 159 | Pressure-Side | 25.222 | 1.170 | 10.0 |
| 160 | Pressure-Side | 25.607 | 1.078 | 10.0 |
| 161 | Pressure-Side | 25.991 | 0.981 | 10.0 |
| 162 | Pressure-Side | 26.373 | 0.878 | 10.0 |
| 163 | Pressure-Side | 26.754 | 0.769 | 10.0 |
| 164 | Pressure-Side | 27.133 | 0.655 | 10.0 |
| 165 | Pressure-Side | 27.510 | 0.535 | 10.0 |
| 166 | Pressure-Side | 27.886 | 0.409 | 10.0 |
| 167 | Pressure-Side | 28.259 | 0.277 | 10.0 |
| 168 | Pressure-Side | 28.631 | 0.139 | 10.0 |
| 169 | Pressure-Side | 28.999 | −0.005 | 10.0 |
| 170 | Pressure-Side | 29.366 | −0.154 | 10.0 |
| 171 | Pressure-Side | 29.730 | −0.309 | 10.0 |
| 172 | Pressure-Side | 30.092 | −0.470 | 10.0 |
| 173 | Pressure-Side | 30.452 | −0.637 | 10.0 |
| 174 | Pressure-Side | 30.809 | −0.808 | 10.0 |
| 175 | Pressure-Side | 31.162 | −0.986 | 10.0 |
| 176 | Pressure-Side | 31.513 | −1.170 | 10.0 |
| 177 | Pressure-Side | 31.862 | −1.358 | 10.0 |
| 178 | Pressure-Side | 32.207 | −1.552 | 10.0 |
| 179 | Pressure-Side | 32.549 | −1.751 | 10.0 |
| 180 | Pressure-Side | 32.888 | −1.956 | 10.0 |

TABLE I-continued

[non-dimensionalized percentages]

| N | Location | X | Y | Z |
|---|---|---|---|---|
| 181 | Pressure-Side | 33.224 | −2.165 | 10.0 |
| 182 | Pressure-Side | 33.557 | −2.379 | 10.0 |
| 183 | Pressure-Side | 33.887 | −2.599 | 10.0 |
| 184 | Pressure-Side | 34.213 | −2.823 | 10.0 |
| 185 | Pressure-Side | 34.537 | −3.052 | 10.0 |
| 186 | Pressure-Side | 34.856 | −3.286 | 10.0 |
| 187 | Pressure-Side | 35.173 | −3.524 | 10.0 |
| 188 | Pressure-Side | 35.486 | −3.766 | 10.0 |
| 189 | Pressure-Side | 35.796 | −4.013 | 10.0 |
| 190 | Pressure-Side | 36.102 | −4.264 | 10.0 |
| 191 | Pressure-Side | 36.405 | −4.519 | 10.0 |
| 192 | Pressure-Side | 36.705 | −4.778 | 10.0 |
| 193 | Pressure-Side | 37.001 | −5.040 | 10.0 |
| 194 | Pressure-Side | 37.294 | −5.307 | 10.0 |
| 195 | Pressure-Side | 37.584 | −5.576 | 10.0 |
| 196 | Pressure-Side | 37.870 | −5.850 | 10.0 |
| 197 | Pressure-Side | 37.963 | −5.939 | 10.0 |
| 198 | Pressure-Side | 38.068 | −6.012 | 10.0 |
| 199 | Pressure-Side | 38.195 | −6.020 | 10.0 |
| 200 | Pressure-Side | 38.308 | −5.961 | 10.0 |
| 1 | Suction-Side | 4.632 | 2.335 | 20.0 |
| 2 | Suction-Side | 4.759 | 2.687 | 20.0 |
| 3 | Suction-Side | 5.050 | 2.943 | 20.0 |
| 4 | Suction-Side | 5.377 | 3.154 | 20.0 |
| 5 | Suction-Side | 5.713 | 3.349 | 20.0 |
| 6 | Suction-Side | 6.053 | 3.539 | 20.0 |
| 7 | Suction-Side | 6.396 | 3.723 | 20.0 |
| 8 | Suction-Side | 6.742 | 3.899 | 20.0 |
| 9 | Suction-Side | 7.093 | 4.067 | 20.0 |
| 10 | Suction-Side | 7.447 | 4.229 | 20.0 |
| 11 | Suction-Side | 7.804 | 4.383 | 20.0 |
| 12 | Suction-Side | 8.164 | 4.531 | 20.0 |
| 13 | Suction-Side | 8.527 | 4.671 | 20.0 |
| 14 | Suction-Side | 8.892 | 4.805 | 20.0 |
| 15 | Suction-Side | 9.260 | 4.931 | 20.0 |
| 16 | Suction-Side | 9.630 | 5.050 | 20.0 |
| 17 | Suction-Side | 10.003 | 5.162 | 20.0 |
| 18 | Suction-Side | 10.377 | 5.266 | 20.0 |
| 19 | Suction-Side | 10.754 | 5.363 | 20.0 |
| 20 | Suction-Side | 11.132 | 5.453 | 20.0 |
| 21 | Suction-Side | 11.512 | 5.536 | 20.0 |
| 22 | Suction-Side | 11.894 | 5.612 | 20.0 |
| 23 | Suction-Side | 12.277 | 5.679 | 20.0 |
| 24 | Suction-Side | 12.661 | 5.740 | 20.0 |
| 25 | Suction-Side | 13.046 | 5.793 | 20.0 |
| 26 | Suction-Side | 13.433 | 5.839 | 20.0 |
| 27 | Suction-Side | 13.819 | 5.877 | 20.0 |
| 28 | Suction-Side | 14.207 | 5.908 | 20.0 |
| 29 | Suction-Side | 14.596 | 5.931 | 20.0 |
| 30 | Suction-Side | 14.984 | 5.947 | 20.0 |
| 31 | Suction-Side | 15.373 | 5.955 | 20.0 |
| 32 | Suction-Side | 15.762 | 5.956 | 20.0 |
| 33 | Suction-Side | 16.151 | 5.950 | 20.0 |
| 34 | Suction-Side | 16.540 | 5.936 | 20.0 |
| 35 | Suction-Side | 16.928 | 5.914 | 20.0 |
| 36 | Suction-Side | 17.316 | 5.885 | 20.0 |
| 37 | Suction-Side | 17.703 | 5.849 | 20.0 |
| 38 | Suction-Side | 18.090 | 5.806 | 20.0 |
| 39 | Suction-Side | 18.475 | 5.755 | 20.0 |
| 40 | Suction-Side | 18.860 | 5.697 | 20.0 |
| 41 | Suction-Side | 19.243 | 5.632 | 20.0 |
| 42 | Suction-Side | 19.626 | 5.560 | 20.0 |
| 43 | Suction-Side | 20.006 | 5.480 | 20.0 |
| 44 | Suction-Side | 20.386 | 5.394 | 20.0 |
| 45 | Suction-Side | 20.763 | 5.301 | 20.0 |
| 46 | Suction-Side | 21.139 | 5.201 | 20.0 |
| 47 | Suction-Side | 21.513 | 5.094 | 20.0 |
| 48 | Suction-Side | 21.885 | 4.981 | 20.0 |
| 49 | Suction-Side | 22.255 | 4.862 | 20.0 |
| 50 | Suction-Side | 22.623 | 4.735 | 20.0 |
| 51 | Suction-Side | 22.989 | 4.603 | 20.0 |
| 52 | Suction-Side | 23.352 | 4.464 | 20.0 |
| 53 | Suction-Side | 23.713 | 4.319 | 20.0 |
| 54 | Suction-Side | 24.071 | 4.167 | 20.0 |
| 55 | Suction-Side | 24.427 | 4.009 | 20.0 |
| 56 | Suction-Side | 24.780 | 3.846 | 20.0 |
| 57 | Suction-Side | 25.130 | 3.676 | 20.0 |
| 58 | Suction-Side | 25.477 | 3.500 | 20.0 |
| 59 | Suction-Side | 25.821 | 3.319 | 20.0 |
| 60 | Suction-Side | 26.161 | 3.131 | 20.0 |
| 61 | Suction-Side | 26.499 | 2.937 | 20.0 |
| 62 | Suction-Side | 26.832 | 2.738 | 20.0 |
| 63 | Suction-Side | 27.163 | 2.532 | 20.0 |
| 64 | Suction-Side | 27.489 | 2.321 | 20.0 |
| 65 | Suction-Side | 27.812 | 2.103 | 20.0 |
| 66 | Suction-Side | 28.130 | 1.880 | 20.0 |
| 67 | Suction-Side | 28.444 | 1.651 | 20.0 |
| 68 | Suction-Side | 28.754 | 1.415 | 20.0 |
| 69 | Suction-Side | 29.059 | 1.175 | 20.0 |
| 70 | Suction-Side | 29.360 | 0.928 | 20.0 |
| 71 | Suction-Side | 29.656 | 0.676 | 20.0 |
| 72 | Suction-Side | 29.949 | 0.419 | 20.0 |
| 73 | Suction-Side | 30.236 | 0.157 | 20.0 |
| 74 | Suction-Side | 30.520 | −0.109 | 20.0 |
| 75 | Suction-Side | 30.799 | −0.380 | 20.0 |
| 76 | Suction-Side | 31.074 | −0.655 | 20.0 |
| 77 | Suction-Side | 31.345 | −0.934 | 20.0 |
| 78 | Suction-Side | 31.611 | −1.217 | 20.0 |
| 79 | Suction-Side | 31.874 | −1.504 | 20.0 |
| 80 | Suction-Side | 32.134 | −1.793 | 20.0 |
| 81 | Suction-Side | 32.392 | −2.084 | 20.0 |
| 82 | Suction-Side | 32.648 | −2.377 | 20.0 |
| 83 | Suction-Side | 32.903 | −2.671 | 20.0 |
| 84 | Suction-Side | 33.156 | −2.966 | 20.0 |
| 85 | Suction-Side | 33.408 | −3.263 | 20.0 |
| 86 | Suction-Side | 33.659 | −3.560 | 20.0 |
| 87 | Suction-Side | 33.908 | −3.858 | 20.0 |
| 88 | Suction-Side | 34.157 | −4.157 | 20.0 |
| 89 | Suction-Side | 34.405 | −4.457 | 20.0 |
| 90 | Suction-Side | 34.651 | −4.758 | 20.0 |
| 91 | Suction-Side | 34.897 | −5.059 | 20.0 |
| 92 | Suction-Side | 35.142 | −5.361 | 20.0 |
| 93 | Suction-Side | 35.387 | −5.664 | 20.0 |
| 94 | Suction-Side | 35.630 | −5.967 | 20.0 |
| 95 | Suction-Side | 35.873 | −6.271 | 20.0 |
| 96 | Suction-Side | 36.115 | −6.576 | 20.0 |
| 97 | Suction-Side | 36.196 | −6.675 | 20.0 |
| 98 | Suction-Side | 36.257 | −6.785 | 20.0 |
| 99 | Suction-Side | 36.254 | −6.910 | 20.0 |
| 100 | Suction-Side | 36.186 | −7.016 | 20.0 |
| 101 | Pressure-Side | 4.632 | 2.335 | 20.0 |
| 102 | Pressure-Side | 4.899 | 2.105 | 20.0 |
| 103 | Pressure-Side | 5.250 | 2.030 | 20.0 |
| 104 | Pressure-Side | 5.605 | 2.015 | 20.0 |
| 105 | Pressure-Side | 5.961 | 2.025 | 20.0 |
| 106 | Pressure-Side | 6.318 | 2.041 | 20.0 |
| 107 | Pressure-Side | 6.675 | 2.060 | 20.0 |
| 108 | Pressure-Side | 7.032 | 2.079 | 20.0 |
| 109 | Pressure-Side | 7.389 | 2.099 | 20.0 |
| 110 | Pressure-Side | 7.746 | 2.121 | 20.0 |
| 111 | Pressure-Side | 8.102 | 2.145 | 20.0 |
| 112 | Pressure-Side | 8.459 | 2.169 | 20.0 |
| 113 | Pressure-Side | 8.816 | 2.193 | 20.0 |
| 114 | Pressure-Side | 9.172 | 2.217 | 20.0 |
| 115 | Pressure-Side | 9.529 | 2.241 | 20.0 |
| 116 | Pressure-Side | 9.885 | 2.265 | 20.0 |
| 117 | Pressure-Side | 10.242 | 2.288 | 20.0 |
| 118 | Pressure-Side | 10.599 | 2.310 | 20.0 |
| 119 | Pressure-Side | 10.956 | 2.332 | 20.0 |
| 120 | Pressure-Side | 11.313 | 2.352 | 20.0 |
| 121 | Pressure-Side | 11.669 | 2.370 | 20.0 |
| 122 | Pressure-Side | 12.026 | 2.387 | 20.0 |
| 123 | Pressure-Side | 12.383 | 2.402 | 20.0 |
| 124 | Pressure-Side | 12.740 | 2.415 | 20.0 |
| 125 | Pressure-Side | 13.098 | 2.426 | 20.0 |
| 126 | Pressure-Side | 13.455 | 2.434 | 20.0 |
| 127 | Pressure-Side | 13.812 | 2.440 | 20.0 |
| 128 | Pressure-Side | 14.170 | 2.443 | 20.0 |
| 129 | Pressure-Side | 14.527 | 2.443 | 20.0 |
| 130 | Pressure-Side | 14.884 | 2.440 | 20.0 |
| 131 | Pressure-Side | 15.242 | 2.435 | 20.0 |
| 132 | Pressure-Side | 15.599 | 2.426 | 20.0 |

TABLE I-continued

[non-dimensionalized percentages]

| N | Location | X | Y | Z |
|---|---|---|---|---|
| 133 | Pressure-Side | 15.956 | 2.414 | 20.0 |
| 134 | Pressure-Side | 16.312 | 2.398 | 20.0 |
| 135 | Pressure-Side | 16.669 | 2.378 | 20.0 |
| 136 | Pressure-Side | 17.025 | 2.355 | 20.0 |
| 137 | Pressure-Side | 17.381 | 2.328 | 20.0 |
| 138 | Pressure-Side | 17.737 | 2.297 | 20.0 |
| 139 | Pressure-Side | 18.093 | 2.262 | 20.0 |
| 140 | Pressure-Side | 18.448 | 2.223 | 20.0 |
| 141 | Pressure-Side | 18.803 | 2.180 | 20.0 |
| 142 | Pressure-Side | 19.157 | 2.133 | 20.0 |
| 143 | Pressure-Side | 19.511 | 2.082 | 20.0 |
| 144 | Pressure-Side | 19.863 | 2.026 | 20.0 |
| 145 | Pressure-Side | 20.215 | 1.965 | 20.0 |
| 146 | Pressure-Side | 20.566 | 1.901 | 20.0 |
| 147 | Pressure-Side | 20.916 | 1.832 | 20.0 |
| 148 | Pressure-Side | 21.265 | 1.758 | 20.0 |
| 149 | Pressure-Side | 21.613 | 1.680 | 20.0 |
| 150 | Pressure-Side | 21.961 | 1.598 | 20.0 |
| 151 | Pressure-Side | 22.307 | 1.510 | 20.0 |
| 152 | Pressure-Side | 22.653 | 1.418 | 20.0 |
| 153 | Pressure-Side | 22.997 | 1.321 | 20.0 |
| 154 | Pressure-Side | 23.340 | 1.220 | 20.0 |
| 155 | Pressure-Side | 23.680 | 1.114 | 20.0 |
| 156 | Pressure-Side | 24.019 | 1.003 | 20.0 |
| 157 | Pressure-Side | 24.357 | 0.888 | 20.0 |
| 158 | Pressure-Side | 24.693 | 0.768 | 20.0 |
| 159 | Pressure-Side | 25.027 | 0.643 | 20.0 |
| 160 | Pressure-Side | 25.359 | 0.513 | 20.0 |
| 161 | Pressure-Side | 25.689 | 0.378 | 20.0 |
| 162 | Pressure-Side | 26.018 | 0.239 | 20.0 |
| 163 | Pressure-Side | 26.345 | 0.094 | 20.0 |
| 164 | Pressure-Side | 26.670 | −0.055 | 20.0 |
| 165 | Pressure-Side | 26.993 | −0.209 | 20.0 |
| 166 | Pressure-Side | 27.313 | −0.368 | 20.0 |
| 167 | Pressure-Side | 27.631 | −0.531 | 20.0 |
| 168 | Pressure-Side | 27.946 | −0.700 | 20.0 |
| 169 | Pressure-Side | 28.260 | −0.872 | 20.0 |
| 170 | Pressure-Side | 28.570 | −1.049 | 20.0 |
| 171 | Pressure-Side | 28.879 | −1.230 | 20.0 |
| 172 | Pressure-Side | 29.184 | −1.416 | 20.0 |
| 173 | Pressure-Side | 29.487 | −1.606 | 20.0 |
| 174 | Pressure-Side | 29.787 | −1.800 | 20.0 |
| 175 | Pressure-Side | 30.085 | −1.998 | 20.0 |
| 176 | Pressure-Side | 30.380 | −2.200 | 20.0 |
| 177 | Pressure-Side | 30.672 | −2.406 | 20.0 |
| 178 | Pressure-Side | 30.962 | −2.616 | 20.0 |
| 179 | Pressure-Side | 31.249 | −2.830 | 20.0 |
| 180 | Pressure-Side | 31.533 | −3.046 | 20.0 |
| 181 | Pressure-Side | 31.814 | −3.266 | 20.0 |
| 182 | Pressure-Side | 32.093 | −3.490 | 20.0 |
| 183 | Pressure-Side | 32.368 | −3.716 | 20.0 |
| 184 | Pressure-Side | 32.642 | −3.945 | 20.0 |
| 185 | Pressure-Side | 32.912 | −4.177 | 20.0 |
| 186 | Pressure-Side | 33.181 | −4.412 | 20.0 |
| 187 | Pressure-Side | 33.447 | −4.650 | 20.0 |
| 188 | Pressure-Side | 33.711 | −4.890 | 20.0 |
| 189 | Pressure-Side | 33.973 | −5.133 | 20.0 |
| 190 | Pressure-Side | 34.233 | −5.377 | 20.0 |
| 191 | Pressure-Side | 34.491 | −5.624 | 20.0 |
| 192 | Pressure-Side | 34.748 | −5.874 | 20.0 |
| 193 | Pressure-Side | 35.002 | −6.125 | 20.0 |
| 194 | Pressure-Side | 35.255 | −6.377 | 20.0 |
| 195 | Pressure-Side | 35.507 | −6.631 | 20.0 |
| 196 | Pressure-Side | 35.756 | −6.888 | 20.0 |
| 197 | Pressure-Side | 35.845 | −6.980 | 20.0 |
| 198 | Pressure-Side | 35.946 | −7.057 | 20.0 |
| 199 | Pressure-Side | 36.071 | −7.070 | 20.0 |
| 200 | Pressure-Side | 36.186 | −7.016 | 20.0 |
| 1 | Suction-Side | 6.642 | 3.334 | 30.0 |
| 2 | Suction-Side | 6.773 | 3.643 | 30.0 |
| 3 | Suction-Side | 7.047 | 3.857 | 30.0 |
| 4 | Suction-Side | 7.350 | 4.030 | 30.0 |
| 5 | Suction-Side | 7.660 | 4.190 | 30.0 |
| 6 | Suction-Side | 7.972 | 4.346 | 30.0 |
| 7 | Suction-Side | 8.287 | 4.497 | 30.0 |
| 8 | Suction-Side | 8.604 | 4.641 | 30.0 |
| 9 | Suction-Side | 8.924 | 4.780 | 30.0 |
| 10 | Suction-Side | 9.246 | 4.912 | 30.0 |
| 11 | Suction-Side | 9.571 | 5.039 | 30.0 |
| 12 | Suction-Side | 9.898 | 5.160 | 30.0 |
| 13 | Suction-Side | 10.228 | 5.274 | 30.0 |
| 14 | Suction-Side | 10.560 | 5.381 | 30.0 |
| 15 | Suction-Side | 10.894 | 5.482 | 30.0 |
| 16 | Suction-Side | 11.230 | 5.576 | 30.0 |
| 17 | Suction-Side | 11.567 | 5.662 | 30.0 |
| 18 | Suction-Side | 11.907 | 5.742 | 30.0 |
| 19 | Suction-Side | 12.248 | 5.814 | 30.0 |
| 20 | Suction-Side | 12.591 | 5.879 | 30.0 |
| 21 | Suction-Side | 12.934 | 5.936 | 30.0 |
| 22 | Suction-Side | 13.280 | 5.986 | 30.0 |
| 23 | Suction-Side | 13.626 | 6.028 | 30.0 |
| 24 | Suction-Side | 13.973 | 6.063 | 30.0 |
| 25 | Suction-Side | 14.321 | 6.090 | 30.0 |
| 26 | Suction-Side | 14.669 | 6.109 | 30.0 |
| 27 | Suction-Side | 15.018 | 6.119 | 30.0 |
| 28 | Suction-Side | 15.366 | 6.121 | 30.0 |
| 29 | Suction-Side | 15.715 | 6.116 | 30.0 |
| 30 | Suction-Side | 16.063 | 6.102 | 30.0 |
| 31 | Suction-Side | 16.411 | 6.081 | 30.0 |
| 32 | Suction-Side | 16.759 | 6.051 | 30.0 |
| 33 | Suction-Side | 17.106 | 6.014 | 30.0 |
| 34 | Suction-Side | 17.451 | 5.969 | 30.0 |
| 35 | Suction-Side | 17.796 | 5.915 | 30.0 |
| 36 | Suction-Side | 18.139 | 5.855 | 30.0 |
| 37 | Suction-Side | 18.481 | 5.786 | 30.0 |
| 38 | Suction-Side | 18.821 | 5.710 | 30.0 |
| 39 | Suction-Side | 19.160 | 5.626 | 30.0 |
| 40 | Suction-Side | 19.497 | 5.535 | 30.0 |
| 41 | Suction-Side | 19.831 | 5.437 | 30.0 |
| 42 | Suction-Side | 20.163 | 5.331 | 30.0 |
| 43 | Suction-Side | 20.493 | 5.218 | 30.0 |
| 44 | Suction-Side | 20.821 | 5.098 | 30.0 |
| 45 | Suction-Side | 21.146 | 4.972 | 30.0 |
| 46 | Suction-Side | 21.468 | 4.838 | 30.0 |
| 47 | Suction-Side | 21.788 | 4.699 | 30.0 |
| 48 | Suction-Side | 22.104 | 4.553 | 30.0 |
| 49 | Suction-Side | 22.418 | 4.401 | 30.0 |
| 50 | Suction-Side | 22.729 | 4.242 | 30.0 |
| 51 | Suction-Side | 23.037 | 4.078 | 30.0 |
| 52 | Suction-Side | 23.341 | 3.908 | 30.0 |
| 53 | Suction-Side | 23.642 | 3.733 | 30.0 |
| 54 | Suction-Side | 23.941 | 3.552 | 30.0 |
| 55 | Suction-Side | 24.235 | 3.365 | 30.0 |
| 56 | Suction-Side | 24.527 | 3.174 | 30.0 |
| 57 | Suction-Side | 24.815 | 2.978 | 30.0 |
| 58 | Suction-Side | 25.099 | 2.776 | 30.0 |
| 59 | Suction-Side | 25.381 | 2.570 | 30.0 |
| 60 | Suction-Side | 25.659 | 2.360 | 30.0 |
| 61 | Suction-Side | 25.933 | 2.145 | 30.0 |
| 62 | Suction-Side | 26.205 | 1.925 | 30.0 |
| 63 | Suction-Side | 26.472 | 1.702 | 30.0 |
| 64 | Suction-Side | 26.736 | 1.474 | 30.0 |
| 65 | Suction-Side | 26.997 | 1.243 | 30.0 |
| 66 | Suction-Side | 27.255 | 1.008 | 30.0 |
| 67 | Suction-Side | 27.509 | 0.769 | 30.0 |
| 68 | Suction-Side | 27.759 | 0.526 | 30.0 |
| 69 | Suction-Side | 28.006 | 0.280 | 30.0 |
| 70 | Suction-Side | 28.250 | 0.031 | 30.0 |
| 71 | Suction-Side | 28.491 | −0.222 | 30.0 |
| 72 | Suction-Side | 28.730 | −0.476 | 30.0 |
| 73 | Suction-Side | 28.966 | −0.733 | 30.0 |
| 74 | Suction-Side | 29.200 | −0.991 | 30.0 |
| 75 | Suction-Side | 29.433 | −1.250 | 30.0 |
| 76 | Suction-Side | 29.664 | −1.511 | 30.0 |
| 77 | Suction-Side | 29.894 | −1.774 | 30.0 |
| 78 | Suction-Side | 30.123 | −2.037 | 30.0 |
| 79 | Suction-Side | 30.350 | −2.302 | 30.0 |
| 80 | Suction-Side | 30.576 | −2.567 | 30.0 |
| 81 | Suction-Side | 30.801 | −2.833 | 30.0 |
| 82 | Suction-Side | 31.025 | −3.101 | 30.0 |
| 83 | Suction-Side | 31.247 | −3.369 | 30.0 |
| 84 | Suction-Side | 31.469 | −3.638 | 30.0 |

TABLE I-continued

[non-dimensionalized percentages]

| N | Location | X | Y | Z |
|---|---|---|---|---|
| 85 | Suction-Side | 31.690 | −3.908 | 30.0 |
| 86 | Suction-Side | 31.911 | −4.178 | 30.0 |
| 87 | Suction-Side | 32.130 | −4.450 | 30.0 |
| 88 | Suction-Side | 32.348 | −4.721 | 30.0 |
| 89 | Suction-Side | 32.567 | −4.993 | 30.0 |
| 90 | Suction-Side | 32.784 | −5.266 | 30.0 |
| 91 | Suction-Side | 33.001 | −5.539 | 30.0 |
| 92 | Suction-Side | 33.217 | −5.813 | 30.0 |
| 93 | Suction-Side | 33.433 | −6.087 | 30.0 |
| 94 | Suction-Side | 33.647 | −6.362 | 30.0 |
| 95 | Suction-Side | 33.861 | −6.637 | 30.0 |
| 96 | Suction-Side | 34.075 | −6.912 | 30.0 |
| 97 | Suction-Side | 34.154 | −7.013 | 30.0 |
| 98 | Suction-Side | 34.213 | −7.125 | 30.0 |
| 99 | Suction-Side | 34.208 | −7.250 | 30.0 |
| 100 | Suction-Side | 34.137 | −7.355 | 30.0 |
| 101 | Pressure-Side | 6.642 | 3.334 | 30.0 |
| 102 | Pressure-Side | 6.852 | 3.109 | 30.0 |
| 103 | Pressure-Side | 7.155 | 3.011 | 30.0 |
| 104 | Pressure-Side | 7.470 | 2.966 | 30.0 |
| 105 | Pressure-Side | 7.788 | 2.946 | 30.0 |
| 106 | Pressure-Side | 8.107 | 2.936 | 30.0 |
| 107 | Pressure-Side | 8.426 | 2.928 | 30.0 |
| 108 | Pressure-Side | 8.745 | 2.920 | 30.0 |
| 109 | Pressure-Side | 9.063 | 2.915 | 30.0 |
| 110 | Pressure-Side | 9.382 | 2.912 | 30.0 |
| 111 | Pressure-Side | 9.701 | 2.910 | 30.0 |
| 112 | Pressure-Side | 10.020 | 2.909 | 30.0 |
| 113 | Pressure-Side | 10.339 | 2.909 | 30.0 |
| 114 | Pressure-Side | 10.657 | 2.909 | 30.0 |
| 115 | Pressure-Side | 10.977 | 2.909 | 30.0 |
| 116 | Pressure-Side | 11.295 | 2.909 | 30.0 |
| 117 | Pressure-Side | 11.614 | 2.907 | 30.0 |
| 118 | Pressure-Side | 11.933 | 2.905 | 30.0 |
| 119 | Pressure-Side | 12.252 | 2.902 | 30.0 |
| 120 | Pressure-Side | 12.571 | 2.897 | 30.0 |
| 121 | Pressure-Side | 12.889 | 2.891 | 30.0 |
| 122 | Pressure-Side | 13.208 | 2.884 | 30.0 |
| 123 | Pressure-Side | 13.527 | 2.873 | 30.0 |
| 124 | Pressure-Side | 13.845 | 2.861 | 30.0 |
| 125 | Pressure-Side | 14.164 | 2.846 | 30.0 |
| 126 | Pressure-Side | 14.482 | 2.828 | 30.0 |
| 127 | Pressure-Side | 14.801 | 2.807 | 30.0 |
| 128 | Pressure-Side | 15.118 | 2.784 | 30.0 |
| 129 | Pressure-Side | 15.436 | 2.757 | 30.0 |
| 130 | Pressure-Side | 15.753 | 2.727 | 30.0 |
| 131 | Pressure-Side | 16.071 | 2.694 | 30.0 |
| 132 | Pressure-Side | 16.387 | 2.657 | 30.0 |
| 133 | Pressure-Side | 16.703 | 2.617 | 30.0 |
| 134 | Pressure-Side | 17.019 | 2.572 | 30.0 |
| 135 | Pressure-Side | 17.334 | 2.524 | 30.0 |
| 136 | Pressure-Side | 17.649 | 2.472 | 30.0 |
| 137 | Pressure-Side | 17.963 | 2.416 | 30.0 |
| 138 | Pressure-Side | 18.276 | 2.355 | 30.0 |
| 139 | Pressure-Side | 18.588 | 2.291 | 30.0 |
| 140 | Pressure-Side | 18.900 | 2.223 | 30.0 |
| 141 | Pressure-Side | 19.210 | 2.150 | 30.0 |
| 142 | Pressure-Side | 19.519 | 2.073 | 30.0 |
| 143 | Pressure-Side | 19.828 | 1.992 | 30.0 |
| 144 | Pressure-Side | 20.135 | 1.907 | 30.0 |
| 145 | Pressure-Side | 20.441 | 1.818 | 30.0 |
| 146 | Pressure-Side | 20.746 | 1.725 | 30.0 |
| 147 | Pressure-Side | 21.050 | 1.627 | 30.0 |
| 148 | Pressure-Side | 21.352 | 1.526 | 30.0 |
| 149 | Pressure-Side | 21.653 | 1.421 | 30.0 |
| 150 | Pressure-Side | 21.952 | 1.311 | 30.0 |
| 151 | Pressure-Side | 22.250 | 1.198 | 30.0 |
| 152 | Pressure-Side | 22.547 | 1.081 | 30.0 |
| 153 | Pressure-Side | 22.842 | 0.960 | 30.0 |
| 154 | Pressure-Side | 23.135 | 0.835 | 30.0 |
| 155 | Pressure-Side | 23.427 | 0.706 | 30.0 |
| 156 | Pressure-Side | 23.717 | 0.573 | 30.0 |
| 157 | Pressure-Side | 24.005 | 0.436 | 30.0 |
| 158 | Pressure-Side | 24.291 | 0.296 | 30.0 |
| 159 | Pressure-Side | 24.575 | 0.151 | 30.0 |
| 160 | Pressure-Side | 24.857 | 0.003 | 30.0 |
| 161 | Pressure-Side | 25.138 | −0.149 | 30.0 |
| 162 | Pressure-Side | 25.416 | −0.305 | 30.0 |
| 163 | Pressure-Side | 25.692 | −0.464 | 30.0 |
| 164 | Pressure-Side | 25.967 | −0.626 | 30.0 |
| 165 | Pressure-Side | 26.239 | −0.792 | 30.0 |
| 166 | Pressure-Side | 26.509 | −0.962 | 30.0 |
| 167 | Pressure-Side | 26.777 | −1.135 | 30.0 |
| 168 | Pressure-Side | 27.043 | −1.310 | 30.0 |
| 169 | Pressure-Side | 27.307 | −1.490 | 30.0 |
| 170 | Pressure-Side | 27.568 | −1.672 | 30.0 |
| 171 | Pressure-Side | 27.827 | −1.857 | 30.0 |
| 172 | Pressure-Side | 28.085 | −2.046 | 30.0 |
| 173 | Pressure-Side | 28.340 | −2.237 | 30.0 |
| 174 | Pressure-Side | 28.593 | −2.431 | 30.0 |
| 175 | Pressure-Side | 28.844 | −2.627 | 30.0 |
| 176 | Pressure-Side | 29.093 | −2.827 | 30.0 |
| 177 | Pressure-Side | 29.340 | −3.028 | 30.0 |
| 178 | Pressure-Side | 29.584 | −3.233 | 30.0 |
| 179 | Pressure-Side | 29.827 | −3.439 | 30.0 |
| 180 | Pressure-Side | 30.068 | −3.648 | 30.0 |
| 181 | Pressure-Side | 30.307 | −3.859 | 30.0 |
| 182 | Pressure-Side | 30.545 | −4.072 | 30.0 |
| 183 | Pressure-Side | 30.780 | −4.288 | 30.0 |
| 184 | Pressure-Side | 31.013 | −4.505 | 30.0 |
| 185 | Pressure-Side | 31.245 | −4.723 | 30.0 |
| 186 | Pressure-Side | 31.475 | −4.944 | 30.0 |
| 187 | Pressure-Side | 31.704 | −5.166 | 30.0 |
| 188 | Pressure-Side | 31.931 | −5.390 | 30.0 |
| 189 | Pressure-Side | 32.157 | −5.615 | 30.0 |
| 190 | Pressure-Side | 32.382 | −5.841 | 30.0 |
| 191 | Pressure-Side | 32.605 | −6.069 | 30.0 |
| 192 | Pressure-Side | 32.827 | −6.297 | 30.0 |
| 193 | Pressure-Side | 33.048 | −6.527 | 30.0 |
| 194 | Pressure-Side | 33.268 | −6.758 | 30.0 |
| 195 | Pressure-Side | 33.488 | −6.989 | 30.0 |
| 196 | Pressure-Side | 33.706 | −7.221 | 30.0 |
| 197 | Pressure-Side | 33.795 | −7.315 | 30.0 |
| 198 | Pressure-Side | 33.895 | −7.393 | 30.0 |
| 199 | Pressure-Side | 34.021 | −7.407 | 30.0 |
| 200 | Pressure-Side | 34.137 | −7.355 | 30.0 |
| 1 | Suction-Side | 8.523 | 4.360 | 40.0 |
| 2 | Suction-Side | 8.659 | 4.632 | 40.0 |
| 3 | Suction-Side | 8.915 | 4.808 | 40.0 |
| 4 | Suction-Side | 9.194 | 4.945 | 40.0 |
| 5 | Suction-Side | 9.478 | 5.072 | 40.0 |
| 6 | Suction-Side | 9.764 | 5.193 | 40.0 |
| 7 | Suction-Side | 10.052 | 5.308 | 40.0 |
| 8 | Suction-Side | 10.342 | 5.417 | 40.0 |
| 9 | Suction-Side | 10.635 | 5.521 | 40.0 |
| 10 | Suction-Side | 10.929 | 5.618 | 40.0 |
| 11 | Suction-Side | 11.225 | 5.709 | 40.0 |
| 12 | Suction-Side | 11.524 | 5.793 | 40.0 |
| 13 | Suction-Side | 11.825 | 5.871 | 40.0 |
| 14 | Suction-Side | 12.128 | 5.942 | 40.0 |
| 15 | Suction-Side | 12.431 | 6.005 | 40.0 |
| 16 | Suction-Side | 12.734 | 6.061 | 40.0 |
| 17 | Suction-Side | 13.038 | 6.110 | 40.0 |
| 18 | Suction-Side | 13.343 | 6.151 | 40.0 |
| 19 | Suction-Side | 13.648 | 6.185 | 40.0 |
| 20 | Suction-Side | 13.953 | 6.211 | 40.0 |
| 21 | Suction-Side | 14.260 | 6.230 | 40.0 |
| 22 | Suction-Side | 14.566 | 6.242 | 40.0 |
| 23 | Suction-Side | 14.874 | 6.245 | 40.0 |
| 24 | Suction-Side | 15.182 | 6.242 | 40.0 |
| 25 | Suction-Side | 15.490 | 6.230 | 40.0 |
| 26 | Suction-Side | 15.799 | 6.211 | 40.0 |
| 27 | Suction-Side | 16.109 | 6.184 | 40.0 |
| 28 | Suction-Side | 16.418 | 6.149 | 40.0 |
| 29 | Suction-Side | 16.725 | 6.106 | 40.0 |
| 30 | Suction-Side | 17.029 | 6.056 | 40.0 |
| 31 | Suction-Side | 17.332 | 5.999 | 40.0 |
| 32 | Suction-Side | 17.633 | 5.934 | 40.0 |
| 33 | Suction-Side | 17.932 | 5.863 | 40.0 |
| 34 | Suction-Side | 18.229 | 5.784 | 40.0 |
| 35 | Suction-Side | 18.524 | 5.699 | 40.0 |
| 36 | Suction-Side | 18.818 | 5.607 | 40.0 |

TABLE I-continued

[non-dimensionalized percentages]

| N | Location | X | Y | Z |
|---|---|---|---|---|
| 37 | Suction-Side | 19.109 | 5.508 | 40.0 |
| 38 | Suction-Side | 19.399 | 5.403 | 40.0 |
| 39 | Suction-Side | 19.687 | 5.290 | 40.0 |
| 40 | Suction-Side | 19.973 | 5.171 | 40.0 |
| 41 | Suction-Side | 20.257 | 5.046 | 40.0 |
| 42 | Suction-Side | 20.538 | 4.915 | 40.0 |
| 43 | Suction-Side | 20.816 | 4.778 | 40.0 |
| 44 | Suction-Side | 21.090 | 4.636 | 40.0 |
| 45 | Suction-Side | 21.360 | 4.489 | 40.0 |
| 46 | Suction-Side | 21.627 | 4.336 | 40.0 |
| 47 | Suction-Side | 21.890 | 4.179 | 40.0 |
| 48 | Suction-Side | 22.151 | 4.017 | 40.0 |
| 49 | Suction-Side | 22.408 | 3.850 | 40.0 |
| 50 | Suction-Side | 22.661 | 3.678 | 40.0 |
| 51 | Suction-Side | 22.912 | 3.502 | 40.0 |
| 52 | Suction-Side | 23.160 | 3.321 | 40.0 |
| 53 | Suction-Side | 23.405 | 3.136 | 40.0 |
| 54 | Suction-Side | 23.647 | 2.947 | 40.0 |
| 55 | Suction-Side | 23.886 | 2.753 | 40.0 |
| 56 | Suction-Side | 24.121 | 2.555 | 40.0 |
| 57 | Suction-Side | 24.355 | 2.353 | 40.0 |
| 58 | Suction-Side | 24.586 | 2.147 | 40.0 |
| 59 | Suction-Side | 24.814 | 1.938 | 40.0 |
| 60 | Suction-Side | 25.040 | 1.725 | 40.0 |
| 61 | Suction-Side | 25.262 | 1.510 | 40.0 |
| 62 | Suction-Side | 25.483 | 1.293 | 40.0 |
| 63 | Suction-Side | 25.701 | 1.073 | 40.0 |
| 64 | Suction-Side | 25.917 | 0.851 | 40.0 |
| 65 | Suction-Side | 26.131 | 0.627 | 40.0 |
| 66 | Suction-Side | 26.343 | 0.401 | 40.0 |
| 67 | Suction-Side | 26.552 | 0.174 | 40.0 |
| 68 | Suction-Side | 26.760 | −0.056 | 40.0 |
| 69 | Suction-Side | 26.966 | −0.288 | 40.0 |
| 70 | Suction-Side | 27.171 | −0.520 | 40.0 |
| 71 | Suction-Side | 27.374 | −0.755 | 40.0 |
| 72 | Suction-Side | 27.575 | −0.990 | 40.0 |
| 73 | Suction-Side | 27.776 | −1.226 | 40.0 |
| 74 | Suction-Side | 27.975 | −1.463 | 40.0 |
| 75 | Suction-Side | 28.174 | −1.701 | 40.0 |
| 76 | Suction-Side | 28.373 | −1.939 | 40.0 |
| 77 | Suction-Side | 28.571 | −2.176 | 40.0 |
| 78 | Suction-Side | 28.769 | −2.415 | 40.0 |
| 79 | Suction-Side | 28.966 | −2.654 | 40.0 |
| 80 | Suction-Side | 29.163 | −2.893 | 40.0 |
| 81 | Suction-Side | 29.359 | −3.133 | 40.0 |
| 82 | Suction-Side | 29.555 | −3.373 | 40.0 |
| 83 | Suction-Side | 29.750 | −3.614 | 40.0 |
| 84 | Suction-Side | 29.944 | −3.855 | 40.0 |
| 85 | Suction-Side | 30.139 | −4.096 | 40.0 |
| 86 | Suction-Side | 30.332 | −4.338 | 40.0 |
| 87 | Suction-Side | 30.525 | −4.581 | 40.0 |
| 88 | Suction-Side | 30.717 | −4.824 | 40.0 |
| 89 | Suction-Side | 30.909 | −5.067 | 40.0 |
| 90 | Suction-Side | 31.101 | −5.310 | 40.0 |
| 91 | Suction-Side | 31.292 | −5.554 | 40.0 |
| 92 | Suction-Side | 31.483 | −5.798 | 40.0 |
| 93 | Suction-Side | 31.673 | −6.043 | 40.0 |
| 94 | Suction-Side | 31.863 | −6.288 | 40.0 |
| 95 | Suction-Side | 32.052 | −6.533 | 40.0 |
| 96 | Suction-Side | 32.241 | −6.779 | 40.0 |
| 97 | Suction-Side | 32.318 | −6.877 | 40.0 |
| 98 | Suction-Side | 32.377 | −6.988 | 40.0 |
| 99 | Suction-Side | 32.372 | −7.115 | 40.0 |
| 100 | Suction-Side | 32.300 | −7.222 | 40.0 |
| 101 | Pressure-Side | 8.523 | 4.360 | 40.0 |
| 102 | Pressure-Side | 8.686 | 4.140 | 40.0 |
| 103 | Pressure-Side | 8.942 | 4.022 | 40.0 |
| 104 | Pressure-Side | 9.216 | 3.951 | 40.0 |
| 105 | Pressure-Side | 9.495 | 3.906 | 40.0 |
| 106 | Pressure-Side | 9.775 | 3.868 | 40.0 |
| 107 | Pressure-Side | 10.055 | 3.832 | 40.0 |
| 108 | Pressure-Side | 10.336 | 3.797 | 40.0 |
| 109 | Pressure-Side | 10.617 | 3.763 | 40.0 |
| 110 | Pressure-Side | 10.898 | 3.730 | 40.0 |
| 111 | Pressure-Side | 11.178 | 3.697 | 40.0 |
| 112 | Pressure-Side | 11.459 | 3.665 | 40.0 |
| 113 | Pressure-Side | 11.740 | 3.633 | 40.0 |
| 114 | Pressure-Side | 12.021 | 3.601 | 40.0 |
| 115 | Pressure-Side | 12.302 | 3.568 | 40.0 |
| 116 | Pressure-Side | 12.583 | 3.534 | 40.0 |
| 117 | Pressure-Side | 12.863 | 3.500 | 40.0 |
| 118 | Pressure-Side | 13.144 | 3.464 | 40.0 |
| 119 | Pressure-Side | 13.424 | 3.428 | 40.0 |
| 120 | Pressure-Side | 13.705 | 3.390 | 40.0 |
| 121 | Pressure-Side | 13.984 | 3.350 | 40.0 |
| 122 | Pressure-Side | 14.264 | 3.308 | 40.0 |
| 123 | Pressure-Side | 14.544 | 3.265 | 40.0 |
| 124 | Pressure-Side | 14.823 | 3.220 | 40.0 |
| 125 | Pressure-Side | 15.101 | 3.172 | 40.0 |
| 126 | Pressure-Side | 15.380 | 3.122 | 40.0 |
| 127 | Pressure-Side | 15.657 | 3.069 | 40.0 |
| 128 | Pressure-Side | 15.935 | 3.014 | 40.0 |
| 129 | Pressure-Side | 16.212 | 2.957 | 40.0 |
| 130 | Pressure-Side | 16.488 | 2.896 | 40.0 |
| 131 | Pressure-Side | 16.764 | 2.833 | 40.0 |
| 132 | Pressure-Side | 17.039 | 2.767 | 40.0 |
| 133 | Pressure-Side | 17.313 | 2.698 | 40.0 |
| 134 | Pressure-Side | 17.586 | 2.626 | 40.0 |
| 135 | Pressure-Side | 17.859 | 2.551 | 40.0 |
| 136 | Pressure-Side | 18.131 | 2.472 | 40.0 |
| 137 | Pressure-Side | 18.401 | 2.391 | 40.0 |
| 138 | Pressure-Side | 18.671 | 2.306 | 40.0 |
| 139 | Pressure-Side | 18.939 | 2.217 | 40.0 |
| 140 | Pressure-Side | 19.207 | 2.126 | 40.0 |
| 141 | Pressure-Side | 19.474 | 2.031 | 40.0 |
| 142 | Pressure-Side | 19.739 | 1.934 | 40.0 |
| 143 | Pressure-Side | 20.003 | 1.833 | 40.0 |
| 144 | Pressure-Side | 20.266 | 1.728 | 40.0 |
| 145 | Pressure-Side | 20.527 | 1.621 | 40.0 |
| 146 | Pressure-Side | 20.788 | 1.511 | 40.0 |
| 147 | Pressure-Side | 21.047 | 1.397 | 40.0 |
| 148 | Pressure-Side | 21.304 | 1.281 | 40.0 |
| 149 | Pressure-Side | 21.561 | 1.161 | 40.0 |
| 150 | Pressure-Side | 21.815 | 1.038 | 40.0 |
| 151 | Pressure-Side | 22.069 | 0.913 | 40.0 |
| 152 | Pressure-Side | 22.321 | 0.785 | 40.0 |
| 153 | Pressure-Side | 22.571 | 0.653 | 40.0 |
| 154 | Pressure-Side | 22.820 | 0.519 | 40.0 |
| 155 | Pressure-Side | 23.067 | 0.382 | 40.0 |
| 156 | Pressure-Side | 23.313 | 0.242 | 40.0 |
| 157 | Pressure-Side | 23.557 | 0.099 | 40.0 |
| 158 | Pressure-Side | 23.799 | −0.047 | 40.0 |
| 159 | Pressure-Side | 24.040 | −0.195 | 40.0 |
| 160 | Pressure-Side | 24.279 | −0.347 | 40.0 |
| 161 | Pressure-Side | 24.516 | −0.501 | 40.0 |
| 162 | Pressure-Side | 24.752 | −0.657 | 40.0 |
| 163 | Pressure-Side | 24.985 | −0.816 | 40.0 |
| 164 | Pressure-Side | 25.217 | −0.978 | 40.0 |
| 165 | Pressure-Side | 25.448 | −1.142 | 40.0 |
| 166 | Pressure-Side | 25.677 | −1.308 | 40.0 |
| 167 | Pressure-Side | 25.903 | −1.477 | 40.0 |
| 168 | Pressure-Side | 26.129 | −1.648 | 40.0 |
| 169 | Pressure-Side | 26.352 | −1.821 | 40.0 |
| 170 | Pressure-Side | 26.574 | −1.996 | 40.0 |
| 171 | Pressure-Side | 26.794 | −2.173 | 40.0 |
| 172 | Pressure-Side | 27.013 | −2.353 | 40.0 |
| 173 | Pressure-Side | 27.230 | −2.534 | 40.0 |
| 174 | Pressure-Side | 27.445 | −2.717 | 40.0 |
| 175 | Pressure-Side | 27.659 | −2.902 | 40.0 |
| 176 | Pressure-Side | 27.872 | −3.089 | 40.0 |
| 177 | Pressure-Side | 28.082 | −3.277 | 40.0 |
| 178 | Pressure-Side | 28.292 | −3.467 | 40.0 |
| 179 | Pressure-Side | 28.500 | −3.659 | 40.0 |
| 180 | Pressure-Side | 28.707 | −3.851 | 40.0 |
| 181 | Pressure-Side | 28.912 | −4.046 | 40.0 |
| 182 | Pressure-Side | 29.116 | −4.241 | 40.0 |
| 183 | Pressure-Side | 29.319 | −4.439 | 40.0 |
| 184 | Pressure-Side | 29.521 | −4.637 | 40.0 |
| 185 | Pressure-Side | 29.721 | −4.836 | 40.0 |
| 186 | Pressure-Side | 29.921 | −5.036 | 40.0 |
| 187 | Pressure-Side | 30.119 | −5.238 | 40.0 |
| 188 | Pressure-Side | 30.317 | −5.440 | 40.0 |

TABLE I-continued

[non-dimensionalized percentages]

| N | Location | X | Y | Z |
|---|---|---|---|---|
| 189 | Pressure-Side | 30.513 | −5.644 | 40.0 |
| 190 | Pressure-Side | 30.709 | −5.848 | 40.0 |
| 191 | Pressure-Side | 30.904 | −6.053 | 40.0 |
| 192 | Pressure-Side | 31.098 | −6.258 | 40.0 |
| 193 | Pressure-Side | 31.292 | −6.464 | 40.0 |
| 194 | Pressure-Side | 31.485 | −6.670 | 40.0 |
| 195 | Pressure-Side | 31.678 | −6.877 | 40.0 |
| 196 | Pressure-Side | 31.870 | −7.085 | 40.0 |
| 197 | Pressure-Side | 31.957 | −7.180 | 40.0 |
| 198 | Pressure-Side | 32.058 | −7.257 | 40.0 |
| 199 | Pressure-Side | 32.184 | −7.273 | 40.0 |
| 200 | Pressure-Side | 32.300 | −7.222 | 40.0 |
| 1 | Suction-Side | 9.411 | 4.857 | 45.0 |
| 2 | Suction-Side | 9.546 | 5.110 | 45.0 |
| 3 | Suction-Side | 9.793 | 5.269 | 45.0 |
| 4 | Suction-Side | 10.059 | 5.388 | 45.0 |
| 5 | Suction-Side | 10.329 | 5.499 | 45.0 |
| 6 | Suction-Side | 10.602 | 5.601 | 45.0 |
| 7 | Suction-Side | 10.877 | 5.698 | 45.0 |
| 8 | Suction-Side | 11.154 | 5.789 | 45.0 |
| 9 | Suction-Side | 11.432 | 5.873 | 45.0 |
| 10 | Suction-Side | 11.711 | 5.950 | 45.0 |
| 11 | Suction-Side | 11.993 | 6.021 | 45.0 |
| 12 | Suction-Side | 12.277 | 6.085 | 45.0 |
| 13 | Suction-Side | 12.562 | 6.142 | 45.0 |
| 14 | Suction-Side | 12.849 | 6.192 | 45.0 |
| 15 | Suction-Side | 13.139 | 6.234 | 45.0 |
| 16 | Suction-Side | 13.428 | 6.269 | 45.0 |
| 17 | Suction-Side | 13.717 | 6.296 | 45.0 |
| 18 | Suction-Side | 14.007 | 6.316 | 45.0 |
| 19 | Suction-Side | 14.295 | 6.328 | 45.0 |
| 20 | Suction-Side | 14.584 | 6.333 | 45.0 |
| 21 | Suction-Side | 14.873 | 6.330 | 45.0 |
| 22 | Suction-Side | 15.161 | 6.320 | 45.0 |
| 23 | Suction-Side | 15.449 | 6.303 | 45.0 |
| 24 | Suction-Side | 15.737 | 6.278 | 45.0 |
| 25 | Suction-Side | 16.024 | 6.246 | 45.0 |
| 26 | Suction-Side | 16.312 | 6.206 | 45.0 |
| 27 | Suction-Side | 16.599 | 6.159 | 45.0 |
| 28 | Suction-Side | 16.885 | 6.104 | 45.0 |
| 29 | Suction-Side | 17.171 | 6.042 | 45.0 |
| 30 | Suction-Side | 17.453 | 5.973 | 45.0 |
| 31 | Suction-Side | 17.734 | 5.897 | 45.0 |
| 32 | Suction-Side | 18.011 | 5.815 | 45.0 |
| 33 | Suction-Side | 18.287 | 5.726 | 45.0 |
| 34 | Suction-Side | 18.560 | 5.631 | 45.0 |
| 35 | Suction-Side | 18.831 | 5.530 | 45.0 |
| 36 | Suction-Side | 19.099 | 5.423 | 45.0 |
| 37 | Suction-Side | 19.366 | 5.310 | 45.0 |
| 38 | Suction-Side | 19.631 | 5.191 | 45.0 |
| 39 | Suction-Side | 19.893 | 5.066 | 45.0 |
| 40 | Suction-Side | 20.153 | 4.935 | 45.0 |
| 41 | Suction-Side | 20.411 | 4.799 | 45.0 |
| 42 | Suction-Side | 20.665 | 4.658 | 45.0 |
| 43 | Suction-Side | 20.917 | 4.512 | 45.0 |
| 44 | Suction-Side | 21.165 | 4.362 | 45.0 |
| 45 | Suction-Side | 21.409 | 4.207 | 45.0 |
| 46 | Suction-Side | 21.650 | 4.048 | 45.0 |
| 47 | Suction-Side | 21.888 | 3.885 | 45.0 |
| 48 | Suction-Side | 22.123 | 3.717 | 45.0 |
| 49 | Suction-Side | 22.354 | 3.546 | 45.0 |
| 50 | Suction-Side | 22.582 | 3.371 | 45.0 |
| 51 | Suction-Side | 22.808 | 3.192 | 45.0 |
| 52 | Suction-Side | 23.031 | 3.010 | 45.0 |
| 53 | Suction-Side | 23.250 | 2.824 | 45.0 |
| 54 | Suction-Side | 23.467 | 2.634 | 45.0 |
| 55 | Suction-Side | 23.682 | 2.441 | 45.0 |
| 56 | Suction-Side | 23.893 | 2.245 | 45.0 |
| 57 | Suction-Side | 24.103 | 2.045 | 45.0 |
| 58 | Suction-Side | 24.309 | 1.842 | 45.0 |
| 59 | Suction-Side | 24.514 | 1.636 | 45.0 |
| 60 | Suction-Side | 24.716 | 1.428 | 45.0 |
| 61 | Suction-Side | 24.917 | 1.217 | 45.0 |
| 62 | Suction-Side | 25.115 | 1.005 | 45.0 |
| 63 | Suction-Side | 25.313 | 0.792 | 45.0 |
| 64 | Suction-Side | 25.509 | 0.577 | 45.0 |
| 65 | Suction-Side | 25.703 | 0.361 | 45.0 |
| 66 | Suction-Side | 25.896 | 0.144 | 45.0 |
| 67 | Suction-Side | 26.088 | −0.075 | 45.0 |
| 68 | Suction-Side | 26.279 | −0.294 | 45.0 |
| 69 | Suction-Side | 26.468 | −0.515 | 45.0 |
| 70 | Suction-Side | 26.656 | −0.736 | 45.0 |
| 71 | Suction-Side | 26.843 | −0.959 | 45.0 |
| 72 | Suction-Side | 27.030 | −1.181 | 45.0 |
| 73 | Suction-Side | 27.216 | −1.405 | 45.0 |
| 74 | Suction-Side | 27.401 | −1.629 | 45.0 |
| 75 | Suction-Side | 27.586 | −1.853 | 45.0 |
| 76 | Suction-Side | 27.771 | −2.078 | 45.0 |
| 77 | Suction-Side | 27.955 | −2.303 | 45.0 |
| 78 | Suction-Side | 28.139 | −2.528 | 45.0 |
| 79 | Suction-Side | 28.323 | −2.753 | 45.0 |
| 80 | Suction-Side | 28.506 | −2.978 | 45.0 |
| 81 | Suction-Side | 28.689 | −3.204 | 45.0 |
| 82 | Suction-Side | 28.871 | −3.431 | 45.0 |
| 83 | Suction-Side | 29.053 | −3.657 | 45.0 |
| 84 | Suction-Side | 29.235 | −3.884 | 45.0 |
| 85 | Suction-Side | 29.416 | −4.112 | 45.0 |
| 86 | Suction-Side | 29.596 | −4.340 | 45.0 |
| 87 | Suction-Side | 29.777 | −4.568 | 45.0 |
| 88 | Suction-Side | 29.956 | −4.796 | 45.0 |
| 89 | Suction-Side | 30.136 | −5.024 | 45.0 |
| 90 | Suction-Side | 30.316 | −5.253 | 45.0 |
| 91 | Suction-Side | 30.495 | −5.481 | 45.0 |
| 92 | Suction-Side | 30.674 | −5.711 | 45.0 |
| 93 | Suction-Side | 30.853 | −5.940 | 45.0 |
| 94 | Suction-Side | 31.030 | −6.170 | 45.0 |
| 95 | Suction-Side | 31.207 | −6.401 | 45.0 |
| 96 | Suction-Side | 31.384 | −6.632 | 45.0 |
| 97 | Suction-Side | 31.461 | −6.730 | 45.0 |
| 98 | Suction-Side | 31.521 | −6.841 | 45.0 |
| 99 | Suction-Side | 31.515 | −6.968 | 45.0 |
| 100 | Suction-Side | 31.444 | −7.074 | 45.0 |
| 101 | Pressure-Side | 9.411 | 4.857 | 45.0 |
| 102 | Pressure-Side | 9.550 | 4.641 | 45.0 |
| 103 | Pressure-Side | 9.784 | 4.514 | 45.0 |
| 104 | Pressure-Side | 10.036 | 4.432 | 45.0 |
| 105 | Pressure-Side | 10.296 | 4.373 | 45.0 |
| 106 | Pressure-Side | 10.557 | 4.322 | 45.0 |
| 107 | Pressure-Side | 10.819 | 4.273 | 45.0 |
| 108 | Pressure-Side | 11.080 | 4.224 | 45.0 |
| 109 | Pressure-Side | 11.342 | 4.175 | 45.0 |
| 110 | Pressure-Side | 11.604 | 4.126 | 45.0 |
| 111 | Pressure-Side | 11.866 | 4.078 | 45.0 |
| 112 | Pressure-Side | 12.127 | 4.029 | 45.0 |
| 113 | Pressure-Side | 12.389 | 3.980 | 45.0 |
| 114 | Pressure-Side | 12.651 | 3.931 | 45.0 |
| 115 | Pressure-Side | 12.912 | 3.881 | 45.0 |
| 116 | Pressure-Side | 13.173 | 3.831 | 45.0 |
| 117 | Pressure-Side | 13.434 | 3.779 | 45.0 |
| 118 | Pressure-Side | 13.695 | 3.726 | 45.0 |
| 119 | Pressure-Side | 13.956 | 3.672 | 45.0 |
| 120 | Pressure-Side | 14.216 | 3.617 | 45.0 |
| 121 | Pressure-Side | 14.477 | 3.560 | 45.0 |
| 122 | Pressure-Side | 14.736 | 3.502 | 45.0 |
| 123 | Pressure-Side | 14.996 | 3.442 | 45.0 |
| 124 | Pressure-Side | 15.254 | 3.380 | 45.0 |
| 125 | Pressure-Side | 15.513 | 3.316 | 45.0 |
| 126 | Pressure-Side | 15.771 | 3.250 | 45.0 |
| 127 | Pressure-Side | 16.028 | 3.182 | 45.0 |
| 128 | Pressure-Side | 16.285 | 3.111 | 45.0 |
| 129 | Pressure-Side | 16.541 | 3.039 | 45.0 |
| 130 | Pressure-Side | 16.796 | 2.964 | 45.0 |
| 131 | Pressure-Side | 17.051 | 2.887 | 45.0 |
| 132 | Pressure-Side | 17.305 | 2.807 | 45.0 |
| 133 | Pressure-Side | 17.558 | 2.725 | 45.0 |
| 134 | Pressure-Side | 17.810 | 2.640 | 45.0 |
| 135 | Pressure-Side | 18.062 | 2.552 | 45.0 |
| 136 | Pressure-Side | 18.312 | 2.462 | 45.0 |
| 137 | Pressure-Side | 18.562 | 2.370 | 45.0 |
| 138 | Pressure-Side | 18.810 | 2.274 | 45.0 |
| 139 | Pressure-Side | 19.057 | 2.176 | 45.0 |
| 140 | Pressure-Side | 19.304 | 2.075 | 45.0 |

TABLE I-continued

[non-dimensionalized percentages]

| N | Location | X | Y | Z |
|---|---|---|---|---|
| 141 | Pressure-Side | 19.549 | 1.972 | 45.0 |
| 142 | Pressure-Side | 19.793 | 1.866 | 45.0 |
| 143 | Pressure-Side | 20.036 | 1.757 | 45.0 |
| 144 | Pressure-Side | 20.278 | 1.645 | 45.0 |
| 145 | Pressure-Side | 20.518 | 1.531 | 45.0 |
| 146 | Pressure-Side | 20.757 | 1.415 | 45.0 |
| 147 | Pressure-Side | 20.996 | 1.296 | 45.0 |
| 148 | Pressure-Side | 21.232 | 1.174 | 45.0 |
| 149 | Pressure-Side | 21.467 | 1.050 | 45.0 |
| 150 | Pressure-Side | 21.702 | 0.923 | 45.0 |
| 151 | Pressure-Side | 21.934 | 0.794 | 45.0 |
| 152 | Pressure-Side | 22.166 | 0.662 | 45.0 |
| 153 | Pressure-Side | 22.396 | 0.528 | 45.0 |
| 154 | Pressure-Side | 22.624 | 0.392 | 45.0 |
| 155 | Pressure-Side | 22.851 | 0.253 | 45.0 |
| 156 | Pressure-Side | 23.077 | 0.112 | 45.0 |
| 157 | Pressure-Side | 23.301 | −0.031 | 45.0 |
| 158 | Pressure-Side | 23.524 | −0.178 | 45.0 |
| 159 | Pressure-Side | 23.745 | −0.325 | 45.0 |
| 160 | Pressure-Side | 23.964 | −0.476 | 45.0 |
| 161 | Pressure-Side | 24.183 | −0.629 | 45.0 |
| 162 | Pressure-Side | 24.399 | −0.783 | 45.0 |
| 163 | Pressure-Side | 24.614 | −0.940 | 45.0 |
| 164 | Pressure-Side | 24.828 | −1.099 | 45.0 |
| 165 | Pressure-Side | 25.040 | −1.259 | 45.0 |
| 166 | Pressure-Side | 25.251 | −1.422 | 45.0 |
| 167 | Pressure-Side | 25.460 | −1.587 | 45.0 |
| 168 | Pressure-Side | 25.668 | −1.753 | 45.0 |
| 169 | Pressure-Side | 25.874 | −1.921 | 45.0 |
| 170 | Pressure-Side | 26.079 | −2.091 | 45.0 |
| 171 | Pressure-Side | 26.282 | −2.263 | 45.0 |
| 172 | Pressure-Side | 26.485 | −2.436 | 45.0 |
| 173 | Pressure-Side | 26.685 | −2.611 | 45.0 |
| 174 | Pressure-Side | 26.885 | −2.787 | 45.0 |
| 175 | Pressure-Side | 27.083 | −2.965 | 45.0 |
| 176 | Pressure-Side | 27.280 | −3.144 | 45.0 |
| 177 | Pressure-Side | 27.475 | −3.325 | 45.0 |
| 178 | Pressure-Side | 27.670 | −3.506 | 45.0 |
| 179 | Pressure-Side | 27.863 | −3.689 | 45.0 |
| 180 | Pressure-Side | 28.055 | −3.874 | 45.0 |
| 181 | Pressure-Side | 28.246 | −4.059 | 45.0 |
| 182 | Pressure-Side | 28.436 | −4.245 | 45.0 |
| 183 | Pressure-Side | 28.625 | −4.432 | 45.0 |
| 184 | Pressure-Side | 28.813 | −4.621 | 45.0 |
| 185 | Pressure-Side | 29.0 | −4.810 | 45.0 |
| 186 | Pressure-Side | 29.187 | −5.0 | 45.0 |
| 187 | Pressure-Side | 29.372 | −5.191 | 45.0 |
| 188 | Pressure-Side | 29.557 | −5.383 | 45.0 |
| 189 | Pressure-Side | 29.741 | −5.576 | 45.0 |
| 190 | Pressure-Side | 29.924 | −5.769 | 45.0 |
| 191 | Pressure-Side | 30.107 | −5.962 | 45.0 |
| 192 | Pressure-Side | 30.289 | −6.156 | 45.0 |
| 193 | Pressure-Side | 30.471 | −6.351 | 45.0 |
| 194 | Pressure-Side | 30.652 | −6.545 | 45.0 |
| 195 | Pressure-Side | 30.833 | −6.741 | 45.0 |
| 196 | Pressure-Side | 31.014 | −6.936 | 45.0 |
| 197 | Pressure-Side | 31.100 | −7.031 | 45.0 |
| 198 | Pressure-Side | 31.202 | −7.109 | 45.0 |
| 199 | Pressure-Side | 31.327 | −7.124 | 45.0 |
| 200 | Pressure-Side | 31.444 | −7.074 | 45.0 |
| 1 | Suction-Side | 11.815 | 6.185 | 60.0 |
| 2 | Suction-Side | 11.949 | 6.383 | 60.0 |
| 3 | Suction-Side | 12.167 | 6.494 | 60.0 |
| 4 | Suction-Side | 12.398 | 6.566 | 60.0 |
| 5 | Suction-Side | 12.635 | 6.624 | 60.0 |
| 6 | Suction-Side | 12.873 | 6.675 | 60.0 |
| 7 | Suction-Side | 13.111 | 6.716 | 60.0 |
| 8 | Suction-Side | 13.349 | 6.749 | 60.0 |
| 9 | Suction-Side | 13.589 | 6.772 | 60.0 |
| 10 | Suction-Side | 13.829 | 6.788 | 60.0 |
| 11 | Suction-Side | 14.069 | 6.794 | 60.0 |
| 12 | Suction-Side | 14.309 | 6.791 | 60.0 |
| 13 | Suction-Side | 14.551 | 6.781 | 60.0 |
| 14 | Suction-Side | 14.792 | 6.761 | 60.0 |
| 15 | Suction-Side | 15.033 | 6.734 | 60.0 |
| 16 | Suction-Side | 15.273 | 6.698 | 60.0 |
| 17 | Suction-Side | 15.510 | 6.655 | 60.0 |
| 18 | Suction-Side | 15.746 | 6.604 | 60.0 |
| 19 | Suction-Side | 15.978 | 6.547 | 60.0 |
| 20 | Suction-Side | 16.210 | 6.483 | 60.0 |
| 21 | Suction-Side | 16.439 | 6.412 | 60.0 |
| 22 | Suction-Side | 16.666 | 6.335 | 60.0 |
| 23 | Suction-Side | 16.892 | 6.252 | 60.0 |
| 24 | Suction-Side | 17.116 | 6.164 | 60.0 |
| 25 | Suction-Side | 17.338 | 6.069 | 60.0 |
| 26 | Suction-Side | 17.558 | 5.968 | 60.0 |
| 27 | Suction-Side | 17.776 | 5.862 | 60.0 |
| 28 | Suction-Side | 17.991 | 5.751 | 60.0 |
| 29 | Suction-Side | 18.202 | 5.636 | 60.0 |
| 30 | Suction-Side | 18.410 | 5.517 | 60.0 |
| 31 | Suction-Side | 18.615 | 5.393 | 60.0 |
| 32 | Suction-Side | 18.818 | 5.265 | 60.0 |
| 33 | Suction-Side | 19.018 | 5.133 | 60.0 |
| 34 | Suction-Side | 19.215 | 4.998 | 60.0 |
| 35 | Suction-Side | 19.409 | 4.859 | 60.0 |
| 36 | Suction-Side | 19.602 | 4.716 | 60.0 |
| 37 | Suction-Side | 19.792 | 4.570 | 60.0 |
| 38 | Suction-Side | 19.979 | 4.421 | 60.0 |
| 39 | Suction-Side | 20.165 | 4.269 | 60.0 |
| 40 | Suction-Side | 20.348 | 4.114 | 60.0 |
| 41 | Suction-Side | 20.529 | 3.956 | 60.0 |
| 42 | Suction-Side | 20.709 | 3.795 | 60.0 |
| 43 | Suction-Side | 20.887 | 3.632 | 60.0 |
| 44 | Suction-Side | 21.063 | 3.467 | 60.0 |
| 45 | Suction-Side | 21.237 | 3.300 | 60.0 |
| 46 | Suction-Side | 21.409 | 3.132 | 60.0 |
| 47 | Suction-Side | 21.579 | 2.962 | 60.0 |
| 48 | Suction-Side | 21.748 | 2.790 | 60.0 |
| 49 | Suction-Side | 21.915 | 2.617 | 60.0 |
| 50 | Suction-Side | 22.081 | 2.443 | 60.0 |
| 51 | Suction-Side | 22.244 | 2.267 | 60.0 |
| 52 | Suction-Side | 22.407 | 2.090 | 60.0 |
| 53 | Suction-Side | 22.568 | 1.912 | 60.0 |
| 54 | Suction-Side | 22.727 | 1.732 | 60.0 |
| 55 | Suction-Side | 22.886 | 1.551 | 60.0 |
| 56 | Suction-Side | 23.042 | 1.369 | 60.0 |
| 57 | Suction-Side | 23.198 | 1.186 | 60.0 |
| 58 | Suction-Side | 23.352 | 1.002 | 60.0 |
| 59 | Suction-Side | 23.505 | 0.816 | 60.0 |
| 60 | Suction-Side | 23.658 | 0.630 | 60.0 |
| 61 | Suction-Side | 23.810 | 0.444 | 60.0 |
| 62 | Suction-Side | 23.961 | 0.257 | 60.0 |
| 63 | Suction-Side | 24.112 | 0.070 | 60.0 |
| 64 | Suction-Side | 24.263 | −0.117 | 60.0 |
| 65 | Suction-Side | 24.414 | −0.304 | 60.0 |
| 66 | Suction-Side | 24.565 | −0.492 | 60.0 |
| 67 | Suction-Side | 24.716 | −0.679 | 60.0 |
| 68 | Suction-Side | 24.867 | −0.866 | 60.0 |
| 69 | Suction-Side | 25.018 | −1.054 | 60.0 |
| 70 | Suction-Side | 25.168 | −1.241 | 60.0 |
| 71 | Suction-Side | 25.319 | −1.429 | 60.0 |
| 72 | Suction-Side | 25.469 | −1.617 | 60.0 |
| 73 | Suction-Side | 25.619 | −1.805 | 60.0 |
| 74 | Suction-Side | 25.769 | −1.993 | 60.0 |
| 75 | Suction-Side | 25.919 | −2.181 | 60.0 |
| 76 | Suction-Side | 26.068 | −2.370 | 60.0 |
| 77 | Suction-Side | 26.217 | −2.558 | 60.0 |
| 78 | Suction-Side | 26.367 | −2.747 | 60.0 |
| 79 | Suction-Side | 26.515 | −2.936 | 60.0 |
| 80 | Suction-Side | 26.664 | −3.125 | 60.0 |
| 81 | Suction-Side | 26.812 | −3.315 | 60.0 |
| 82 | Suction-Side | 26.960 | −3.504 | 60.0 |
| 83 | Suction-Side | 27.108 | −3.694 | 60.0 |
| 84 | Suction-Side | 27.256 | −3.884 | 60.0 |
| 85 | Suction-Side | 27.404 | −4.074 | 60.0 |
| 86 | Suction-Side | 27.552 | −4.263 | 60.0 |
| 87 | Suction-Side | 27.699 | −4.453 | 60.0 |
| 88 | Suction-Side | 27.847 | −4.643 | 60.0 |
| 89 | Suction-Side | 27.995 | −4.833 | 60.0 |
| 90 | Suction-Side | 28.142 | −5.023 | 60.0 |
| 91 | Suction-Side | 28.290 | −5.213 | 60.0 |
| 92 | Suction-Side | 28.438 | −5.403 | 60.0 |

TABLE I-continued

[non-dimensionalized percentages]

| N | Location | X | Y | Z |
|---|---|---|---|---|
| 93 | Suction-Side | 28.585 | −5.593 | 60.0 |
| 94 | Suction-Side | 28.733 | −5.783 | 60.0 |
| 95 | Suction-Side | 28.879 | −5.973 | 60.0 |
| 96 | Suction-Side | 29.027 | −6.164 | 60.0 |
| 97 | Suction-Side | 29.104 | −6.263 | 60.0 |
| 98 | Suction-Side | 29.166 | −6.373 | 60.0 |
| 99 | Suction-Side | 29.160 | −6.499 | 60.0 |
| 100 | Suction-Side | 29.089 | −6.602 | 60.0 |
| 101 | Pressure-Side | 11.815 | 6.185 | 60.0 |
| 102 | Pressure-Side | 11.893 | 5.981 | 60.0 |
| 103 | Pressure-Side | 12.063 | 5.835 | 60.0 |
| 104 | Pressure-Side | 12.258 | 5.724 | 60.0 |
| 105 | Pressure-Side | 12.461 | 5.630 | 60.0 |
| 106 | Pressure-Side | 12.668 | 5.541 | 60.0 |
| 107 | Pressure-Side | 12.873 | 5.452 | 60.0 |
| 108 | Pressure-Side | 13.079 | 5.362 | 60.0 |
| 109 | Pressure-Side | 13.284 | 5.272 | 60.0 |
| 110 | Pressure-Side | 13.489 | 5.181 | 60.0 |
| 111 | Pressure-Side | 13.694 | 5.089 | 60.0 |
| 112 | Pressure-Side | 13.899 | 4.997 | 60.0 |
| 113 | Pressure-Side | 14.103 | 4.904 | 60.0 |
| 114 | Pressure-Side | 14.307 | 4.810 | 60.0 |
| 115 | Pressure-Side | 14.510 | 4.715 | 60.0 |
| 116 | Pressure-Side | 14.713 | 4.620 | 60.0 |
| 117 | Pressure-Side | 14.916 | 4.523 | 60.0 |
| 118 | Pressure-Side | 15.118 | 4.426 | 60.0 |
| 119 | Pressure-Side | 15.320 | 4.328 | 60.0 |
| 120 | Pressure-Side | 15.521 | 4.228 | 60.0 |
| 121 | Pressure-Side | 15.722 | 4.128 | 60.0 |
| 122 | Pressure-Side | 15.922 | 4.027 | 60.0 |
| 123 | Pressure-Side | 16.121 | 3.924 | 60.0 |
| 124 | Pressure-Side | 16.321 | 3.821 | 60.0 |
| 125 | Pressure-Side | 16.519 | 3.716 | 60.0 |
| 126 | Pressure-Side | 16.717 | 3.610 | 60.0 |
| 127 | Pressure-Side | 16.914 | 3.503 | 60.0 |
| 128 | Pressure-Side | 17.110 | 3.394 | 60.0 |
| 129 | Pressure-Side | 17.306 | 3.285 | 60.0 |
| 130 | Pressure-Side | 17.501 | 3.173 | 60.0 |
| 131 | Pressure-Side | 17.695 | 3.061 | 60.0 |
| 132 | Pressure-Side | 17.889 | 2.948 | 60.0 |
| 133 | Pressure-Side | 18.082 | 2.833 | 60.0 |
| 134 | Pressure-Side | 18.274 | 2.717 | 60.0 |
| 135 | Pressure-Side | 18.465 | 2.600 | 60.0 |
| 136 | Pressure-Side | 18.656 | 2.481 | 60.0 |
| 137 | Pressure-Side | 18.845 | 2.362 | 60.0 |
| 138 | Pressure-Side | 19.034 | 2.240 | 60.0 |
| 139 | Pressure-Side | 19.222 | 2.118 | 60.0 |
| 140 | Pressure-Side | 19.409 | 1.994 | 60.0 |
| 141 | Pressure-Side | 19.595 | 1.868 | 60.0 |
| 142 | Pressure-Side | 19.781 | 1.742 | 60.0 |
| 143 | Pressure-Side | 19.965 | 1.614 | 60.0 |
| 144 | Pressure-Side | 20.149 | 1.485 | 60.0 |
| 145 | Pressure-Side | 20.332 | 1.355 | 60.0 |
| 146 | Pressure-Side | 20.513 | 1.223 | 60.0 |
| 147 | Pressure-Side | 20.694 | 1.091 | 60.0 |
| 148 | Pressure-Side | 20.874 | 0.957 | 60.0 |
| 149 | Pressure-Side | 21.053 | 0.821 | 60.0 |
| 150 | Pressure-Side | 21.231 | 0.685 | 60.0 |
| 151 | Pressure-Side | 21.409 | 0.547 | 60.0 |
| 152 | Pressure-Side | 21.585 | 0.408 | 60.0 |
| 153 | Pressure-Side | 21.760 | 0.268 | 60.0 |
| 154 | Pressure-Side | 21.935 | 0.127 | 60.0 |
| 155 | Pressure-Side | 22.108 | −0.015 | 60.0 |
| 156 | Pressure-Side | 22.281 | −0.158 | 60.0 |
| 157 | Pressure-Side | 22.453 | −0.302 | 60.0 |
| 158 | Pressure-Side | 22.624 | −0.447 | 60.0 |
| 159 | Pressure-Side | 22.794 | −0.593 | 60.0 |
| 160 | Pressure-Side | 22.964 | −0.740 | 60.0 |
| 161 | Pressure-Side | 23.133 | −0.888 | 60.0 |
| 162 | Pressure-Side | 23.301 | −1.037 | 60.0 |
| 163 | Pressure-Side | 23.468 | −1.187 | 60.0 |
| 164 | Pressure-Side | 23.634 | −1.338 | 60.0 |
| 165 | Pressure-Side | 23.799 | −1.489 | 60.0 |
| 166 | Pressure-Side | 23.964 | −1.642 | 60.0 |
| 167 | Pressure-Side | 24.128 | −1.795 | 60.0 |
| 168 | Pressure-Side | 24.291 | −1.948 | 60.0 |
| 169 | Pressure-Side | 24.454 | −2.103 | 60.0 |
| 170 | Pressure-Side | 24.616 | −2.258 | 60.0 |
| 171 | Pressure-Side | 24.777 | −2.415 | 60.0 |
| 172 | Pressure-Side | 24.938 | −2.571 | 60.0 |
| 173 | Pressure-Side | 25.098 | −2.728 | 60.0 |
| 174 | Pressure-Side | 25.258 | −2.886 | 60.0 |
| 175 | Pressure-Side | 25.416 | −3.045 | 60.0 |
| 176 | Pressure-Side | 25.575 | −3.204 | 60.0 |
| 177 | Pressure-Side | 25.733 | −3.363 | 60.0 |
| 178 | Pressure-Side | 25.890 | −3.524 | 60.0 |
| 179 | Pressure-Side | 26.046 | −3.684 | 60.0 |
| 180 | Pressure-Side | 26.203 | −3.845 | 60.0 |
| 181 | Pressure-Side | 26.359 | −4.006 | 60.0 |
| 182 | Pressure-Side | 26.514 | −4.168 | 60.0 |
| 183 | Pressure-Side | 26.669 | −4.331 | 60.0 |
| 184 | Pressure-Side | 26.824 | −4.493 | 60.0 |
| 185 | Pressure-Side | 26.978 | −4.656 | 60.0 |
| 186 | Pressure-Side | 27.132 | −4.819 | 60.0 |
| 187 | Pressure-Side | 27.285 | −4.983 | 60.0 |
| 188 | Pressure-Side | 27.439 | −5.146 | 60.0 |
| 189 | Pressure-Side | 27.592 | −5.311 | 60.0 |
| 190 | Pressure-Side | 27.745 | −5.475 | 60.0 |
| 191 | Pressure-Side | 27.898 | −5.639 | 60.0 |
| 192 | Pressure-Side | 28.051 | −5.804 | 60.0 |
| 193 | Pressure-Side | 28.203 | −5.968 | 60.0 |
| 194 | Pressure-Side | 28.356 | −6.132 | 60.0 |
| 195 | Pressure-Side | 28.508 | −6.297 | 60.0 |
| 196 | Pressure-Side | 28.660 | −6.462 | 60.0 |
| 197 | Pressure-Side | 28.747 | −6.557 | 60.0 |
| 198 | Pressure-Side | 28.847 | −6.635 | 60.0 |
| 199 | Pressure-Side | 28.972 | −6.653 | 60.0 |
| 200 | Pressure-Side | 29.089 | −6.602 | 60.0 |
| 1 | Suction-Side | 13.152 | 6.872 | 70.0 |
| 2 | Suction-Side | 13.285 | 7.035 | 70.0 |
| 3 | Suction-Side | 13.484 | 7.116 | 70.0 |
| 4 | Suction-Side | 13.695 | 7.157 | 70.0 |
| 5 | Suction-Side | 13.909 | 7.180 | 70.0 |
| 6 | Suction-Side | 14.124 | 7.194 | 70.0 |
| 7 | Suction-Side | 14.340 | 7.197 | 70.0 |
| 8 | Suction-Side | 14.555 | 7.189 | 70.0 |
| 9 | Suction-Side | 14.770 | 7.170 | 70.0 |
| 10 | Suction-Side | 14.983 | 7.142 | 70.0 |
| 11 | Suction-Side | 15.195 | 7.104 | 70.0 |
| 12 | Suction-Side | 15.406 | 7.057 | 70.0 |
| 13 | Suction-Side | 15.614 | 7.002 | 70.0 |
| 14 | Suction-Side | 15.820 | 6.939 | 70.0 |
| 15 | Suction-Side | 16.023 | 6.868 | 70.0 |
| 16 | Suction-Side | 16.224 | 6.790 | 70.0 |
| 17 | Suction-Side | 16.422 | 6.705 | 70.0 |
| 18 | Suction-Side | 16.618 | 6.614 | 70.0 |
| 19 | Suction-Side | 16.810 | 6.517 | 70.0 |
| 20 | Suction-Side | 17.0 | 6.415 | 70.0 |
| 21 | Suction-Side | 17.186 | 6.307 | 70.0 |
| 22 | Suction-Side | 17.370 | 6.195 | 70.0 |
| 23 | Suction-Side | 17.552 | 6.079 | 70.0 |
| 24 | Suction-Side | 17.730 | 5.958 | 70.0 |
| 25 | Suction-Side | 17.906 | 5.833 | 70.0 |
| 26 | Suction-Side | 18.079 | 5.705 | 70.0 |
| 27 | Suction-Side | 18.249 | 5.573 | 70.0 |
| 28 | Suction-Side | 18.417 | 5.438 | 70.0 |
| 29 | Suction-Side | 18.582 | 5.300 | 70.0 |
| 30 | Suction-Side | 18.745 | 5.159 | 70.0 |
| 31 | Suction-Side | 18.905 | 5.015 | 70.0 |
| 32 | Suction-Side | 19.063 | 4.868 | 70.0 |
| 33 | Suction-Side | 19.219 | 4.720 | 70.0 |
| 34 | Suction-Side | 19.373 | 4.569 | 70.0 |
| 35 | Suction-Side | 19.525 | 4.415 | 70.0 |
| 36 | Suction-Side | 19.674 | 4.261 | 70.0 |
| 37 | Suction-Side | 19.822 | 4.104 | 70.0 |
| 38 | Suction-Side | 19.967 | 3.945 | 70.0 |
| 39 | Suction-Side | 20.112 | 3.785 | 70.0 |
| 40 | Suction-Side | 20.254 | 3.623 | 70.0 |
| 41 | Suction-Side | 20.395 | 3.460 | 70.0 |
| 42 | Suction-Side | 20.535 | 3.296 | 70.0 |
| 43 | Suction-Side | 20.675 | 3.132 | 70.0 |
| 44 | Suction-Side | 20.813 | 2.967 | 70.0 |

TABLE I-continued

[non-dimensionalized percentages]

| N | Location | X | Y | Z |
|---|---|---|---|---|
| 45 | Suction-Side | 20.950 | 2.801 | 70.0 |
| 46 | Suction-Side | 21.088 | 2.635 | 70.0 |
| 47 | Suction-Side | 21.224 | 2.468 | 70.0 |
| 48 | Suction-Side | 21.360 | 2.302 | 70.0 |
| 49 | Suction-Side | 21.497 | 2.134 | 70.0 |
| 50 | Suction-Side | 21.632 | 1.967 | 70.0 |
| 51 | Suction-Side | 21.768 | 1.799 | 70.0 |
| 52 | Suction-Side | 21.903 | 1.631 | 70.0 |
| 53 | Suction-Side | 22.037 | 1.463 | 70.0 |
| 54 | Suction-Side | 22.172 | 1.295 | 70.0 |
| 55 | Suction-Side | 22.306 | 1.126 | 70.0 |
| 56 | Suction-Side | 22.439 | 0.957 | 70.0 |
| 57 | Suction-Side | 22.573 | 0.788 | 70.0 |
| 58 | Suction-Side | 22.706 | 0.619 | 70.0 |
| 59 | Suction-Side | 22.839 | 0.449 | 70.0 |
| 60 | Suction-Side | 22.972 | 0.279 | 70.0 |
| 61 | Suction-Side | 23.104 | 0.109 | 70.0 |
| 62 | Suction-Side | 23.236 | −0.061 | 70.0 |
| 63 | Suction-Side | 23.368 | −0.231 | 70.0 |
| 64 | Suction-Side | 23.500 | −0.401 | 70.0 |
| 65 | Suction-Side | 23.632 | −0.572 | 70.0 |
| 66 | Suction-Side | 23.764 | −0.742 | 70.0 |
| 67 | Suction-Side | 23.895 | −0.913 | 70.0 |
| 68 | Suction-Side | 24.027 | −1.083 | 70.0 |
| 69 | Suction-Side | 24.159 | −1.254 | 70.0 |
| 70 | Suction-Side | 24.290 | −1.425 | 70.0 |
| 71 | Suction-Side | 24.421 | −1.596 | 70.0 |
| 72 | Suction-Side | 24.552 | −1.767 | 70.0 |
| 73 | Suction-Side | 24.683 | −1.938 | 70.0 |
| 74 | Suction-Side | 24.814 | −2.109 | 70.0 |
| 75 | Suction-Side | 24.945 | −2.280 | 70.0 |
| 76 | Suction-Side | 25.076 | −2.451 | 70.0 |
| 77 | Suction-Side | 25.206 | −2.623 | 70.0 |
| 78 | Suction-Side | 25.337 | −2.794 | 70.0 |
| 79 | Suction-Side | 25.467 | −2.966 | 70.0 |
| 80 | Suction-Side | 25.597 | −3.138 | 70.0 |
| 81 | Suction-Side | 25.727 | −3.309 | 70.0 |
| 82 | Suction-Side | 25.858 | −3.481 | 70.0 |
| 83 | Suction-Side | 25.988 | −3.653 | 70.0 |
| 84 | Suction-Side | 26.118 | −3.824 | 70.0 |
| 85 | Suction-Side | 26.248 | −3.996 | 70.0 |
| 86 | Suction-Side | 26.378 | −4.168 | 70.0 |
| 87 | Suction-Side | 26.508 | −4.340 | 70.0 |
| 88 | Suction-Side | 26.638 | −4.511 | 70.0 |
| 89 | Suction-Side | 26.768 | −4.683 | 70.0 |
| 90 | Suction-Side | 26.898 | −4.855 | 70.0 |
| 91 | Suction-Side | 27.029 | −5.026 | 70.0 |
| 92 | Suction-Side | 27.160 | −5.197 | 70.0 |
| 93 | Suction-Side | 27.292 | −5.368 | 70.0 |
| 94 | Suction-Side | 27.423 | −5.538 | 70.0 |
| 95 | Suction-Side | 27.553 | −5.711 | 70.0 |
| 96 | Suction-Side | 27.684 | −5.881 | 70.0 |
| 97 | Suction-Side | 27.763 | −5.980 | 70.0 |
| 98 | Suction-Side | 27.821 | −6.091 | 70.0 |
| 99 | Suction-Side | 27.817 | −6.216 | 70.0 |
| 100 | Suction-Side | 27.745 | −6.318 | 70.0 |
| 101 | Pressure-Side | 13.152 | 6.872 | 70.0 |
| 102 | Pressure-Side | 13.194 | 6.678 | 70.0 |
| 103 | Pressure-Side | 13.327 | 6.524 | 70.0 |
| 104 | Pressure-Side | 13.486 | 6.396 | 70.0 |
| 105 | Pressure-Side | 13.654 | 6.281 | 70.0 |
| 106 | Pressure-Side | 13.825 | 6.169 | 70.0 |
| 107 | Pressure-Side | 13.995 | 6.056 | 70.0 |
| 108 | Pressure-Side | 14.164 | 5.943 | 70.0 |
| 109 | Pressure-Side | 14.334 | 5.829 | 70.0 |
| 110 | Pressure-Side | 14.502 | 5.714 | 70.0 |
| 111 | Pressure-Side | 14.671 | 5.599 | 70.0 |
| 112 | Pressure-Side | 14.839 | 5.484 | 70.0 |
| 113 | Pressure-Side | 15.007 | 5.368 | 70.0 |
| 114 | Pressure-Side | 15.175 | 5.252 | 70.0 |
| 115 | Pressure-Side | 15.341 | 5.135 | 70.0 |
| 116 | Pressure-Side | 15.508 | 5.017 | 70.0 |
| 117 | Pressure-Side | 15.675 | 4.899 | 70.0 |
| 118 | Pressure-Side | 15.841 | 4.781 | 70.0 |
| 119 | Pressure-Side | 16.007 | 4.662 | 70.0 |
| 120 | Pressure-Side | 16.172 | 4.542 | 70.0 |
| 121 | Pressure-Side | 16.336 | 4.422 | 70.0 |
| 122 | Pressure-Side | 16.500 | 4.301 | 70.0 |
| 123 | Pressure-Side | 16.664 | 4.179 | 70.0 |
| 124 | Pressure-Side | 16.827 | 4.057 | 70.0 |
| 125 | Pressure-Side | 16.990 | 3.934 | 70.0 |
| 126 | Pressure-Side | 17.152 | 3.810 | 70.0 |
| 127 | Pressure-Side | 17.313 | 3.686 | 70.0 |
| 128 | Pressure-Side | 17.474 | 3.560 | 70.0 |
| 129 | Pressure-Side | 17.634 | 3.434 | 70.0 |
| 130 | Pressure-Side | 17.794 | 3.308 | 70.0 |
| 131 | Pressure-Side | 17.953 | 3.181 | 70.0 |
| 132 | Pressure-Side | 18.112 | 3.053 | 70.0 |
| 133 | Pressure-Side | 18.270 | 2.924 | 70.0 |
| 134 | Pressure-Side | 18.427 | 2.794 | 70.0 |
| 135 | Pressure-Side | 18.584 | 2.664 | 70.0 |
| 136 | Pressure-Side | 18.741 | 2.533 | 70.0 |
| 137 | Pressure-Side | 18.896 | 2.402 | 70.0 |
| 138 | Pressure-Side | 19.051 | 2.269 | 70.0 |
| 139 | Pressure-Side | 19.206 | 2.136 | 70.0 |
| 140 | Pressure-Side | 19.360 | 2.003 | 70.0 |
| 141 | Pressure-Side | 19.513 | 1.868 | 70.0 |
| 142 | Pressure-Side | 19.665 | 1.733 | 70.0 |
| 143 | Pressure-Side | 19.818 | 1.597 | 70.0 |
| 144 | Pressure-Side | 19.969 | 1.461 | 70.0 |
| 145 | Pressure-Side | 20.120 | 1.324 | 70.0 |
| 146 | Pressure-Side | 20.271 | 1.186 | 70.0 |
| 147 | Pressure-Side | 20.420 | 1.047 | 70.0 |
| 148 | Pressure-Side | 20.570 | 0.909 | 70.0 |
| 149 | Pressure-Side | 20.718 | 0.769 | 70.0 |
| 150 | Pressure-Side | 20.867 | 0.629 | 70.0 |
| 151 | Pressure-Side | 21.014 | 0.489 | 70.0 |
| 152 | Pressure-Side | 21.161 | 0.348 | 70.0 |
| 153 | Pressure-Side | 21.308 | 0.206 | 70.0 |
| 154 | Pressure-Side | 21.454 | 0.064 | 70.0 |
| 155 | Pressure-Side | 21.599 | −0.078 | 70.0 |
| 156 | Pressure-Side | 21.745 | −0.221 | 70.0 |
| 157 | Pressure-Side | 21.890 | −0.365 | 70.0 |
| 158 | Pressure-Side | 22.034 | −0.508 | 70.0 |
| 159 | Pressure-Side | 22.178 | −0.653 | 70.0 |
| 160 | Pressure-Side | 22.321 | −0.797 | 70.0 |
| 161 | Pressure-Side | 22.464 | −0.943 | 70.0 |
| 162 | Pressure-Side | 22.607 | −1.088 | 70.0 |
| 163 | Pressure-Side | 22.749 | −1.234 | 70.0 |
| 164 | Pressure-Side | 22.891 | −1.381 | 70.0 |
| 165 | Pressure-Side | 23.033 | −1.527 | 70.0 |
| 166 | Pressure-Side | 23.174 | −1.674 | 70.0 |
| 167 | Pressure-Side | 23.315 | −1.821 | 70.0 |
| 168 | Pressure-Side | 23.456 | −1.969 | 70.0 |
| 169 | Pressure-Side | 23.596 | −2.117 | 70.0 |
| 170 | Pressure-Side | 23.736 | −2.265 | 70.0 |
| 171 | Pressure-Side | 23.876 | −2.414 | 70.0 |
| 172 | Pressure-Side | 24.016 | −2.562 | 70.0 |
| 173 | Pressure-Side | 24.155 | −2.711 | 70.0 |
| 174 | Pressure-Side | 24.294 | −2.860 | 70.0 |
| 175 | Pressure-Side | 24.433 | −3.009 | 70.0 |
| 176 | Pressure-Side | 24.572 | −3.159 | 70.0 |
| 177 | Pressure-Side | 24.710 | −3.309 | 70.0 |
| 178 | Pressure-Side | 24.848 | −3.459 | 70.0 |
| 179 | Pressure-Side | 24.986 | −3.609 | 70.0 |
| 180 | Pressure-Side | 25.125 | −3.759 | 70.0 |
| 181 | Pressure-Side | 25.262 | −3.909 | 70.0 |
| 182 | Pressure-Side | 25.400 | −4.060 | 70.0 |
| 183 | Pressure-Side | 25.538 | −4.210 | 70.0 |
| 184 | Pressure-Side | 25.675 | −4.361 | 70.0 |
| 185 | Pressure-Side | 25.812 | −4.511 | 70.0 |
| 186 | Pressure-Side | 25.949 | −4.662 | 70.0 |
| 187 | Pressure-Side | 26.087 | −4.813 | 70.0 |
| 188 | Pressure-Side | 26.224 | −4.964 | 70.0 |
| 189 | Pressure-Side | 26.360 | −5.115 | 70.0 |
| 190 | Pressure-Side | 26.498 | −5.266 | 70.0 |
| 191 | Pressure-Side | 26.635 | −5.417 | 70.0 |
| 192 | Pressure-Side | 26.772 | −5.568 | 70.0 |
| 193 | Pressure-Side | 26.909 | −5.719 | 70.0 |
| 194 | Pressure-Side | 27.046 | −5.870 | 70.0 |
| 195 | Pressure-Side | 27.183 | −6.021 | 70.0 |
| 196 | Pressure-Side | 27.320 | −6.172 | 70.0 |

TABLE I-continued

[non-dimensionalized percentages]

| N | Location | X | Y | Z |
|---|---|---|---|---|
| 197 | Pressure-Side | 27.406 | −6.267 | 70.0 |
| 198 | Pressure-Side | 27.504 | −6.347 | 70.0 |
| 199 | Pressure-Side | 27.629 | −6.366 | 70.0 |
| 200 | Pressure-Side | 27.745 | −6.318 | 70.0 |
| 1 | Suction-Side | 14.193 | 7.390 | 80.0 |
| 2 | Suction-Side | 14.336 | 7.522 | 80.0 |
| 3 | Suction-Side | 14.530 | 7.570 | 80.0 |
| 4 | Suction-Side | 14.728 | 7.578 | 80.0 |
| 5 | Suction-Side | 14.926 | 7.566 | 80.0 |
| 6 | Suction-Side | 15.123 | 7.538 | 80.0 |
| 7 | Suction-Side | 15.317 | 7.498 | 80.0 |
| 8 | Suction-Side | 15.507 | 7.445 | 80.0 |
| 9 | Suction-Side | 15.693 | 7.382 | 80.0 |
| 10 | Suction-Side | 15.876 | 7.310 | 80.0 |
| 11 | Suction-Side | 16.057 | 7.230 | 80.0 |
| 12 | Suction-Side | 16.235 | 7.142 | 80.0 |
| 13 | Suction-Side | 16.408 | 7.048 | 80.0 |
| 14 | Suction-Side | 16.578 | 6.948 | 80.0 |
| 15 | Suction-Side | 16.745 | 6.844 | 80.0 |
| 16 | Suction-Side | 16.907 | 6.736 | 80.0 |
| 17 | Suction-Side | 17.068 | 6.623 | 80.0 |
| 18 | Suction-Side | 17.225 | 6.506 | 80.0 |
| 19 | Suction-Side | 17.380 | 6.386 | 80.0 |
| 20 | Suction-Side | 17.532 | 6.262 | 80.0 |
| 21 | Suction-Side | 17.681 | 6.135 | 80.0 |
| 22 | Suction-Side | 17.829 | 6.005 | 80.0 |
| 23 | Suction-Side | 17.974 | 5.871 | 80.0 |
| 24 | Suction-Side | 18.117 | 5.736 | 80.0 |
| 25 | Suction-Side | 18.257 | 5.598 | 80.0 |
| 26 | Suction-Side | 18.395 | 5.458 | 80.0 |
| 27 | Suction-Side | 18.532 | 5.316 | 80.0 |
| 28 | Suction-Side | 18.666 | 5.173 | 80.0 |
| 29 | Suction-Side | 18.798 | 5.028 | 80.0 |
| 30 | Suction-Side | 18.928 | 4.882 | 80.0 |
| 31 | Suction-Side | 19.057 | 4.734 | 80.0 |
| 32 | Suction-Side | 19.184 | 4.585 | 80.0 |
| 33 | Suction-Side | 19.310 | 4.435 | 80.0 |
| 34 | Suction-Side | 19.435 | 4.284 | 80.0 |
| 35 | Suction-Side | 19.558 | 4.132 | 80.0 |
| 36 | Suction-Side | 19.681 | 3.979 | 80.0 |
| 37 | Suction-Side | 19.802 | 3.825 | 80.0 |
| 38 | Suction-Side | 19.923 | 3.671 | 80.0 |
| 39 | Suction-Side | 20.043 | 3.516 | 80.0 |
| 40 | Suction-Side | 20.162 | 3.360 | 80.0 |
| 41 | Suction-Side | 20.280 | 3.203 | 80.0 |
| 42 | Suction-Side | 20.398 | 3.047 | 80.0 |
| 43 | Suction-Side | 20.516 | 2.890 | 80.0 |
| 44 | Suction-Side | 20.633 | 2.733 | 80.0 |
| 45 | Suction-Side | 20.750 | 2.576 | 80.0 |
| 46 | Suction-Side | 20.867 | 2.418 | 80.0 |
| 47 | Suction-Side | 20.984 | 2.261 | 80.0 |
| 48 | Suction-Side | 21.101 | 2.104 | 80.0 |
| 49 | Suction-Side | 21.218 | 1.946 | 80.0 |
| 50 | Suction-Side | 21.335 | 1.788 | 80.0 |
| 51 | Suction-Side | 21.452 | 1.631 | 80.0 |
| 52 | Suction-Side | 21.568 | 1.473 | 80.0 |
| 53 | Suction-Side | 21.685 | 1.316 | 80.0 |
| 54 | Suction-Side | 21.802 | 1.158 | 80.0 |
| 55 | Suction-Side | 21.918 | 1.0 | 80.0 |
| 56 | Suction-Side | 22.035 | 0.843 | 80.0 |
| 57 | Suction-Side | 22.151 | 0.685 | 80.0 |
| 58 | Suction-Side | 22.268 | 0.527 | 80.0 |
| 59 | Suction-Side | 22.384 | 0.370 | 80.0 |
| 60 | Suction-Side | 22.501 | 0.212 | 80.0 |
| 61 | Suction-Side | 22.617 | 0.053 | 80.0 |
| 62 | Suction-Side | 22.733 | −0.104 | 80.0 |
| 63 | Suction-Side | 22.849 | −0.263 | 80.0 |
| 64 | Suction-Side | 22.966 | −0.420 | 80.0 |
| 65 | Suction-Side | 23.082 | −0.579 | 80.0 |
| 66 | Suction-Side | 23.197 | −0.737 | 80.0 |
| 67 | Suction-Side | 23.313 | −0.895 | 80.0 |
| 68 | Suction-Side | 23.429 | −1.053 | 80.0 |
| 69 | Suction-Side | 23.544 | −1.212 | 80.0 |
| 70 | Suction-Side | 23.660 | −1.370 | 80.0 |
| 71 | Suction-Side | 23.776 | −1.529 | 80.0 |
| 72 | Suction-Side | 23.891 | −1.688 | 80.0 |
| 73 | Suction-Side | 24.006 | −1.846 | 80.0 |
| 74 | Suction-Side | 24.121 | −2.005 | 80.0 |
| 75 | Suction-Side | 24.236 | −2.164 | 80.0 |
| 76 | Suction-Side | 24.351 | −2.323 | 80.0 |
| 77 | Suction-Side | 24.466 | −2.482 | 80.0 |
| 78 | Suction-Side | 24.581 | −2.641 | 80.0 |
| 79 | Suction-Side | 24.696 | −2.800 | 80.0 |
| 80 | Suction-Side | 24.811 | −2.959 | 80.0 |
| 81 | Suction-Side | 24.925 | −3.118 | 80.0 |
| 82 | Suction-Side | 25.040 | −3.277 | 80.0 |
| 83 | Suction-Side | 25.155 | −3.436 | 80.0 |
| 84 | Suction-Side | 25.270 | −3.595 | 80.0 |
| 85 | Suction-Side | 25.384 | −3.754 | 80.0 |
| 86 | Suction-Side | 25.499 | −3.913 | 80.0 |
| 87 | Suction-Side | 25.614 | −4.072 | 80.0 |
| 88 | Suction-Side | 25.729 | −4.231 | 80.0 |
| 89 | Suction-Side | 25.844 | −4.390 | 80.0 |
| 90 | Suction-Side | 25.959 | −4.549 | 80.0 |
| 91 | Suction-Side | 26.074 | −4.707 | 80.0 |
| 92 | Suction-Side | 26.189 | −4.866 | 80.0 |
| 93 | Suction-Side | 26.305 | −5.024 | 80.0 |
| 94 | Suction-Side | 26.421 | −5.183 | 80.0 |
| 95 | Suction-Side | 26.537 | −5.341 | 80.0 |
| 96 | Suction-Side | 26.652 | −5.499 | 80.0 |
| 97 | Suction-Side | 26.727 | −5.602 | 80.0 |
| 98 | Suction-Side | 26.784 | −5.712 | 80.0 |
| 99 | Suction-Side | 26.776 | −5.838 | 80.0 |
| 100 | Suction-Side | 26.703 | −5.938 | 80.0 |
| 101 | Pressure-Side | 14.193 | 7.390 | 80.0 |
| 102 | Pressure-Side | 14.200 | 7.206 | 80.0 |
| 103 | Pressure-Side | 14.296 | 7.043 | 80.0 |
| 104 | Pressure-Side | 14.420 | 6.901 | 80.0 |
| 105 | Pressure-Side | 14.552 | 6.766 | 80.0 |
| 106 | Pressure-Side | 14.687 | 6.634 | 80.0 |
| 107 | Pressure-Side | 14.822 | 6.502 | 80.0 |
| 108 | Pressure-Side | 14.956 | 6.369 | 80.0 |
| 109 | Pressure-Side | 15.091 | 6.236 | 80.0 |
| 110 | Pressure-Side | 15.225 | 6.103 | 80.0 |
| 111 | Pressure-Side | 15.359 | 5.970 | 80.0 |
| 112 | Pressure-Side | 15.492 | 5.837 | 80.0 |
| 113 | Pressure-Side | 15.627 | 5.704 | 80.0 |
| 114 | Pressure-Side | 15.761 | 5.572 | 80.0 |
| 115 | Pressure-Side | 15.895 | 5.439 | 80.0 |
| 116 | Pressure-Side | 16.029 | 5.306 | 80.0 |
| 117 | Pressure-Side | 16.163 | 5.173 | 80.0 |
| 118 | Pressure-Side | 16.297 | 5.039 | 80.0 |
| 119 | Pressure-Side | 16.431 | 4.906 | 80.0 |
| 120 | Pressure-Side | 16.564 | 4.772 | 80.0 |
| 121 | Pressure-Side | 16.698 | 4.639 | 80.0 |
| 122 | Pressure-Side | 16.831 | 4.505 | 80.0 |
| 123 | Pressure-Side | 16.964 | 4.371 | 80.0 |
| 124 | Pressure-Side | 17.098 | 4.238 | 80.0 |
| 125 | Pressure-Side | 17.231 | 4.104 | 80.0 |
| 126 | Pressure-Side | 17.364 | 3.970 | 80.0 |
| 127 | Pressure-Side | 17.497 | 3.836 | 80.0 |
| 128 | Pressure-Side | 17.630 | 3.701 | 80.0 |
| 129 | Pressure-Side | 17.762 | 3.567 | 80.0 |
| 130 | Pressure-Side | 17.895 | 3.432 | 80.0 |
| 131 | Pressure-Side | 18.027 | 3.298 | 80.0 |
| 132 | Pressure-Side | 18.159 | 3.163 | 80.0 |
| 133 | Pressure-Side | 18.291 | 3.028 | 80.0 |
| 134 | Pressure-Side | 18.423 | 2.893 | 80.0 |
| 135 | Pressure-Side | 18.555 | 2.757 | 80.0 |
| 136 | Pressure-Side | 18.686 | 2.622 | 80.0 |
| 137 | Pressure-Side | 18.818 | 2.486 | 80.0 |
| 138 | Pressure-Side | 18.948 | 2.350 | 80.0 |
| 139 | Pressure-Side | 19.079 | 2.214 | 80.0 |
| 140 | Pressure-Side | 19.210 | 2.078 | 80.0 |
| 141 | Pressure-Side | 19.341 | 1.942 | 80.0 |
| 142 | Pressure-Side | 19.471 | 1.805 | 80.0 |
| 143 | Pressure-Side | 19.602 | 1.668 | 80.0 |
| 144 | Pressure-Side | 19.732 | 1.531 | 80.0 |
| 145 | Pressure-Side | 19.862 | 1.394 | 80.0 |
| 146 | Pressure-Side | 19.991 | 1.257 | 80.0 |
| 147 | Pressure-Side | 20.121 | 1.120 | 80.0 |
| 148 | Pressure-Side | 20.250 | 0.982 | 80.0 |

TABLE I-continued

[non-dimensionalized percentages]

| N | Location | X | Y | Z |
|---|---|---|---|---|
| 149 | Pressure-Side | 20.379 | 0.844 | 80.0 |
| 150 | Pressure-Side | 20.509 | 0.707 | 80.0 |
| 151 | Pressure-Side | 20.638 | 0.569 | 80.0 |
| 152 | Pressure-Side | 20.766 | 0.431 | 80.0 |
| 153 | Pressure-Side | 20.895 | 0.292 | 80.0 |
| 154 | Pressure-Side | 21.024 | 0.154 | 80.0 |
| 155 | Pressure-Side | 21.152 | 0.016 | 80.0 |
| 156 | Pressure-Side | 21.280 | −0.123 | 80.0 |
| 157 | Pressure-Side | 21.409 | −0.262 | 80.0 |
| 158 | Pressure-Side | 21.537 | −0.401 | 80.0 |
| 159 | Pressure-Side | 21.664 | −0.539 | 80.0 |
| 160 | Pressure-Side | 21.792 | −0.679 | 80.0 |
| 161 | Pressure-Side | 21.920 | −0.818 | 80.0 |
| 162 | Pressure-Side | 22.047 | −0.957 | 80.0 |
| 163 | Pressure-Side | 22.175 | −1.097 | 80.0 |
| 164 | Pressure-Side | 22.302 | −1.236 | 80.0 |
| 165 | Pressure-Side | 22.429 | −1.376 | 80.0 |
| 166 | Pressure-Side | 22.555 | −1.516 | 80.0 |
| 167 | Pressure-Side | 22.682 | −1.656 | 80.0 |
| 168 | Pressure-Side | 22.809 | −1.796 | 80.0 |
| 169 | Pressure-Side | 22.935 | −1.936 | 80.0 |
| 170 | Pressure-Side | 23.062 | −2.077 | 80.0 |
| 171 | Pressure-Side | 23.188 | −2.217 | 80.0 |
| 172 | Pressure-Side | 23.314 | −2.358 | 80.0 |
| 173 | Pressure-Side | 23.439 | −2.498 | 80.0 |
| 174 | Pressure-Side | 23.565 | −2.640 | 80.0 |
| 175 | Pressure-Side | 23.690 | −2.781 | 80.0 |
| 176 | Pressure-Side | 23.815 | −2.923 | 80.0 |
| 177 | Pressure-Side | 23.940 | −3.064 | 80.0 |
| 178 | Pressure-Side | 24.065 | −3.206 | 80.0 |
| 179 | Pressure-Side | 24.189 | −3.348 | 80.0 |
| 180 | Pressure-Side | 24.314 | −3.490 | 80.0 |
| 181 | Pressure-Side | 24.438 | −3.632 | 80.0 |
| 182 | Pressure-Side | 24.562 | −3.775 | 80.0 |
| 183 | Pressure-Side | 24.686 | −3.917 | 80.0 |
| 184 | Pressure-Side | 24.810 | −4.060 | 80.0 |
| 185 | Pressure-Side | 24.934 | −4.202 | 80.0 |
| 186 | Pressure-Side | 25.057 | −4.345 | 80.0 |
| 187 | Pressure-Side | 25.180 | −4.488 | 80.0 |
| 188 | Pressure-Side | 25.304 | −4.631 | 80.0 |
| 189 | Pressure-Side | 25.427 | −4.775 | 80.0 |
| 190 | Pressure-Side | 25.549 | −4.918 | 80.0 |
| 191 | Pressure-Side | 25.672 | −5.062 | 80.0 |
| 192 | Pressure-Side | 25.794 | −5.206 | 80.0 |
| 193 | Pressure-Side | 25.917 | −5.349 | 80.0 |
| 194 | Pressure-Side | 26.040 | −5.492 | 80.0 |
| 195 | Pressure-Side | 26.162 | −5.636 | 80.0 |
| 196 | Pressure-Side | 26.283 | −5.781 | 80.0 |
| 197 | Pressure-Side | 26.365 | −5.879 | 80.0 |
| 198 | Pressure-Side | 26.462 | −5.960 | 80.0 |
| 199 | Pressure-Side | 26.585 | −5.983 | 80.0 |
| 200 | Pressure-Side | 26.703 | −5.938 | 80.0 |
| 1 | Suction-Side | 14.847 | 7.870 | 90.0 |
| 2 | Suction-Side | 14.993 | 7.975 | 90.0 |
| 3 | Suction-Side | 15.176 | 7.996 | 90.0 |
| 4 | Suction-Side | 15.361 | 7.979 | 90.0 |
| 5 | Suction-Side | 15.542 | 7.940 | 90.0 |
| 6 | Suction-Side | 15.718 | 7.883 | 90.0 |
| 7 | Suction-Side | 15.890 | 7.813 | 90.0 |
| 8 | Suction-Side | 16.056 | 7.731 | 90.0 |
| 9 | Suction-Side | 16.217 | 7.640 | 90.0 |
| 10 | Suction-Side | 16.374 | 7.541 | 90.0 |
| 11 | Suction-Side | 16.527 | 7.437 | 90.0 |
| 12 | Suction-Side | 16.676 | 7.327 | 90.0 |
| 13 | Suction-Side | 16.821 | 7.212 | 90.0 |
| 14 | Suction-Side | 16.963 | 7.093 | 90.0 |
| 15 | Suction-Side | 17.102 | 6.970 | 90.0 |
| 16 | Suction-Side | 17.239 | 6.845 | 90.0 |
| 17 | Suction-Side | 17.372 | 6.717 | 90.0 |
| 18 | Suction-Side | 17.504 | 6.587 | 90.0 |
| 19 | Suction-Side | 17.633 | 6.454 | 90.0 |
| 20 | Suction-Side | 17.760 | 6.319 | 90.0 |
| 21 | Suction-Side | 17.885 | 6.182 | 90.0 |
| 22 | Suction-Side | 18.008 | 6.043 | 90.0 |
| 23 | Suction-Side | 18.129 | 5.903 | 90.0 |
| 24 | Suction-Side | 18.248 | 5.761 | 90.0 |
| 25 | Suction-Side | 18.366 | 5.618 | 90.0 |
| 26 | Suction-Side | 18.482 | 5.474 | 90.0 |
| 27 | Suction-Side | 18.598 | 5.329 | 90.0 |
| 28 | Suction-Side | 18.712 | 5.183 | 90.0 |
| 29 | Suction-Side | 18.825 | 5.036 | 90.0 |
| 30 | Suction-Side | 18.937 | 4.889 | 90.0 |
| 31 | Suction-Side | 19.048 | 4.741 | 90.0 |
| 32 | Suction-Side | 19.159 | 4.592 | 90.0 |
| 33 | Suction-Side | 19.269 | 4.443 | 90.0 |
| 34 | Suction-Side | 19.378 | 4.294 | 90.0 |
| 35 | Suction-Side | 19.487 | 4.144 | 90.0 |
| 36 | Suction-Side | 19.595 | 3.994 | 90.0 |
| 37 | Suction-Side | 19.703 | 3.843 | 90.0 |
| 38 | Suction-Side | 19.811 | 3.692 | 90.0 |
| 39 | Suction-Side | 19.919 | 3.542 | 90.0 |
| 40 | Suction-Side | 20.026 | 3.391 | 90.0 |
| 41 | Suction-Side | 20.133 | 3.240 | 90.0 |
| 42 | Suction-Side | 20.240 | 3.088 | 90.0 |
| 43 | Suction-Side | 20.347 | 2.937 | 90.0 |
| 44 | Suction-Side | 20.454 | 2.786 | 90.0 |
| 45 | Suction-Side | 20.560 | 2.634 | 90.0 |
| 46 | Suction-Side | 20.667 | 2.483 | 90.0 |
| 47 | Suction-Side | 20.773 | 2.331 | 90.0 |
| 48 | Suction-Side | 20.879 | 2.179 | 90.0 |
| 49 | Suction-Side | 20.985 | 2.027 | 90.0 |
| 50 | Suction-Side | 21.091 | 1.875 | 90.0 |
| 51 | Suction-Side | 21.197 | 1.723 | 90.0 |
| 52 | Suction-Side | 21.303 | 1.571 | 90.0 |
| 53 | Suction-Side | 21.408 | 1.419 | 90.0 |
| 54 | Suction-Side | 21.514 | 1.266 | 90.0 |
| 55 | Suction-Side | 21.620 | 1.114 | 90.0 |
| 56 | Suction-Side | 21.725 | 0.962 | 90.0 |
| 57 | Suction-Side | 21.830 | 0.810 | 90.0 |
| 58 | Suction-Side | 21.936 | 0.657 | 90.0 |
| 59 | Suction-Side | 22.041 | 0.505 | 90.0 |
| 60 | Suction-Side | 22.146 | 0.352 | 90.0 |
| 61 | Suction-Side | 22.251 | 0.200 | 90.0 |
| 62 | Suction-Side | 22.356 | 0.047 | 90.0 |
| 63 | Suction-Side | 22.461 | −0.105 | 90.0 |
| 64 | Suction-Side | 22.566 | −0.258 | 90.0 |
| 65 | Suction-Side | 22.672 | −0.410 | 90.0 |
| 66 | Suction-Side | 22.777 | −0.563 | 90.0 |
| 67 | Suction-Side | 22.881 | −0.716 | 90.0 |
| 68 | Suction-Side | 22.986 | −0.868 | 90.0 |
| 69 | Suction-Side | 23.091 | −1.021 | 90.0 |
| 70 | Suction-Side | 23.196 | −1.174 | 90.0 |
| 71 | Suction-Side | 23.301 | −1.327 | 90.0 |
| 72 | Suction-Side | 23.406 | −1.480 | 90.0 |
| 73 | Suction-Side | 23.511 | −1.632 | 90.0 |
| 74 | Suction-Side | 23.615 | −1.785 | 90.0 |
| 75 | Suction-Side | 23.720 | −1.938 | 90.0 |
| 76 | Suction-Side | 23.825 | −2.090 | 90.0 |
| 77 | Suction-Side | 23.930 | −2.243 | 90.0 |
| 78 | Suction-Side | 24.034 | −2.396 | 90.0 |
| 79 | Suction-Side | 24.139 | −2.549 | 90.0 |
| 80 | Suction-Side | 24.244 | −2.702 | 90.0 |
| 81 | Suction-Side | 24.348 | −2.855 | 90.0 |
| 82 | Suction-Side | 24.452 | −3.008 | 90.0 |
| 83 | Suction-Side | 24.557 | −3.161 | 90.0 |
| 84 | Suction-Side | 24.661 | −3.314 | 90.0 |
| 85 | Suction-Side | 24.766 | −3.467 | 90.0 |
| 86 | Suction-Side | 24.870 | −3.620 | 90.0 |
| 87 | Suction-Side | 24.975 | −3.773 | 90.0 |
| 88 | Suction-Side | 25.079 | −3.926 | 90.0 |
| 89 | Suction-Side | 25.183 | −4.079 | 90.0 |
| 90 | Suction-Side | 25.287 | −4.232 | 90.0 |
| 91 | Suction-Side | 25.391 | −4.385 | 90.0 |
| 92 | Suction-Side | 25.496 | −4.538 | 90.0 |
| 93 | Suction-Side | 25.601 | −4.691 | 90.0 |
| 94 | Suction-Side | 25.706 | −4.844 | 90.0 |
| 95 | Suction-Side | 25.809 | −4.997 | 90.0 |
| 96 | Suction-Side | 25.912 | −5.151 | 90.0 |
| 97 | Suction-Side | 25.985 | −5.256 | 90.0 |
| 98 | Suction-Side | 26.037 | −5.371 | 90.0 |
| 99 | Suction-Side | 26.025 | −5.495 | 90.0 |
| 100 | Suction-Side | 25.948 | −5.594 | 90.0 |

TABLE I-continued

[non-dimensionalized percentages]

| N | Location | X | Y | Z |
|---|---|---|---|---|
| 101 | Pressure-Side | 14.847 | 7.870 | 90.0 |
| 102 | Pressure-Side | 14.832 | 7.695 | 90.0 |
| 103 | Pressure-Side | 14.900 | 7.528 | 90.0 |
| 104 | Pressure-Side | 14.997 | 7.377 | 90.0 |
| 105 | Pressure-Side | 15.102 | 7.230 | 90.0 |
| 106 | Pressure-Side | 15.208 | 7.084 | 90.0 |
| 107 | Pressure-Side | 15.314 | 6.939 | 90.0 |
| 108 | Pressure-Side | 15.420 | 6.793 | 90.0 |
| 109 | Pressure-Side | 15.527 | 6.648 | 90.0 |
| 110 | Pressure-Side | 15.634 | 6.502 | 90.0 |
| 111 | Pressure-Side | 15.742 | 6.358 | 90.0 |
| 112 | Pressure-Side | 15.850 | 6.214 | 90.0 |
| 113 | Pressure-Side | 15.958 | 6.069 | 90.0 |
| 114 | Pressure-Side | 16.067 | 5.926 | 90.0 |
| 115 | Pressure-Side | 16.176 | 5.782 | 90.0 |
| 116 | Pressure-Side | 16.286 | 5.639 | 90.0 |
| 117 | Pressure-Side | 16.396 | 5.496 | 90.0 |
| 118 | Pressure-Side | 16.506 | 5.354 | 90.0 |
| 119 | Pressure-Side | 16.617 | 5.211 | 90.0 |
| 120 | Pressure-Side | 16.728 | 5.069 | 90.0 |
| 121 | Pressure-Side | 16.839 | 4.927 | 90.0 |
| 122 | Pressure-Side | 16.951 | 4.786 | 90.0 |
| 123 | Pressure-Side | 17.063 | 4.644 | 90.0 |
| 124 | Pressure-Side | 17.175 | 4.503 | 90.0 |
| 125 | Pressure-Side | 17.288 | 4.362 | 90.0 |
| 126 | Pressure-Side | 17.401 | 4.222 | 90.0 |
| 127 | Pressure-Side | 17.514 | 4.082 | 90.0 |
| 128 | Pressure-Side | 17.628 | 3.942 | 90.0 |
| 129 | Pressure-Side | 17.741 | 3.802 | 90.0 |
| 130 | Pressure-Side | 17.855 | 3.662 | 90.0 |
| 131 | Pressure-Side | 17.970 | 3.522 | 90.0 |
| 132 | Pressure-Side | 18.084 | 3.383 | 90.0 |
| 133 | Pressure-Side | 18.199 | 3.244 | 90.0 |
| 134 | Pressure-Side | 18.314 | 3.105 | 90.0 |
| 135 | Pressure-Side | 18.430 | 2.967 | 90.0 |
| 136 | Pressure-Side | 18.545 | 2.829 | 90.0 |
| 137 | Pressure-Side | 18.661 | 2.690 | 90.0 |
| 138 | Pressure-Side | 18.777 | 2.552 | 90.0 |
| 139 | Pressure-Side | 18.893 | 2.414 | 90.0 |
| 140 | Pressure-Side | 19.009 | 2.277 | 90.0 |
| 141 | Pressure-Side | 19.126 | 2.139 | 90.0 |
| 142 | Pressure-Side | 19.242 | 2.002 | 90.0 |
| 143 | Pressure-Side | 19.360 | 1.864 | 90.0 |
| 144 | Pressure-Side | 19.477 | 1.727 | 90.0 |
| 145 | Pressure-Side | 19.594 | 1.590 | 90.0 |
| 146 | Pressure-Side | 19.711 | 1.453 | 90.0 |
| 147 | Pressure-Side | 19.829 | 1.317 | 90.0 |
| 148 | Pressure-Side | 19.947 | 1.180 | 90.0 |
| 149 | Pressure-Side | 20.064 | 1.043 | 90.0 |
| 150 | Pressure-Side | 20.182 | 0.907 | 90.0 |
| 151 | Pressure-Side | 20.300 | 0.770 | 90.0 |
| 152 | Pressure-Side | 20.418 | 0.634 | 90.0 |
| 153 | Pressure-Side | 20.536 | 0.498 | 90.0 |
| 154 | Pressure-Side | 20.654 | 0.362 | 90.0 |
| 155 | Pressure-Side | 20.773 | 0.226 | 90.0 |
| 156 | Pressure-Side | 20.891 | 0.090 | 90.0 |
| 157 | Pressure-Side | 21.010 | −0.046 | 90.0 |
| 158 | Pressure-Side | 21.128 | −0.182 | 90.0 |
| 159 | Pressure-Side | 21.247 | −0.318 | 90.0 |
| 160 | Pressure-Side | 21.365 | −0.453 | 90.0 |
| 161 | Pressure-Side | 21.484 | −0.589 | 90.0 |
| 162 | Pressure-Side | 21.603 | −0.725 | 90.0 |
| 163 | Pressure-Side | 21.721 | −0.861 | 90.0 |
| 164 | Pressure-Side | 21.840 | −0.997 | 90.0 |
| 165 | Pressure-Side | 21.959 | −1.132 | 90.0 |
| 166 | Pressure-Side | 22.077 | −1.268 | 90.0 |
| 167 | Pressure-Side | 22.196 | −1.404 | 90.0 |
| 168 | Pressure-Side | 22.314 | −1.540 | 90.0 |
| 169 | Pressure-Side | 22.433 | −1.676 | 90.0 |
| 170 | Pressure-Side | 22.551 | −1.812 | 90.0 |
| 171 | Pressure-Side | 22.669 | −1.948 | 90.0 |
| 172 | Pressure-Side | 22.787 | −2.085 | 90.0 |
| 173 | Pressure-Side | 22.904 | −2.222 | 90.0 |
| 174 | Pressure-Side | 23.022 | −2.358 | 90.0 |
| 175 | Pressure-Side | 23.139 | −2.495 | 90.0 |
| 176 | Pressure-Side | 23.257 | −2.632 | 90.0 |
| 177 | Pressure-Side | 23.373 | −2.769 | 90.0 |
| 178 | Pressure-Side | 23.490 | −2.907 | 90.0 |
| 179 | Pressure-Side | 23.607 | −3.044 | 90.0 |
| 180 | Pressure-Side | 23.723 | −3.182 | 90.0 |
| 181 | Pressure-Side | 23.839 | −3.320 | 90.0 |
| 182 | Pressure-Side | 23.955 | −3.458 | 90.0 |
| 183 | Pressure-Side | 24.070 | −3.597 | 90.0 |
| 184 | Pressure-Side | 24.185 | −3.736 | 90.0 |
| 185 | Pressure-Side | 24.300 | −3.874 | 90.0 |
| 186 | Pressure-Side | 24.415 | −4.014 | 90.0 |
| 187 | Pressure-Side | 24.529 | −4.153 | 90.0 |
| 188 | Pressure-Side | 24.643 | −4.293 | 90.0 |
| 189 | Pressure-Side | 24.757 | −4.433 | 90.0 |
| 190 | Pressure-Side | 24.870 | −4.573 | 90.0 |
| 191 | Pressure-Side | 24.983 | −4.714 | 90.0 |
| 192 | Pressure-Side | 25.095 | −4.855 | 90.0 |
| 193 | Pressure-Side | 25.206 | −4.997 | 90.0 |
| 194 | Pressure-Side | 25.317 | −5.139 | 90.0 |
| 195 | Pressure-Side | 25.428 | −5.281 | 90.0 |
| 196 | Pressure-Side | 25.540 | −5.423 | 90.0 |
| 197 | Pressure-Side | 25.617 | −5.524 | 90.0 |
| 198 | Pressure-Side | 25.709 | −5.610 | 90.0 |
| 199 | Pressure-Side | 25.831 | −5.637 | 90.0 |
| 200 | Pressure-Side | 25.948 | −5.594 | 90.0 |
| 1 | Suction-Side | 15.249 | 8.407 | 100.0 |
| 2 | Suction-Side | 15.410 | 8.487 | 100.0 |
| 3 | Suction-Side | 15.594 | 8.479 | 100.0 |
| 4 | Suction-Side | 15.771 | 8.438 | 100.0 |
| 5 | Suction-Side | 15.944 | 8.376 | 100.0 |
| 6 | Suction-Side | 16.109 | 8.299 | 100.0 |
| 7 | Suction-Side | 16.268 | 8.209 | 100.0 |
| 8 | Suction-Side | 16.421 | 8.111 | 100.0 |
| 9 | Suction-Side | 16.569 | 8.005 | 100.0 |
| 10 | Suction-Side | 16.713 | 7.893 | 100.0 |
| 11 | Suction-Side | 16.853 | 7.777 | 100.0 |
| 12 | Suction-Side | 16.988 | 7.656 | 100.0 |
| 13 | Suction-Side | 17.118 | 7.532 | 100.0 |
| 14 | Suction-Side | 17.246 | 7.404 | 100.0 |
| 15 | Suction-Side | 17.370 | 7.274 | 100.0 |
| 16 | Suction-Side | 17.490 | 7.140 | 100.0 |
| 17 | Suction-Side | 17.608 | 7.004 | 100.0 |
| 18 | Suction-Side | 17.724 | 6.866 | 100.0 |
| 19 | Suction-Side | 17.837 | 6.726 | 100.0 |
| 20 | Suction-Side | 17.948 | 6.583 | 100.0 |
| 21 | Suction-Side | 18.057 | 6.440 | 100.0 |
| 22 | Suction-Side | 18.165 | 6.295 | 100.0 |
| 23 | Suction-Side | 18.271 | 6.148 | 100.0 |
| 24 | Suction-Side | 18.376 | 6.0 | 100.0 |
| 25 | Suction-Side | 18.480 | 5.852 | 100.0 |
| 26 | Suction-Side | 18.582 | 5.703 | 100.0 |
| 27 | Suction-Side | 18.684 | 5.554 | 100.0 |
| 28 | Suction-Side | 18.786 | 5.404 | 100.0 |
| 29 | Suction-Side | 18.887 | 5.253 | 100.0 |
| 30 | Suction-Side | 18.988 | 5.103 | 100.0 |
| 31 | Suction-Side | 19.088 | 4.952 | 100.0 |
| 32 | Suction-Side | 19.187 | 4.801 | 100.0 |
| 33 | Suction-Side | 19.286 | 4.650 | 100.0 |
| 34 | Suction-Side | 19.386 | 4.498 | 100.0 |
| 35 | Suction-Side | 19.484 | 4.346 | 100.0 |
| 36 | Suction-Side | 19.583 | 4.195 | 100.0 |
| 37 | Suction-Side | 19.681 | 4.043 | 100.0 |
| 38 | Suction-Side | 19.780 | 3.891 | 100.0 |
| 39 | Suction-Side | 19.878 | 3.739 | 100.0 |
| 40 | Suction-Side | 19.976 | 3.587 | 100.0 |
| 41 | Suction-Side | 20.074 | 3.434 | 100.0 |
| 42 | Suction-Side | 20.172 | 3.282 | 100.0 |
| 43 | Suction-Side | 20.269 | 3.130 | 100.0 |
| 44 | Suction-Side | 20.367 | 2.977 | 100.0 |
| 45 | Suction-Side | 20.464 | 2.825 | 100.0 |
| 46 | Suction-Side | 20.562 | 2.673 | 100.0 |
| 47 | Suction-Side | 20.660 | 2.520 | 100.0 |
| 48 | Suction-Side | 20.757 | 2.368 | 100.0 |
| 49 | Suction-Side | 20.854 | 2.215 | 100.0 |
| 50 | Suction-Side | 20.952 | 2.063 | 100.0 |
| 51 | Suction-Side | 21.049 | 1.910 | 100.0 |
| 52 | Suction-Side | 21.147 | 1.757 | 100.0 |

TABLE I-continued

[non-dimensionalized percentages]

| N | Location | X | Y | Z |
|---|---|---|---|---|
| 53 | Suction-Side | 21.244 | 1.605 | 100.0 |
| 54 | Suction-Side | 21.341 | 1.452 | 100.0 |
| 55 | Suction-Side | 21.438 | 1.299 | 100.0 |
| 56 | Suction-Side | 21.536 | 1.147 | 100.0 |
| 57 | Suction-Side | 21.633 | 0.994 | 100.0 |
| 58 | Suction-Side | 21.730 | 0.841 | 100.0 |
| 59 | Suction-Side | 21.827 | 0.689 | 100.0 |
| 60 | Suction-Side | 21.924 | 0.536 | 100.0 |
| 61 | Suction-Side | 22.021 | 0.383 | 100.0 |
| 62 | Suction-Side | 22.118 | 0.230 | 100.0 |
| 63 | Suction-Side | 22.216 | 0.078 | 100.0 |
| 64 | Suction-Side | 22.313 | −0.075 | 100.0 |
| 65 | Suction-Side | 22.410 | −0.228 | 100.0 |
| 66 | Suction-Side | 22.507 | −0.381 | 100.0 |
| 67 | Suction-Side | 22.604 | −0.533 | 100.0 |
| 68 | Suction-Side | 22.702 | −0.686 | 100.0 |
| 69 | Suction-Side | 22.799 | −0.838 | 100.0 |
| 70 | Suction-Side | 22.896 | −0.991 | 100.0 |
| 71 | Suction-Side | 22.994 | −1.144 | 100.0 |
| 72 | Suction-Side | 23.091 | −1.296 | 100.0 |
| 73 | Suction-Side | 23.189 | −1.449 | 100.0 |
| 74 | Suction-Side | 23.286 | −1.601 | 100.0 |
| 75 | Suction-Side | 23.384 | −1.754 | 100.0 |
| 76 | Suction-Side | 23.481 | −1.906 | 100.0 |
| 77 | Suction-Side | 23.579 | −2.058 | 100.0 |
| 78 | Suction-Side | 23.676 | −2.211 | 100.0 |
| 79 | Suction-Side | 23.774 | −2.363 | 100.0 |
| 80 | Suction-Side | 23.871 | −2.516 | 100.0 |
| 81 | Suction-Side | 23.969 | −2.668 | 100.0 |
| 82 | Suction-Side | 24.067 | −2.821 | 100.0 |
| 83 | Suction-Side | 24.164 | −2.973 | 100.0 |
| 84 | Suction-Side | 24.262 | −3.126 | 100.0 |
| 85 | Suction-Side | 24.360 | −3.278 | 100.0 |
| 86 | Suction-Side | 24.457 | −3.430 | 100.0 |
| 87 | Suction-Side | 24.555 | −3.583 | 100.0 |
| 88 | Suction-Side | 24.652 | −3.735 | 100.0 |
| 89 | Suction-Side | 24.750 | −3.888 | 100.0 |
| 90 | Suction-Side | 24.847 | −4.040 | 100.0 |
| 91 | Suction-Side | 24.944 | −4.193 | 100.0 |
| 92 | Suction-Side | 25.042 | −4.346 | 100.0 |
| 93 | Suction-Side | 25.139 | −4.498 | 100.0 |
| 94 | Suction-Side | 25.236 | −4.651 | 100.0 |
| 95 | Suction-Side | 25.333 | −4.804 | 100.0 |
| 96 | Suction-Side | 25.430 | −4.957 | 100.0 |
| 97 | Suction-Side | 25.497 | −5.064 | 100.0 |
| 98 | Suction-Side | 25.549 | −5.178 | 100.0 |
| 99 | Suction-Side | 25.537 | −5.304 | 100.0 |
| 100 | Suction-Side | 25.460 | −5.405 | 100.0 |
| 101 | Pressure-Side | 15.249 | 8.407 | 100.0 |
| 102 | Pressure-Side | 15.221 | 8.235 | 100.0 |
| 103 | Pressure-Side | 15.274 | 8.066 | 100.0 |
| 104 | Pressure-Side | 15.351 | 7.907 | 100.0 |
| 105 | Pressure-Side | 15.435 | 7.750 | 100.0 |
| 106 | Pressure-Side | 15.519 | 7.593 | 100.0 |
| 107 | Pressure-Side | 15.604 | 7.437 | 100.0 |
| 108 | Pressure-Side | 15.690 | 7.282 | 100.0 |
| 109 | Pressure-Side | 15.778 | 7.127 | 100.0 |
| 110 | Pressure-Side | 15.867 | 6.973 | 100.0 |
| 111 | Pressure-Side | 15.957 | 6.819 | 100.0 |
| 112 | Pressure-Side | 16.048 | 6.667 | 100.0 |
| 113 | Pressure-Side | 16.140 | 6.515 | 100.0 |
| 114 | Pressure-Side | 16.234 | 6.364 | 100.0 |
| 115 | Pressure-Side | 16.328 | 6.213 | 100.0 |
| 116 | Pressure-Side | 16.423 | 6.063 | 100.0 |
| 117 | Pressure-Side | 16.520 | 5.914 | 100.0 |
| 118 | Pressure-Side | 16.617 | 5.764 | 100.0 |
| 119 | Pressure-Side | 16.714 | 5.616 | 100.0 |
| 120 | Pressure-Side | 16.813 | 5.468 | 100.0 |
| 121 | Pressure-Side | 16.912 | 5.320 | 100.0 |
| 122 | Pressure-Side | 17.012 | 5.173 | 100.0 |
| 123 | Pressure-Side | 17.112 | 5.027 | 100.0 |
| 124 | Pressure-Side | 17.213 | 4.880 | 100.0 |
| 125 | Pressure-Side | 17.315 | 4.734 | 100.0 |
| 126 | Pressure-Side | 17.416 | 4.588 | 100.0 |
| 127 | Pressure-Side | 17.519 | 4.443 | 100.0 |
| 128 | Pressure-Side | 17.621 | 4.298 | 100.0 |
| 129 | Pressure-Side | 17.725 | 4.153 | 100.0 |
| 130 | Pressure-Side | 17.829 | 4.009 | 100.0 |
| 131 | Pressure-Side | 17.933 | 3.865 | 100.0 |
| 132 | Pressure-Side | 18.037 | 3.721 | 100.0 |
| 133 | Pressure-Side | 18.142 | 3.577 | 100.0 |
| 134 | Pressure-Side | 18.247 | 3.434 | 100.0 |
| 135 | Pressure-Side | 18.352 | 3.291 | 100.0 |
| 136 | Pressure-Side | 18.458 | 3.148 | 100.0 |
| 137 | Pressure-Side | 18.564 | 3.005 | 100.0 |
| 138 | Pressure-Side | 18.671 | 2.863 | 100.0 |
| 139 | Pressure-Side | 18.777 | 2.721 | 100.0 |
| 140 | Pressure-Side | 18.884 | 2.579 | 100.0 |
| 141 | Pressure-Side | 18.991 | 2.437 | 100.0 |
| 142 | Pressure-Side | 19.099 | 2.295 | 100.0 |
| 143 | Pressure-Side | 19.206 | 2.154 | 100.0 |
| 144 | Pressure-Side | 19.314 | 2.012 | 100.0 |
| 145 | Pressure-Side | 19.422 | 1.871 | 100.0 |
| 146 | Pressure-Side | 19.530 | 1.730 | 100.0 |
| 147 | Pressure-Side | 19.639 | 1.589 | 100.0 |
| 148 | Pressure-Side | 19.747 | 1.448 | 100.0 |
| 149 | Pressure-Side | 19.856 | 1.308 | 100.0 |
| 150 | Pressure-Side | 19.965 | 1.167 | 100.0 |
| 151 | Pressure-Side | 20.074 | 1.027 | 100.0 |
| 152 | Pressure-Side | 20.184 | 0.887 | 100.0 |
| 153 | Pressure-Side | 20.293 | 0.747 | 100.0 |
| 154 | Pressure-Side | 20.403 | 0.607 | 100.0 |
| 155 | Pressure-Side | 20.513 | 0.467 | 100.0 |
| 156 | Pressure-Side | 20.623 | 0.327 | 100.0 |
| 157 | Pressure-Side | 20.733 | 0.188 | 100.0 |
| 158 | Pressure-Side | 20.843 | 0.048 | 100.0 |
| 159 | Pressure-Side | 20.953 | −0.091 | 100.0 |
| 160 | Pressure-Side | 21.063 | −0.231 | 100.0 |
| 161 | Pressure-Side | 21.174 | −0.370 | 100.0 |
| 162 | Pressure-Side | 21.285 | −0.509 | 100.0 |
| 163 | Pressure-Side | 21.395 | −0.648 | 100.0 |
| 164 | Pressure-Side | 21.506 | −0.787 | 100.0 |
| 165 | Pressure-Side | 21.617 | −0.926 | 100.0 |
| 166 | Pressure-Side | 21.728 | −1.064 | 100.0 |
| 167 | Pressure-Side | 21.839 | −1.203 | 100.0 |
| 168 | Pressure-Side | 21.950 | −1.342 | 100.0 |
| 169 | Pressure-Side | 22.062 | −1.481 | 100.0 |
| 170 | Pressure-Side | 22.173 | −1.619 | 100.0 |
| 171 | Pressure-Side | 22.285 | −1.758 | 100.0 |
| 172 | Pressure-Side | 22.396 | −1.896 | 100.0 |
| 173 | Pressure-Side | 22.508 | −2.034 | 100.0 |
| 174 | Pressure-Side | 22.620 | −2.172 | 100.0 |
| 175 | Pressure-Side | 22.731 | −2.311 | 100.0 |
| 176 | Pressure-Side | 22.843 | −2.449 | 100.0 |
| 177 | Pressure-Side | 22.955 | −2.587 | 100.0 |
| 178 | Pressure-Side | 23.067 | −2.725 | 100.0 |
| 179 | Pressure-Side | 23.179 | −2.863 | 100.0 |
| 180 | Pressure-Side | 23.291 | −3.002 | 100.0 |
| 181 | Pressure-Side | 23.403 | −3.140 | 100.0 |
| 182 | Pressure-Side | 23.515 | −3.278 | 100.0 |
| 183 | Pressure-Side | 23.627 | −3.416 | 100.0 |
| 184 | Pressure-Side | 23.738 | −3.554 | 100.0 |
| 185 | Pressure-Side | 23.850 | −3.692 | 100.0 |
| 186 | Pressure-Side | 23.962 | −3.830 | 100.0 |
| 187 | Pressure-Side | 24.073 | −3.969 | 100.0 |
| 188 | Pressure-Side | 24.184 | −4.108 | 100.0 |
| 189 | Pressure-Side | 24.295 | −4.247 | 100.0 |
| 190 | Pressure-Side | 24.405 | −4.387 | 100.0 |
| 191 | Pressure-Side | 24.515 | −4.526 | 100.0 |
| 192 | Pressure-Side | 24.625 | −4.666 | 100.0 |
| 193 | Pressure-Side | 24.734 | −4.807 | 100.0 |
| 194 | Pressure-Side | 24.843 | −4.947 | 100.0 |
| 195 | Pressure-Side | 24.952 | −5.088 | 100.0 |
| 196 | Pressure-Side | 25.060 | −5.228 | 100.0 |
| 197 | Pressure-Side | 25.136 | −5.329 | 100.0 |
| 198 | Pressure-Side | 25.224 | −5.416 | 100.0 |
| 199 | Pressure-Side | 25.344 | −5.446 | 100.0 |
| 200 | Pressure-Side | 25.460 | −5.405 | 100.0 |

The disclosed airfoil shape provides a unique profile to achieve: 1) interaction between other stages in turbine 108 (FIG. 1); 2) aerodynamic efficiency; and 3) normalized aerodynamic and mechanical blade or airfoil loadings. The disclosed loci of points defined in TABLE I allow GT system 100 or any other suitable turbine system to run in an efficient, safe and smooth manner. As also noted, any non-limiting scale of the airfoil 202 may be adopted as long as: 1) interaction between other stages in the pressure turbine 108 (FIG. 1); 2) aerodynamic efficiency; and 3) normalized aerodynamic and mechanical blade or airfoil loadings, are maintained in the scaled turbine.

Airfoil 202 described herein thus improves overall GT system 108 efficiency. Specifically, airfoil 202 provides a desired turbine efficiency lapse rate (ISO, hot, cold, part load, etc.). Airfoil 202 also meets all aeromechanical and stress requirements. Turbine blades described herein have very specific aerodynamic requirements. Significant cross-functional effort was required to meet these goals. Airfoil 202 of turbine blade 200 thus possesses a specific shape to meet aerodynamic, mechanical, and heat transfer requirements in an efficient and cost effective manner.

The apparatus and devices of the present disclosure are not limited to any one particular turbomachine, engine, turbine, jet engine, power generation system or other system, and may be used with turbomachines such as aircraft systems, power generation systems (e.g., simple cycle, combined cycle, and/or other systems (e.g., nuclear reactor). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A turbine blade comprising:
    an airfoil having a suction side, a pressure side opposing the suction side, a leading edge spanning between the pressure side and the suction side, and a trailing edge opposing the leading edge and spanning between the pressure side and the suction side; and
    an endwall connected with the airfoil along the suction side, the pressure side, the trailing edge and the leading edge;
    wherein at least one of a suction side or a pressure side of the airfoil has a shape having a nominal profile substantially in accordance with at least a portion of Cartesian coordinate values of X, Y and Z set forth in TABLE I, wherein the Cartesian coordinate values are non-dimensional percentage values from 0% to 100%, wherein the values are convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at each Z distance being joined smoothly with one another to form the nominal profile,
    wherein the shape having the nominal profile substantially in accordance with the at least a portion of Cartesian coordinate values of X, Y and Z set forth in TABLE I includes the airfoil profile sections defined within 5% and 95% of the height of the airfoil.

2. The turbine blade of claim 1, further comprising a fillet connecting a surface of the endwall to a surface of the airfoil.

3. The turbine blade of claim 1, wherein the turbine blade is a fourth stage blade.

4. The turbine blade of claim 1, wherein the shape having the nominal profile substantially in accordance with the at least a portion of Cartesian coordinate values of X, Y and Z set forth in TABLE I includes the airfoil profile sections defined within 10% and 90% of the height of the airfoil.

5. A rotor blade section for a turbine, the rotor blade section comprising:
    a set of rotating blades, the set of rotating blades including at least one blade having:
        an airfoil having a suction side, a pressure side opposing the suction side, a leading edge spanning between the pressure side and the suction side, and a trailing edge opposing the leading edge and spanning between the pressure side and the suction side; and
    an endwall connected with the airfoil along the suction side, the pressure side, the trailing edge and the leading edge;
    wherein at least one of a suction side or a pressure side of the airfoil has a shape having a nominal profile substantially in accordance with at least a portion of Cartesian coordinate values of X, Y and Z set forth in TABLE I, wherein the Cartesian coordinate values are non-dimensional percentage values of from 0% to 100%, wherein the values are convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at each Z distance being joined smoothly with one another to form the nominal profile,
    wherein the shape having the nominal profile substantially in accordance with at least a portion of Cartesian coordinate values of X, Y and Z set forth in TABLE I includes the airfoil profile sections defined within 5% and 95% of the height of the airfoil.

6. The rotor blade section of claim 5, further comprising a fillet connecting a surface of the endwall to a surface of the airfoil.

7. The rotor blade section of claim 5, wherein the rotor blade section is a fourth stage blade section.

8. The rotor blade section of claim 5, wherein the shape having the nominal profile substantially in accordance with at least a portion of Cartesian coordinate values of X, Y and Z set forth in TABLE I includes the airfoil profile sections defined within 10% and 90% of the height of the airfoil.

9. A turbine comprising a plurality of rotor blades, each of the plurality of rotor blades comprising:
- an airfoil having a suction side, a pressure side opposing the suction side, a leading edge spanning between the pressure side and the suction side, and a trailing edge opposing the leading edge and spanning between the pressure side and the suction side; and
- an endwall connected with the airfoil along the suction side, the pressure side, the trailing edge and the leading edge;
- wherein at least one of a suction side or a pressure side of the airfoil has a shape having a nominal profile substantially in accordance with at least a portion of Cartesian coordinate values of X, Y and Z set forth in TABLE I, wherein the Cartesian coordinate values are non-dimensional percentage values of from 0% to 100%, wherein the values are convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at each Z distance being joined smoothly with one another to form the nominal profile,
- wherein the shape having the nominal profile substantially in accordance with the at least a portion of Cartesian coordinate values of X, Y and Z set forth in TABLE I includes the airfoil profile sections defined within 5% and 95% of the height of the airfoil.

10. The turbine of claim 9, further comprising a fillet connecting a surface of the endwall to a surface of the airfoil.

11. The turbine of claim 9, wherein the turbine rotor blade is a fourth stage rotor blade.

12. The turbine of claim 9, wherein the shape having the nominal profile substantially in accordance with the at least a portion of Cartesian coordinate values of X, Y and Z set forth in TABLE I includes the airfoil profile sections defined within 10% and 90% of the height of the airfoil.

\* \* \* \* \*